(12) United States Patent
Bruce et al.

(10) Patent No.: US 10,459,842 B1
(45) Date of Patent: Oct. 29, 2019

(54) DATA STORAGE SYSTEM WITH CONFIGURABLE PREFETCH BUFFERS

(71) Applicant: BiTMICRO Networks, Inc., Fremont, CA (US)

(72) Inventors: Rey H. Bruce, Warwick, NY (US); Ricardo H. Bruce, Fremont, CA (US); Marlon B. Verdan, Fremont, CA (US); Elsbeth Lauren Tagayo-Villapaña, Cambridge (GB)

(73) Assignee: BiTMICRO Networks, Inc., Fremont, CA (US)

( * ) Notice: Subject to any disclaimer, the term of this patent is extended or adjusted under 35 U.S.C. 154(b) by 54 days.

(21) Appl. No.: 15/904,322

(22) Filed: Feb. 24, 2018

Related U.S. Application Data

(63) Continuation-in-part of application No. 15/683,700, filed on Aug. 22, 2017, which is a continuation-in-part of application No. 15/853,951, filed on Dec. 25, 2017, which is a continuation-in-part of application No. 15/683,700, filed on Aug. 22, 2017.

(60) Provisional application No. 62/441,340, filed on Dec. 31, 2016.

(51) Int. Cl.
*G06F 12/0862* (2016.01)
*G06F 9/38* (2018.01)
*G06F 13/16* (2006.01)
*G06F 3/06* (2006.01)
*G06F 13/28* (2006.01)

(52) U.S. Cl.
CPC ........ *G06F 12/0862* (2013.01); *G06F 3/0658* (2013.01); *G06F 3/0679* (2013.01); *G06F 9/3814* (2013.01); *G06F 13/1673* (2013.01); *G06F 13/28* (2013.01); *G06F 2212/6022* (2013.01)

(58) Field of Classification Search
None
See application file for complete search history.

(56) References Cited

U.S. PATENT DOCUMENTS

| 6,578,102 B1 * | 6/2003 | Batchelor | ........... G06F 13/4059 710/310 |
| 2002/0138700 A1 * | 9/2002 | Holmberg | ............. G06F 9/3802 711/137 |

* cited by examiner

*Primary Examiner* — Brian R Peugh
(74) *Attorney, Agent, or Firm* — Adams Intellex, PLC

(57) ABSTRACT

In an embodiment of the invention, an apparatus comprises: a data storage device comprising a first prefetch buffer, a second prefetch buffer, and a third prefetch buffer; wherein the second prefetch buffer and the third prefetch buffer are both coupled in parallel to the first prefetch buffer; and wherein any of the prefetch buffers is configured to store prefetch data. The prefetch data is available to a host that sends a memory read transaction request to the data storage device. In another embodiment of the invention, a method comprises: storing prefetch data in any one of a first prefetch buffer, a second prefetch buffer, or a third prefetch buffer in a storage device; wherein the second prefetch buffer and the third prefetch buffer are both coupled in parallel to the first prefetch buffer. The prefetch data is available to a host that sends a memory read transaction request to a data storage device.

20 Claims, 9 Drawing Sheets

DATA STORAGE SYSTEM WITH CONFIGURABLE PREFETCH BUFFERS

CROSS-REFERENCE(S) TO RELATED APPLICATION

This application is a continuation-in-part of U.S. application Ser. No. 15/853,951 which is a continuation-in-part of U.S. application Ser. No. 15/683,700 which claims the benefit of and priority to U.S. Provisional Application No. 62/441,340.

This application is a continuation-in-part of U.S. application Ser. No. 15/683,700 which claims the benefit of and priority to U.S. Provisional Application No. 62/441,340.

This U.S. Provisional Application No. 62/441,340 is hereby fully incorporated herein by reference. This U.S. application Ser. No. 15/683,700 is hereby fully incorporated herein by reference. This U.S. application Ser. No. 15/853,951 is hereby fully incorporated herein by reference.

FIELD

Embodiments of the invention relate generally to data storage systems and also relate more particularly to prefetching in non-volatile memory systems.

DESCRIPTION OF RELATED ART

The background description provided herein is for the purpose of generally presenting the context of the disclosure of the invention. Work of the presently named inventors, to the extent the work is described in this background section, as well as aspects of the description that may not otherwise qualify as prior art at the time of filing, are neither expressly nor impliedly admitted as prior art against this present disclosure of the invention.

High data availability and low latency data read transactions are ever increasing requirements in, for example, current storage systems, networked attached storage (NAS) devices, storage array network (SAN) devices, storage virtualization applications, on-demand video applications, and/or other systems with memory storage requirements. As further examples, in enterprise database applications or in an on-line transaction processing activity, massive amounts of data are typically read, sorted, and/or filtered, and reading these massive amounts of data that are randomly stored in data storage devices typically results in latency in memory read transactions.

Data prefetching approaches are used to reduce latency in memory read transactions. Data prefetching will prefetch data before the data is needed by a requesting host or another requesting device. Because data access patterns show less regularity than instruction patterns, accurate data prefetching is generally more challenging than instruction prefetching.

Therefore, there is a continuing need to overcome the constraints and/or disadvantages of conventional systems.

SUMMARY

Embodiments of the invention relate generally to data storage systems and also relate more particularly to prefetching in non-volatile memory systems.

In an embodiment of the invention, an apparatus comprises a data storage device with configurable prefetch buffers or a configurable prefetch buffer topology.

In an embodiment of the invention, an apparatus comprises: a data storage device comprising a first prefetch buffer, a second prefetch buffer, and a third prefetch buffer; wherein the second prefetch buffer and the third prefetch buffer are both coupled in parallel to the first prefetch buffer; and wherein any of the prefetch buffers is configured to store prefetch data. The prefetch data is available to a host that sends a memory read transaction request to the data storage device.

In another embodiment of the invention, a method comprises: storing prefetch data in any one of a first prefetch buffer, a second prefetch buffer, or a third prefetch buffer in a storage device; wherein the second prefetch buffer and the third prefetch buffer are both coupled in parallel to the first prefetch buffer. The prefetch data is available to a host that sends a memory read transaction request to a data storage device.

In yet another embodiment of the invention, an article of manufacture, comprises a non-transitory computer-readable medium having stored thereon instructions operable to permit an apparatus to perform a method comprising: storing prefetch data in any one of a first prefetch buffer, a second prefetch buffer, or a third prefetch buffer in a storage device; wherein the second prefetch buffer and the third prefetch buffer are both coupled in parallel to the first prefetch buffer. The prefetch data is available to a host that sends a memory read transaction request to a data storage device.

In yet another embodiment of the invention, a data storage device comprises a serial chain having a plurality of sub-chains comprising configurable prefetch buffers. The prefetch data is available to a host that sends a memory read transaction request to the data storage device.

In still another embodiment of the invention, a data storage device comprises a serial chain having a plurality of sub-chains comprising configurable prefetch buffers. Any one of the sub-chains may be uni-directional or multi-directional. The prefetch data is available to a host that sends a memory read transaction request to the data storage device.

It is to be understood that both the foregoing general description and the following detailed description are exemplary and explanatory only and are not restrictive of the invention, as claimed. For example, the foregoing general description presents a simplified summary in order to provide a basic understanding of some aspects described herein. This summary is not an extensive overview of the claimed subject matter. This summary is intended to neither identify key or critical elements of the claimed subject matter nor delineate the scope thereof. The sole purpose of the summary is to present some concepts in a simplified form as a prelude to the more detailed description that is presented later.

The accompanying drawings, which are incorporated in and constitute a part of this specification, illustrate one (several) embodiment(s) of the invention and together with the description, serve to explain the principles of the invention.

BRIEF DESCRIPTION OF DRAWINGS

Non-limiting and non-exhaustive embodiments of the present invention are described with reference to the following figures, wherein like reference numerals may refer to like parts throughout the various views unless otherwise specified.

It is to be noted, however, that the appended drawings illustrate only typical embodiments of this invention and are therefore not to be considered limiting of its scope, for the present invention may admit to other equally effective embodiments.

DETAILED DESCRIPTION

Figure 1A:
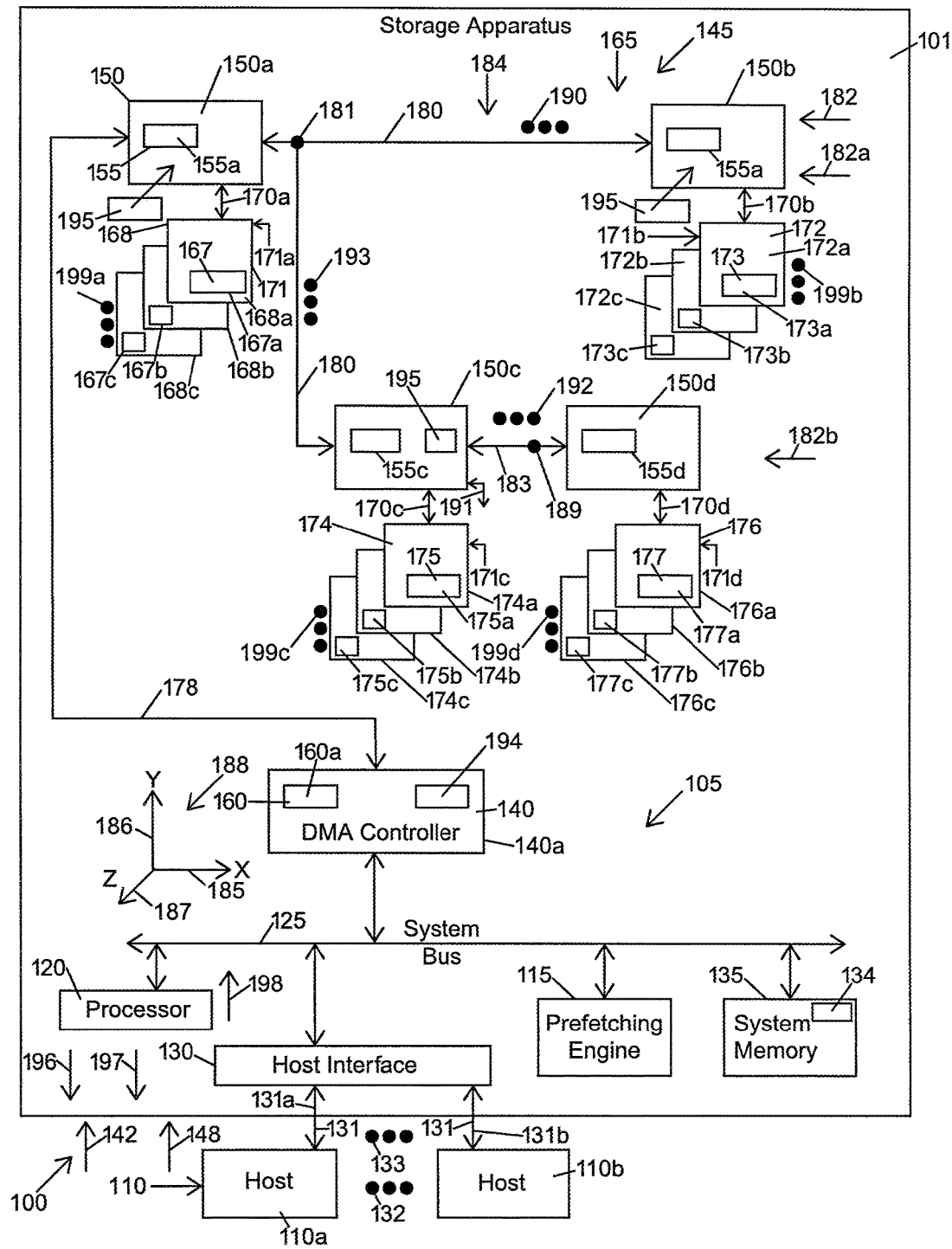
FIG. 1A is a block diagram of a storage system, in accordance with an embodiment of the invention.

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming, but would nevertheless be a routine engineering undertaking for those of ordinary skill in the art having the benefit of this disclosure. The various embodiments disclosed herein are not intended to limit the scope and spirit of the herein disclosure.

Exemplary embodiments for carrying out the principles of the present invention are described herein with reference to the drawings. However, the present invention is not limited to the specifically described and illustrated embodiments. A person skilled in the art will appreciate that many other embodiments are possible without deviating from the basic concept of the invention. Therefore, the principles of the present invention extend to any work that falls within the scope of the appended claims.

As used herein, the terms "a" and "an" herein do not denote a limitation of quantity, but rather denote the presence of at least one of the referenced items.

As used herein, the terms "a" and "an" herein do not denote a limitation of quantity, but rather denote the presence of at least one of the referenced items.

In the following description and in the claims, the terms "include" and "comprise" are used in an open-ended fashion, and thus should be interpreted to mean "include, but not limited to . . . ". Also, the term "couple" (or "coupled") is intended to mean either an indirect or direct electrical connection (or an indirect or direct optical connection). Accordingly, if one device is coupled to another device, then that connection may be through a direct electrical (or optical) connection, or through an indirect electrical (or optical) connection via other devices and/or other connections.

An embodiment of the invention provides a significant competitive advantage in the data storage system industry by providing prefetching features that reduce latency in memory read transactions.

An embodiment of the invention provides configurable prefetch buffers that can be appropriately disposed or configured to satisfy package constraints and/or other physical constraints that may be applicable to a memory topology and that are configured to advantageously increase the amount of prefetch data in a data storage system.

In the description herein, a non-volatile memory device (or non-volatile memory) is also referred to as a flash device (i.e., a flash memory device or a flash), and a non-volatile memory module is also referred to as a flash memory module. A non-volatile memory module (e.g., a flash memory module) comprises at least one non-volatile memory device (e.g., flash device or flash memory device). A non-volatile memory device (or non-volatile memory) or a flash device can be any type of non-volatile memory device such as, for example, a flash device and/or another type of non-volatile memory device such as, for example, a read-only memory, ferroelectric random access memory, a volatile memory device that is powered by a battery, capacitor, supercapacitor (or ultra-capacitor), ceramic capacitors, or Tantalum capacitor so that the volatile memory device functions as a non-volatile memory device (i.e., so that the volatile memory device is an energy store volatile memory device), a magnetic computer storage device (e.g., mechanical disk memory or hard disk memory, floppy disk or magnetic tape), or another type of non-volatile memory device or another type of energy store volatile memory device, or can be a plurality of non-volatile memory devices or can also be a combination of at least two of the above-mentioned types of non-volatile memory devices.

The terms "non-volatile memory device", "flash device", "flash memory device", or "flash" are intended to include any form of non-volatile memory that includes a set of non-volatile memory cells. These non-volatile memory cells may include, for example, multi-level memory cells. This flash device (or flash memory device or flash) permit read and write operations to be performed on these memory cells according to a protocol supported by the flash device. This flash device may be implemented by using a flash memory device that complies with the Open NAND Flash Interface Specification, commonly referred to as ONFI Specification. The term "ONFI Specification" is a known device interface standard created by a consortium of technology companies known as the "ONFI Workgroup". The ONFI Workgroup develops open standards for NAND Flash memory devices and for devices that communicate with these NAND flash memory devices. The ONFI Workgroup is headquartered in Hillsboro, Oreg. Using a flash device that complies with the ONFI Specification is not intended to limit the embodiment(s) disclosed herein. One of ordinary skill in the art having the benefit of this disclosure would readily recognize that other types of flash devices employing different device interface protocols may be used, such as protocols that are compatible with the standards created through the Non-Volatile Memory Host Controller Interface (NVMHCI) working group. Members of the NVMHCI working group include Intel Corporation of Santa Clara, Calif., Dell Inc. of Round Rock, Tex., and Microsoft Corporation of Redmond, Wash.

FIG. 1A is a block diagram that illustrates a system 100 (or apparatus 100), in accordance with an embodiment of the invention. The system 100 (apparatus 100) comprises a data storage apparatus 101 (data storage system 101) with configurable prefetch buffers for storing prefetch data. In an embodiment of the invention, the configurable prefetch buffers may be serially configurable prefetch buffers, and/or serially expandable prefetch buffers, and/or are expandable uni-directional prefetch buffers, and/or are expandable multi-directional prefetch buffers.

In an embodiment of the invention, a data storage apparatus 101 comprises a serial chain that has a plurality of serial sub-chains comprising configurable prefetch buffers. The prefetch data is available to a host that sends a memory read transaction request to the data storage apparatus (e.g., apparatus 101, apparatus 201, apparatus 301 or apparatus 401), as will be discussed in various examples below.

In another embodiment of the invention, a data storage apparatus 101 comprises a serial chain that has a plurality of serial sub-chains comprising configurable prefetch buffers, wherein one of the serial sub-chains is uni-directional or multi-directional. Each serial sub-chain comprises at least one allocated prefetch buffer for storing prefetch data. The prefetch data is available to a host that sends a memory read transaction request to the data storage apparatus (e.g., apparatus 101, apparatus 201, apparatus 301 or apparatus 401), as will be discussed in various examples below.

The prefetch buffers are configured for reducing latency in memory transactions in a data storage apparatus (e.g., apparatus 101, apparatus 201, apparatus 301 and/or apparatus 401)).

In FIG. 1A, as well as in the subsequent drawing figures discussed below, for purposes of explanation and/or clarity, numerous specific details are set forth in order to provide a thorough understanding thereof. It may be evident, however, that the novel embodiments can be practiced without these specific details shown in the drawing figures. In other instances, well known structures and devices are shown in block diagram form in order to facilitate a description thereof. The intention is to cover all modifications, equivalents, and alternatives consistent with the claimed subject matter.

Data returned as a result of the read operation in a memory device in the data storage apparatus 101 is herein called "read data". The storage apparatus 101 comprises a memory interface 105 in an embodiment of the invention, wherein the memory interface 105 may also perform an internal read operation if data exists in memory (e.g., a memory device), wherein that existing data (in memory) meets at least one prefetch selection criterion. This prefetch selection criterion may include a relationship between the read data and a data portion existing in memory, named "stored data". The type of relationship between the read data and stored data is not intended to be limiting in any way. Any type of relationship may be used that increases the likelihood that the stored data selected for prefetching will be later requested by a host 110 that is communicatively coupled to the memory interface 105 in the data storage apparatus 101. For example, the memory interface 105 determines that this prefetch selection criterion is met if stored data exists (in memory) wherein the stored data has a memory address that differs from the address of the read data within a selected memory address range. In another example, the memory interface 105 determines whether the prefetch selection criterion is met by determining whether any stored data exists (in memory) wherein the stored data has a memory address within the same page as a memory address associated with the read data. In an embodiment of the invention, a prefetching engine 115 in the storage apparatus 101 can be programmed to define a prefetch selection criterion.

The term "host", as disclosed herein, can be defined as any device that has the ability to transmit a memory read transaction request to the data storage apparatus 101 having the above-mentioned memory interface 105. For example, this device (e.g., host 110) can generate a memory read transaction request and can receive a response resulting from the processing of the memory read transaction request by the memory interface 105. The memory interface 105 may process memory transactions from one or more requesting device, such as one or more hosts 110 (e.g., host 110a and/or host 110b). For example, a first host 110a may generate a memory read transaction request to the storage apparatus 101, while a second host 110b may receive a response to the memory read transaction request. A response can be, for example, a prefetch data that is a result of another subsequent memory read transaction request that is sent by the second host 110b (or sent by the same first host 110a).

The term "data portion" is intended to refer to any data size granularity used by the data storage apparatus 101 to address data which is stored in a memory. For example, data in memory may be addressed in increments that may include a flash page, flash block, a file, or the like.

If the memory interface 105 determines that the prefetch selection criterion is met, then the memory interface 105 initiates an internal read operation. This internal read operation includes the memory interface 105 retrieving data that meets the prefetch selection criterion from the memory, wherein the memory is a memory device in the data storage apparatus 101 as will be additionally discussed below. The memory interface 105 may perform this internal read operation without host prompting. However, if the memory interface 105 determines that the prefetch selection criterion has not been met, then the memory interface 105 does not perform this internal read operation. The data retrieved from a memory in the data storage apparatus 101 wherein the data meets the prefetch selection criterion, is herein called "prefetch data".

As part of the internal read operation, the memory interface 105 allocates at least one prefetch buffer from buffers (and/or data registers in one or more memory devices) in the data storage apparatus 101, wherein any given prefetch buffer is configured to store prefetch data. The number of prefetch buffers that are allocated by the memory interface 105 may be selected at the time of manufacture, at the time of initialization, or dynamically as needed by a data storage apparatus 101 that uses the prefetch buffers. In another embodiment of the invention, the memory interface 105 initially selects the number of prefetch buffers that are allocated for storing prefetch data, and the memory interface 105 then dynamically adjusts the number of prefetch buffers after initialization, depending on an amount of storage space that is needed for data to be treated as a prefetch data during the processing of the memory read transaction requests from a host(s) 110. For example, the memory interface 105 may allocate a data register (in a non-volatile memory device in the storage apparatus 101) as a storage space suitable for storing prefetch data, and so this allocated data register becomes an allocated prefetch buffer. This action may render non-allocated buffers (such as, for example, other data registers in the same non-volatile memory device and/or other data registers in other non-volatile memory devices in the data storage apparatus 101) as available to the storage apparatus 101 for other memory uses as needed. By storing prefetch data in a prefetch buffer, that prefetch data is readily available to a requesting host(s) 110 if that requesting host(s) 110 performs a subsequent memory read transaction request to the storage apparatus 101 wherein the subsequent memory read transaction request is subsequent to the prefetch data being stored in a prefetch buffer.

As mentioned above, the number of buffers allocated as prefetch buffers in the storage apparatus 101 may be selected at the time of manufacture, during initialization, or during the processing of memory operations (memory read transactions and/or memory write transactions). In one example, the memory interface 105 may initially allocate a selected number of prefetch buffers in the storage apparatus 101 at the time of initialization, and may then dynamically adjust the number of allocated prefetch buffers after initialization, depending on an amount of storage needed for data treated as prefetch data during the processing of memory read transaction requests.

Allocation of a prefetch buffer in the above manner is not to be taken as a limitation in any way. One of ordinary skill in the art having the benefit of this disclosure may use other techniques or procedures to allocate a prefetch buffer for storing prefetch data. For example, the data storage apparatus 101 may further include at least one HDD (hard disk drive). During initialization, the memory interface 105 (which is operating under program control of a prefetching engine 115 that is executed by a processor 120) may perform a prefetch of data from random areas in this HDD. This configuration option may be preferable when low latency performance during random access is required, such as in database applications. Another option may include configuring the memory interface 105 through program code (e.g., program code in the prefetching engine 115) to provide an option in the form of a vendor-specific interface command to allow the host 110 to select the prefetching method to be used by the memory interface 105 during initialization. For example, if the storage apparatus 101 will be used to store large files that tend to be stored sequentially, such as, for example, video files, then the memory interface 105 may be configured to prefetch sequential data from memory rather than random data. To reduce the initialization time of the data storage apparatus 101, these prefetching options during initialization may be disabled. In another possible configuration, the data storage apparatus 101 may support a host-controlled non-volatile cache command set. This command set allows a host 110 to keep selected data in a low latency non-volatile memory that may form a portion of a memory topology 145 that includes non-volatile memory devices in the storage apparatus 101, and this command set allows the selected data to be available as prefetch data during initialization. During initialization, the memory interface 105 (operating under program control in the prefetching engine 115) detects this selected data and automatically prefetches this selected data by storing the data in at least one prefetch buffer in the storage apparatus 101, depending the size of this selected data.

If the memory interface 105 receives a second memory read transaction request from the same host 110a (or a different host 110b), which is subsequent to a first memory read transaction request, and the data requested by the second memory read transaction request is currently available as a prefetch data in a prefetch buffer, then the memory interface 105 will initiate a forwarding transaction, reducing the read latency of the memory read transaction resulting from the second memory read transaction request. This forwarding transaction includes retrieving the prefetch data previously stored in a prefetch buffer, and forwarding the prefetch data to the requesting host 110.

As an example, if the memory interface 105 finds prefetch data during an internal read operation, then the memory interface 105 stores the prefetch data into a prefetch buffer in the data storage apparatus 101. Also, if the memory interface 105 receives a second memory read transaction request, which is subsequent to the earlier memory read transaction request for data, and this data has been previously stored as a prefetch data, and the prefetch data is stored in a prefetch buffer in a DMA controller in the storage apparatus 101 and/or in a prefetch buffer in a non-volatile memory controller in the storage apparatus 101 and/or in a data register (that is allocated as a prefetch buffer) in a non-volatile memory device in the storage apparatus 101, then the memory interface 105 initiates a forwarding transaction. The forwarding transaction may include obtaining prefetch data from the prefetch buffers. For example, if the data requested in the second memory read transaction has been stored as a prefetch data, and the prefetch data is stored in a prefetch buffer in a DMA controller in the storage apparatus 101 and/or in a prefetch buffer in a non-volatile memory controller in the storage apparatus 101 and/or in a data register (that is allocated as a prefetch buffer) in a non-volatile memory device in the storage apparatus 101, the forwarding transaction includes retrieving prefetch data from the prefetch buffer and forwarding prefetch data to the host 110 that sent the second memory read transaction request. In another example, if the data requested in the second memory read transaction request is stored as a prefetch data, and the prefetch data is stored in a prefetch buffer in a non-volatile memory controller in the storage apparatus 101 and/or in a data register that has been allocated as a prefetch buffer in the storage apparatus 101, then the forwarding transaction includes retrieving the prefetch data from the prefetch buffer and/or data register and forwarding the prefetch data to the host 110 that sent the second memory read transaction request. Thus, the memory interface 105 may perform an internal read operation and forwarding transaction using any of the allocated prefetch buffers, such as data registers (in non-volatile memory devices in the storage apparatus 101) and/or buffers (in non-volatile memory controllers and/or DMA controller(s) in the storage apparatus 101) that the memory interface 105 has allocated as prefetch buffers.

In an embodiment of the invention, the memory interface 105 comprises a system bus 125. The memory interface 105 further comprises a host interface 130, a local processor 120, a local memory 135, and a Direct Memory Access (DMA) controller 140, wherein these components are communicatively coupled to and/or electrically coupled to the system bus 125. In an embodiment of the invention, the prefetching engine 115 is stored in the local memory 135 and is executed by the local processor 120 to permit operations that are described in this disclosure including prefetching operations, internal read operations, and forwarding transactions that are described herein.

In an embodiment of the invention, the data storage apparatus 101 comprises one local processor 120 or a plurality of processors 120, one local memory 135 or a plurality of local memories 135, and one host interface 130 or a plurality of host interfaces 130.

One host 110 or a plurality of hosts 110 are coupled, via the host interface link 131, to the data storage apparatus 101. The one or more hosts 110 that are coupled to the storage apparatus 101 may vary in number as symbolically shown by the dot symbols 132. The number of host interface links 131 that can be coupled between a host(s) 110 and the data storage apparatus 101 may be one or more host interface links 131 and may vary as symbolically shown by the dot symbols 133. As an example, the hosts 110 comprise a host 110a and a host 110b that are both coupled, via the host interface link 131, to the storage apparatus 101. As another example, the hosts 110 comprise: (1) a host 110a that is coupled, via a first host interface link 131a, to the storage apparatus 101, and (2) a host 110b that is coupled, via a second host interface link 131b, to the storage apparatus 101. As another example, only a single host 110a is coupled, via the host interface link 131a, to the storage apparatus 101.

In another embodiment of the invention, at least one of the host interface links 131a or 131b may be data bus link (e.g., wired communication link) or a wireless communication link that communicatively couples the hosts 110a or 110b, respectively, to the data storage apparatus 101. The number of hosts 110 that can be communicatively coupled to the storage apparatus 101 may vary. Therefore, one or more hosts 110 can be communicatively coupled to the storage apparatus 101. A host 110 can be communicatively coupled to the storage apparatus 101 by a communication link such as, by way of example and not by way of limitation, a communication bus (or communication buses) or by a wireless communication link such as, by way of example and not by way of limitation, an optical communication link, a radio frequency (RF) communication link, or another type of wireless communication link.

The host 110 sends a memory read transaction request 142 to the data storage apparatus 101 for data located in a memory topology 145 in the storage apparatus 101. The memory topology 145 comprises a plurality of non-volatile memory devices and a plurality of non-volatile memory controllers. Operating under program control, the local processor 120 analyzes and responds to the memory read transaction request 142 by generating DMA instructions 198 that will cause the DMA controller 140 to read this data from the memory topology 145 through a non-volatile memory controller (or non-volatile memory controllers) in the storage apparatus 101. A non-volatile memory controller can be, for example, a flash memory controller. As will be discussed below, one or more non-volatile memory controllers will read the data from one or more memory devices that stores the data. If this data is available, the non-volatile memory controller retrieves (or non-volatile memory controllers retrieve) this data from one or more memory devices in the memory topology 145, and this data is then transferred by the DMA controller 140 to the local memory (system memory) 135, and eventually this data is transferred to the host 110 via the host interface 130. Data obtained in response to this memory read transaction request 142 is herein named "read data".

The local processor 120 also identifies "prefetch data". Prefetch data is any data currently stored in the memory topology 145 that meets a prefetch selection criterion. This prefetch selection criterion may include a relationship between the read data and any stored data in the memory topology 145. For example, this prefetch selection criterion may be met if stored data exists wherein the stored data has a memory address within a selected memory address range from the memory address of the read data. In another example, the memory interface 105 determines whether this prefetch selection criterion is met by determining whether any stored data exists in the memory topology 145 wherein the stored data has a memory address within the same page as a memory address associated with the read data. As similarly discussed above, the type of relationship between the read data and stored data is not intended to be limiting in any way. Any type of relationship may be used that increases the likelihood that the stored data selected for prefetching will be later requested by a host 110 coupled to the memory interface 105.

The local processor 120 may also perform an additional read operation, called an internal read operation. This internal read operation is a process executed by the local processor 120 to retrieve prefetch data from the memory topology 145. This internal read operation includes the local processor 120 sending an instruction 198 to the DMA controller 140 to retrieve (via a non-volatile memory controller or non-volatile memory controllers) prefetch data from the memory topology 145. For example, if the memory topology 145 is configured to address stored data by flash page, the instruction 198 contains the address of the specific flash page within a flash memory device that holds the prefetch data. The instruction 198 also causes the DMA controller 140 to retrieve (via a non-volatile memory controller or non-volatile memory controllers) prefetch data from the flash page and flash memory device identified by the address mentioned above.

When the DMA controller 140 receives the instruction 198, the instruction 198 causes the DMA controller 140 to use a non-volatile memory controller (or non-volatile memory controllers) to cause a non-volatile memory device (or non-volatile memory devices) to transfer the prefetch data. The internal read operation also includes the local processor 120 allocating a prefetch buffer or prefetch buffers to store the prefetch data. Allocating a buffer and/or a data register as a prefetch buffer may be performed statically, such as at the time of manufacture, performed dynamically by the local processor 120, or both. In one implementation, the number of buffers and/or data registers allocated as prefetch buffers depends on an amount of storage needed for the prefetch data. For example, the memory interface 105 may allocate a data register (in a non-volatile memory device) and a buffer (in a non-volatile memory controller) as storage space suitable for storing prefetch data. This action may also render non-allocated buffers, such as other data registers in the same non-volatile memory device and/or data registers in other non-volatile memory devices and the buffers in other non-volatile memory controllers to be available to the storage apparatus 101 for other memory uses. As discussed above, buffers allocated for storing prefetch data, such as a prefetch buffer in a non-volatile memory controller and/or a data register in a non-volatile memory device and/or a prefetch buffer 160 in the DMA controller 140, are called "prefetch buffers" in the storage apparatus 101. If a host 110 issues a second memory read transaction request 148 for data and this data has been previously stored as prefetch data in a prefetch buffer in the storage apparatus 101, the local processor 120 responds by retrieving the prefetch data from the prefetch buffer and by placing the prefetch data into the local memory 135. When the local processor 120 determines that the local memory 135 contains the prefetch data, the local processor 120 forwards the prefetch data from the local memory 135 to the host interface 130, which in turn transfers the prefetch data to the host 110. One of ordinary skill in the art having the benefit of this disclosure would readily recognize that rather than using a local memory 135 to store prefetch data, the prefetch data may instead be sent directly to the host 110 or processed in any other manner envisioned by a user. In this example, the non-volatile memory devices in the memory topology 145 function as mass storage devices. However, in another embodiment (not shown), these non-volatile memory devices may function as a cache to another type of mass storage device such as, for example, a set of HDDs arranged in a RAID (Redundant Array of Inexpensive Disks), JBOD ("just a bunch of disks"), or other configuration. As an example, this set of HDDs is not shown in the drawings to avoid overcomplicating the disclosure herein, but may be included as part of the memory topology 145.

In an embodiment of the invention, the memory interface 105 comprises an IO (input/output) non-volatile memory interconnect which can be embodied as a network of one or more DMA controllers, non-volatile memory bus links (or flash bus links), and non-volatile memory controllers, and/or as a point-to-point serial bus topology and/or network-like fabric, similar to the way the point-to-point serial bus topology and/or network-like fabric are disclosed in, for example, commonly-owned and commonly-assigned U.S. application Ser. No. 14/217,161, which is entitled A NETWORK OF MEMORY SYSTEMS. U.S. application Ser. No. 14/217,161 is hereby fully incorporated herein by reference.

In another embodiment of the invention, the memory interface 105 comprises a plurality of non-volatile memory controllers 150 (generally referred to as memory controllers 150 or flash memory controllers 150), a plurality of DMA (Direct Memory Access) controllers 140 (generally referred to as DMA controllers 140), and bus links or channels that couple these flash memory controllers 150 to each other, and/or that couple the non-volatile memory controllers 150 to the DMA controllers 140. The bus links or channels can use a standard bus specification or a proprietary specification such as the flashbus protocol.

In an embodiment of the invention, the plurality of non-volatile memory controllers 150 comprises a plurality of flash memory controllers or a plurality of another type of non-volatile memory controllers.

In the description herein, the elements 150 are shown as example elements 150a, 150b, 150c, 150d, and other similar numeral reference with the prefix "150". The element 150 is generally referred to as memory controller 150 or flash memory controller 150 for convenience. The element 150 can be a flash memory controller 150 or another type of memory controller 150 that can function with nonvolatile memory devices in a memory module, depending on the type of nonvolatile memory devices in a memory module that functions with the memory controller 150. The above numerical convention is similarly used for other elements with different numerical references in the drawing figures (e.g., the non-volatile memory controller buffers that are allocated as prefetch buffers are symbolized as buffers 155 and are specifically shown as buffers 155a through 155d).

The DMA controller 140 is coupled to at least one local processor 120, at least one local memory 135, and at least one host interface 130 via the system bus 125.

Figure 1B:
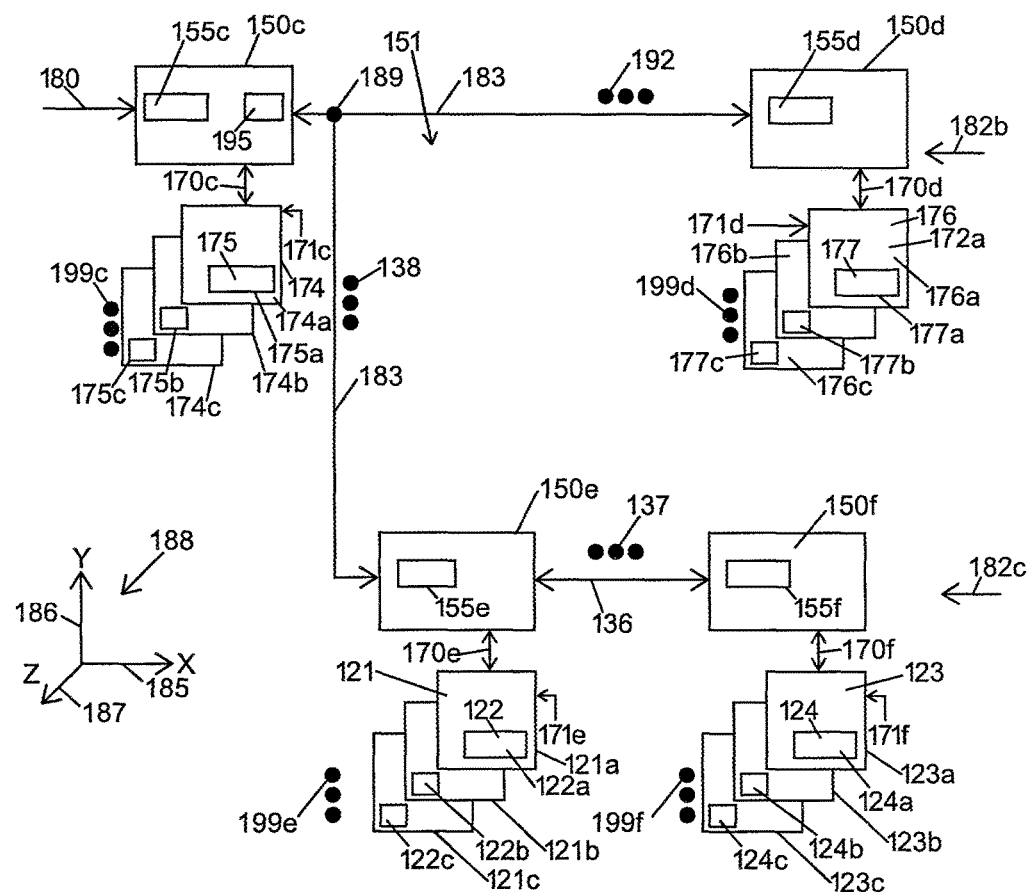
FIG. 1B is a block diagram of a branch of a serial sub-chain, in accordance with an embodiment of the invention.
Figure 1C:
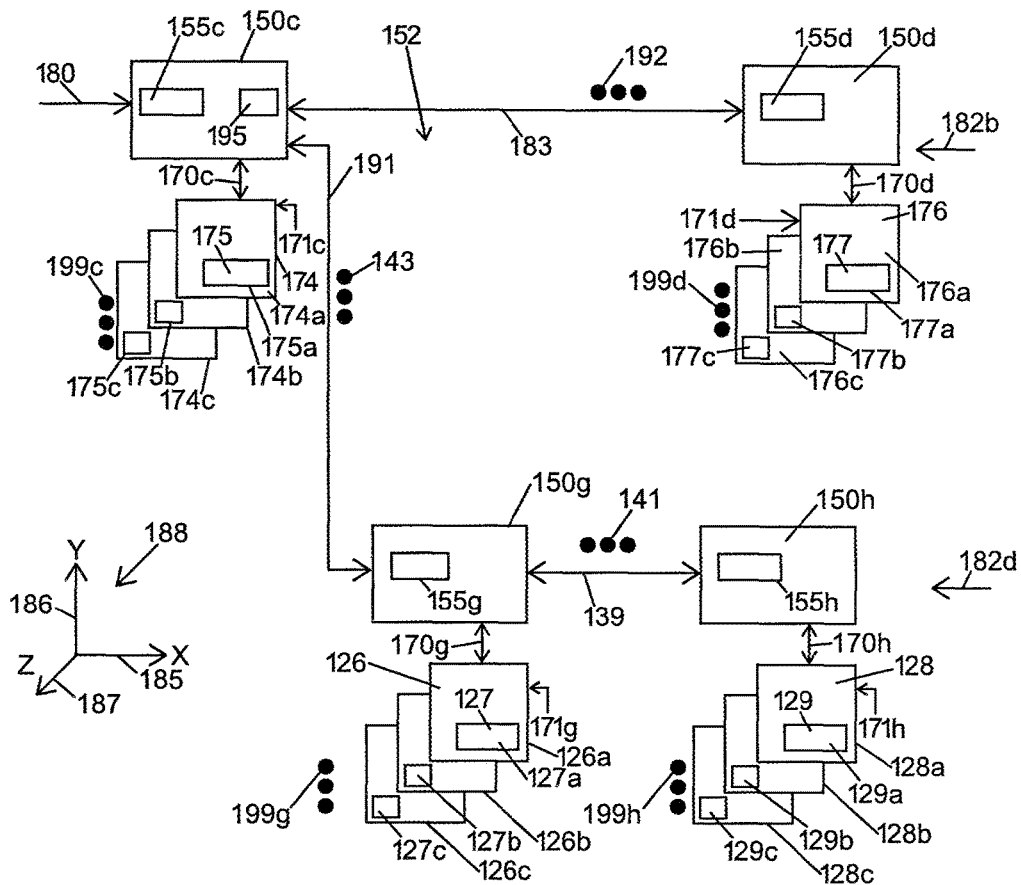
FIG. 1C is a block diagram of a branch of a serial sub-chain, in accordance with another embodiment of the invention.

Each non-volatile memory controller 150 comprises an associated memory controller buffer 155 (e.g., each flash memory controller 150 comprises an associated flash memory controller buffer 155). The memory interface 105, based on the operations of the processor 120 and prefetching engine 115, is configured to allocate at least some of the memory controller buffers 155 as prefetch buffers as will be similarly discussed below in various example operations. The memory interface 105 can also allocate other memory controller buffers 155 as shown in FIGS. 1B and 1C as prefetch buffers. The memory controller buffers in each of the drawing figures in this disclosure are generally referred to as non-volatile memory controller buffers (e.g., flash memory controller buffers).

In an embodiment of the invention, the storage apparatus 101 comprises a plurality of memory controllers 150. For example, the storage apparatus 101 comprises the memory controllers 150a, 150b, 150c, and 150d. The number of memory controllers 150 in the storage apparatus 101 may vary.

In an embodiment of the invention, the non-volatile memory controllers 150a, 150b, 150c, and 150d include the non-volatile memory controller buffers 155a, 155b, 155c, and 155d, respectively. The memory interface 105 allocates one or more of the non-volatile memory controller buffers 155a, 155b, 155c, and 155d as allocated prefetch buffers for storing prefetch data. Since the number of non-volatile memory controllers 150 may vary, the number of non-volatile memory controller buffers 155 (and the number of allocated prefetch buffers) may vary as well in the storage apparatus 101. The processor 120 executes the prefetching engine 115 in order to allocate any or all of the non-volatile memory controller buffers 155a, 155b, 155c, and 155d as allocated prefetch buffers.

The non-volatile memory devices 168a, 168b, and 168c include the data registers 167a, 167b, and 167c, respectively. Since the number of non-volatile memory devices 168 may vary, the number of data registers 167 may vary as well in the storage apparatus 101. The memory interface 105 allocates one or more of the data registers 167a, 167b, and 167c as allocated prefetch buffers for storing prefetch data. The processor 120 executes the prefetching engine 115 in order to allocate any of the data registers 167a, 167b, and 167c as allocated prefetch buffers.

The non-volatile memory devices 172a, 172b, and 172c include the data registers 173a, 173b, and 173c, respectively. Since the number of non-volatile memory devices 172 may vary, the number of data registers 173 may vary as well in the storage apparatus 101. The memory interface 105 allocates one or more of the data registers 173a, 173b, and 173c as allocated prefetch buffers for storing prefetch data. The processor 120 executes the prefetching engine 115 in order to allocate any of the data registers 173a, 173b, and 173c as allocated prefetch buffers.

The non-volatile memory devices 174a, 174b, and 174c include the data registers 175a, 175b, and 175c, respectively. Since the number of non-volatile memory devices 174 may vary, the number of data registers 175 may vary as well in the storage apparatus 101. The memory interface 105 allocates one or more of the data registers 175a, 175b, and 175c as allocated prefetch buffers for storing prefetch data. The processor 120 executes the prefetching engine 115 in order to allocate any of the data registers 175a, 175b, and 175c as allocated prefetch buffers.

The non-volatile memory devices 176a, 176b, and 176c include the data registers 177a, 177b, and 177c, respectively. Since the number of non-volatile memory devices 176 may vary, the number of data registers 177 may vary as well in the storage apparatus 101. The memory interface 105 allocates one or more of the data registers 177a, 177b, and 177c as allocated prefetch buffers for storing prefetch data. The processor 120 executes the prefetching engine 115 in order to allocate any of the data registers 177a, 177b, and 177c as allocated prefetch buffers.

Each DMA controller 140 comprises an associated DMA controller buffer 160. In the example of FIG. 1A, the storage apparatus 101 comprises the DMA controller 140a that includes the DMA controller buffer 160a. The memory interface 105 allocates the DMA controller buffer 160a as an allocated prefetch buffer for storing prefetch data. The processor 120 executes the prefetching engine 115 in order to allocate the DMA controller buffer 160a as an allocated prefetch buffer.

The memory interface 105, based on the operations of the processor 120 and prefetching engine 115, is configured to allocate one or more of the DMA controller buffers 160 as prefetch buffers as will be similarly discussed below in various example operations. The memory interface 105 can allocate the DMA controller buffers 160 (as shown in FIGS. 1A, 2A, 3, and 4) as prefetch buffers. The DMA controller buffers in each of the drawing figures in this disclosure are generally referred to as DMA controller buffers 160.

The number of DMA controllers 140 in the storage apparatus 101 may vary. Since the number of DMA controllers 140 may vary, the number of DMA controller buffers 160 may vary as well in the storage apparatus 101.

In an embodiment of the invention, the storage apparatus 101 comprises a prefetch buffer topology 165 that comprises the buffers 155 in the flash memory controllers 150, the buffer 160 in the DMA controller 140, and/or the data registers 167 in the flash memory devices 168 in the storage apparatus 101. If the memory interface 105 allocates any of the buffers 155, buffer 160, or data registers 167 as prefetch buffers, then the buffers 155, buffer 160, or data registers 167 can each store prefetch data. In an embodiment of the invention, the memory interface 105 can also allocate memory space 134 in the system memory 135 as a prefetch buffer for storing prefetch data, in addition to the memory interface 105 allocating any of the buffers 155, buffer 160, and/or data registers 167 as prefetch buffers for storing prefetch data. Additionally or alternatively, data registers in other non-volatile memory devices (e.g., devices 172a, 172b, and/or 172c) in the memory topology 145 may be allocated as prefetch buffers. The processor 120 executes the prefetching engine 115 in order to allocate the memory space 134 in the local memory 135 as an allocated prefetch buffer and/or in order to allocate the data registers in other non-volatile memory devices as allocated prefetch buffers. The local memory 135 can be any form of memory, such as, for example, any one of the various types of DRAM (dynamic random access memory), a RAM (random access memory), a non-volatile memory, or another suitable type of memory devices.

In an embodiment of the invention, the storage apparatus 101 comprises non-volatile memory modules 171 (e.g., flash memory modules 171) that each includes at least one non-volatile memory device (e.g., flash memory device). For example, the storage apparatus 101 comprises non-volatile memory modules (e.g., flash memory modules) 171a, 171b, 171c, and 171d that are coupled to the non-volatile memory controllers (e.g., flash memory controllers) 150a, 150b, 150c, and 150d, respectively. The number of non-volatile memory modules 171 (e.g., flash memory modules 171) and the number of non-volatile memory devices (e.g., flash memory devices) in the storage apparatus 101 may vary.

In the storage apparatus 101, one or more of the non-volatile memory controllers (e.g., flash memory controllers) and one or more of the non-volatile memory devices (e.g., flash memory devices) need not be directly connected to the DMA controller 140. The point-to-point non-volatile memory controller topology in the storage apparatus 101 comprises a plurality of non-volatile memory controllers (e.g., flash controller modules or flash controllers), and the non-volatile memory controllers are coupled (directly or indirectly) to the DMA controller 140 in order to advantageously allow a greater plurality of non-volatile memory devices (e.g., flash devices) to be accessed that are otherwise not physically possible due to package limitations of a controller chip.

A non-volatile memory controller 150 (e.g., controller 150a) can be any non-volatile memory interface controller that can function with a non-volatile memory device (e.g., flash device or another type of non-volatile memory device) in the storage apparatus 101.

The non-volatile memory controller 150a is coupled via a memory bus 170a (or via a plurality of memory buses 170a) to a non-volatile memory module 171a. As an example, the non-volatile memory module 171a comprises a plurality of non-volatile memory devices 168 that may vary in number (e.g., non-volatile memory devices 168a, 168b, and 168c). As another example, the non-volatile memory module 171a comprises a single non-volatile memory device (e.g., non-volatile memory device 168a).

The non-volatile memory controller 150b is coupled via a memory bus 170b (or via a plurality of memory buses 170b) to a non-volatile memory module 171b. As an example, the non-volatile memory module 171b comprises a plurality of non-volatile memory devices 172 that may vary in number (e.g., non-volatile memory devices 172a, 172b, and 172c). As another example, the non-volatile memory module 171b comprises a single non-volatile memory device (e.g., non-volatile memory device 172a).

The non-volatile memory controller 150c is coupled via a memory bus 170c (or via a plurality of memory buses 170c) to a non-volatile memory module 171c. As an example, the non-volatile memory module 171c comprises a plurality of non-volatile memory devices 174 that may vary in number (e.g., non-volatile memory devices 174a, 174b, and 174c). As another example, the non-volatile memory module 171c comprises a single non-volatile memory device (e.g., non-volatile memory device 174a).

The non-volatile memory controller 150d is coupled via a memory bus 170d (or via a plurality of memory buses 170d) to a non-volatile memory module 171d. As an example, the non-volatile memory module 171d comprises a plurality of non-volatile memory devices 176 that may vary in number (e.g., non-volatile memory devices 176a, 176b, and 176c). As another example, the non-volatile memory module 171d comprises a single non-volatile memory device (e.g., non-volatile memory device 176a).

The DMA controller 140a is directly coupled by a DMA-controller-to-Memory-controller bus 178 to the non-volatile memory controller 150a. The bus 178 is a signal path for transmitting data, control signals, and other suitable signals between the DMA controller 140a and the non-volatile memory controller 150a.

In the storage apparatus 101, at least two non-volatile memory controllers (e.g., flash controllers) are indirectly coupled to the DMA controller 140a. For example, the non-volatile memory controllers 150b and 150c are indirectly coupled to the DMA controller 140a via the non-volatile memory controller 150a wherein the non-volatile memory controller 150a is between the DMA controller 140a and the non-volatile memory controllers 150b and 150c. Therefore, the buffer topology 165 is formed by multiple components that form a network-like fabric memory interface that will be discussed below. This network-like fabric memory interface comprises an IO (input/ output) non-volatile memory interconnect (flash interconnect) which can be embodied as a network of DMA controllers, flashbus links (or non-volatile memory bus links), and flashbus (non-volatile memory) controllers, and/or as a point-to-point serial bus topology and/or network-like fabric.

A given memory transaction in the storage apparatus 101 comprises, for example, storing data from a host 110 to a non-volatile memory device (e.g., flash device) in a selected serial chain (or selected serial sub-chain) in the memory topology 145 in the storage apparatus 101 or reading data from a non-volatile memory device in a selected serial chain (or selected serial sub-chain) in the memory topology 145 in the storage apparatus 101, wherein the data read from the non-volatile memory device is transmitted by the storage apparatus 101 to a requesting host 110. As an example, in a given memory transaction, a given non-volatile memory controller (e.g., flash controller) will write data from a host 110 to a non-volatile memory device (e.g., flash memory device) coupled to that given non-volatile memory controller, or that given non-volatile memory controller will read data from a non-volatile memory device coupled to that given non-volatile memory controller wherein that data that is read from the non-volatile memory device is transmitted by the storage apparatus 101 to a requesting host 110.

The non-volatile memory controller 150a is coupled via a channel 180 to the non-volatile memory controller 150b. The channel 180 comprises one or more point-to-point lines which can be, for example, a data bus that uses standard specification or a bus that uses a proprietary protocol (e.g., one flashbus or a plurality of flashbuses), wherein the channel 180 is configured for transmitting signals such as command, status, response, address, and data bytes between the non-volatile memory controllers 150a and 150b. The two non-volatile memory controllers 150a and 150b can transmit the above-mentioned signals to each other via the channel 180 between the two non-volatile memory controllers 150a and 150b. A non-volatile memory controller (controllers 150a or 150b) can process the above-mentioned signals via cutthrough, store forward, or/and buffering.

The non-volatile memory controller 150a is coupled via the same channel 180 to the non-volatile memory controller 150c. The channel 180 comprises one or more point-to-point lines which can be, for example, one flashbus or a plurality of flashbuses for transmitting signals such as command, status, response, address, and data bytes between the non-volatile memory controllers 150a and 150c. The two non-volatile memory controllers 150a and 150c can transmit the above-mentioned signals to each other via the channel 180 between the two non-volatile memory controllers 150a and 150c. A non-volatile memory controller (controllers 150a or 150c) can process the above-mentioned signals via cut-through, store forward, or/and buffering.

The non-volatile memory controllers 150b and 150c are coupled by the channel 180 to the non-volatile memory controller 150a via an electrical node 181 which can be internal in the non-volatile memory controller 150a or external to the non-volatile memory controller 150a.

The non-volatile memory controller 150a is directly coupled via the DMA-controller-to-Memory-controller bus 178 to the DMA controller 140a. It is also noted that the bus 178 that connects the non-volatile memory controller 150a and the DMA controller 140a also transmits signals such as command, status, response, address, and data bytes between the non-volatile memory controller 150a and the DMA controller 140a. The DMA controller 140a can also process the above-mentioned signals via cutthrough, store forward, or/and buffering.

The storage apparatus 101 comprises a first serial chain 182 and this first serial chain 182 comprises the DMA controller 140a, the bus 178, the non-volatile memory controller 150a, the channel 180, the non-volatile memory controller 150b, and the non-volatile memory controller 150c, and the non-volatile memory devices that are coupled to the non-volatile memory controllers in the first serial chain 182.

The non-volatile memory controller 150c is coupled by a channel 183 to the non-volatile memory controller 150d. The channel 183, the non-volatile memory controller 150d, and any non-volatile memory device that is coupled to the non-volatile memory controller 150d may each be elements that are included in the first serial chain 182 as well. The channel 183 can perform at least some of the above discussed operations of the channel 180 in order to permit the non-volatile memory controller 150c and the non-volatile memory controller 150d to communicate with each other. For example, the channel 183 comprises one or more point-to-point lines which can be, for example, a data bus that uses standard specification or a bus that uses a proprietary protocol (e.g., one flashbus or a plurality of flashbuses), wherein the channel 183 is configured for transmitting signals such as command, status, response, address, and data bytes between the non-volatile memory controller 150c and 150d. The two non-volatile memory controllers 150c and 150d can transmit the above-mentioned signals to each other via the channel 183 between the two non-volatile memory controllers 150c and 150d. A non-volatile memory controller (controllers 150c or 150d) can process the above-mentioned signals via cutthrough, store forward, or/and buffering.

In an embodiment of the invention, the first serial chain 182 comprises a first serial sub-chain 182a and a second serial sub-chain 182b.

In an embodiment of the invention, the channel 183 and the non-volatile memory controller 150d are included in the first serial chain 182 (and second serial sub-chain 182b) or can be omitted from the first serial chain 182 (and second serial sub-chain 182b). The memory modules 171a, 171b, and 171c are included in the first serial chain 182. The memory module 171d may be included in the first serial chain 182 (and second serial sub-chain 182b) if the non-volatile memory controller 150d is included in the first serial chain 182 (and second serial sub-chain 182b).

In an embodiment of the invention, the first serial sub-chain 182a comprises the non-volatile memory controller 150a, the memory module 171a, the channel 180, the non-volatile memory controller 150b, and the memory module 171b, and the second serial sub-chain 182b comprises the non-volatile memory controller 150a, the memory module 171a, the channel 180, the non-volatile memory controller 150c and the memory module 171c. The second serial sub-chain 182b can further include the channel 183, the non-volatile memory controller 150d, and the memory module 171d.

The channel 180 that connects the non-volatile memory controller 150a to the non-volatile memory controllers 150b and 150c is a first type of signal path layout 184.

In an embodiment of the invention, the serial sub-chain 182a is expandable as now discussed. A similar first type of signal path layout 184 can be coupled between the non-volatile memory controller 150b and at least another non-volatile memory controller in the serial sub-chain 182a or another type of signal path layout (e.g., similar to a second type of signal path layout 284 in FIG. 2A) can be coupled between the non-volatile memory controller 150*b* and at least another non-volatile memory controller in the serial sub-chain 182*a*. At least one more of a given type of signal path layout (e.g., similar to layout 184 or layout 284) and at least one more non-volatile memory controller can further be added in the serial sub-chain 182*a* so that serial chain 182 (and/or serial sub-chain 182*a*) is expanded in a given direction (e.g., X-direction 185). The X-direction 185, Y-direction 186, and Z-direction 187 form a three-dimensional coordinate system 188. In the three-dimensional coordinate system 188, each of the X-axis 185 (X-direction 185), Y-axis 186 (Y-direction 186), and Z-axis 187 (Z-direction 187) are orthogonal or perpendicular with respect to each other.

However, any serial chain (e.g., serial chain 182) and any serial sub-chain (e.g., serial sub-chain 182*a* and/or serial sub-chain 182*b*) in the data storage apparatus 101 may be disposed in any direction such as, for example, directions that are offset from and/or that are on an angular offset from the X-axis 185, Y-axis 186, and/or Z-axis 187 to, for example, satisfy packaging constraints or other physical constraints.

In an embodiment of the invention, the serial chain 182 is a uni-directional chain if the serial sub-chains 182*a* and 182*b* are in a same direction (e.g., one of X-direction 185, Y-direction 186, or Z-direction 187). Therefore, the prefetch buffers (as discussed below) in the serial chain 182 are uni-directional prefetch buffers in a same direction (e.g., one of X-direction 185, Y-direction 186, or Z-direction 187).

In another embodiment of the invention, the serial chain 182 is a multi-directional (multiple directional) chain if the serial sub-chains 182*a* and 182*b* are in different directions (e.g., the sub-chain 182*a* is in the X-direction 185 and the sub-chain 182*b* is in the Y-direction 186; or the sub-chain 182*a* is in the X-direction 185 and the sub-chain 182*b* is in the Z-direction 187; or the serial sub-chain 182*a* is in the Y-direction 186 and the serial sub-chain 182*b* is in the Z-direction 187). Therefore, the prefetch buffers (as discussed below) in the serial chain 182 are uni-directional prefetch buffers in a same direction (e.g., one of X-direction 185, Y-direction 186, or Z-direction 187) or are multi-directional prefetch buffers.

Additionally or alternatively, the serial sub-chain 182*b* is expandable as now discussed. A similar first type of signal path layout 184 can be coupled between the non-volatile memory controller 150*d* and at least another non-volatile memory controller in the serial sub-chain 182*b* or another type of signal path layout (e.g., similar to a second type of signal path layout 284 in FIG. 2A) can be coupled between the non-volatile memory controller 150*d* and at least another non-volatile memory controller in the serial sub-chain 182*b*. At least one more of a given type of signal path layout (e.g., similar to layout 184 or layout 284) and at least one more non-volatile memory controller can further be added in the serial sub-chain 182*b* so that serial chain 182 (and/or serial sub-chain 182*b*) is expanded in a given direction (e.g., X-direction 185).

Additionally or alternatively, the serial sub-chain 182*b* is expandable as now discussed. A similar first type of signal path layout 184 can be coupled between the non-volatile memory controller 150*c* and at least another non-volatile memory controller in a serial sub-chain branch 151 (FIG. 1B) or another type of signal path layout (e.g., similar to a second type of signal path layout 284 in FIG. 2A) can be coupled between the non-volatile memory controller 150*c* and at least another non-volatile memory controller in a serial sub-chain branch 152 (FIG. 1C). This at least another non-volatile memory controller can be coupled to the channel 183 via the node 189 so as to expand the serial chain 182 via the serial sub-chain branch 151 (FIG. 1B) in any given direction (e.g., direction 185, direction 186, or direction 187). Therefore, this additional branch 151 could be configured from the non-volatile memory controller 150*c* via the node 189 to further expand the serial chain 182 with at least an additional prefetch buffer that is included in the at least one non-volatile memory controller and/or in the at least one non-volatile memory device in this additional branch 151, wherein this at least additional prefetch buffer is configured to store prefetch data. In this example, wherein this additional branch 151 (FIG. 1B) is connected to the node 189, this additional branch 151 will have a layout that is similar to the layout 184 in FIG. 1A.

Figure 2A:
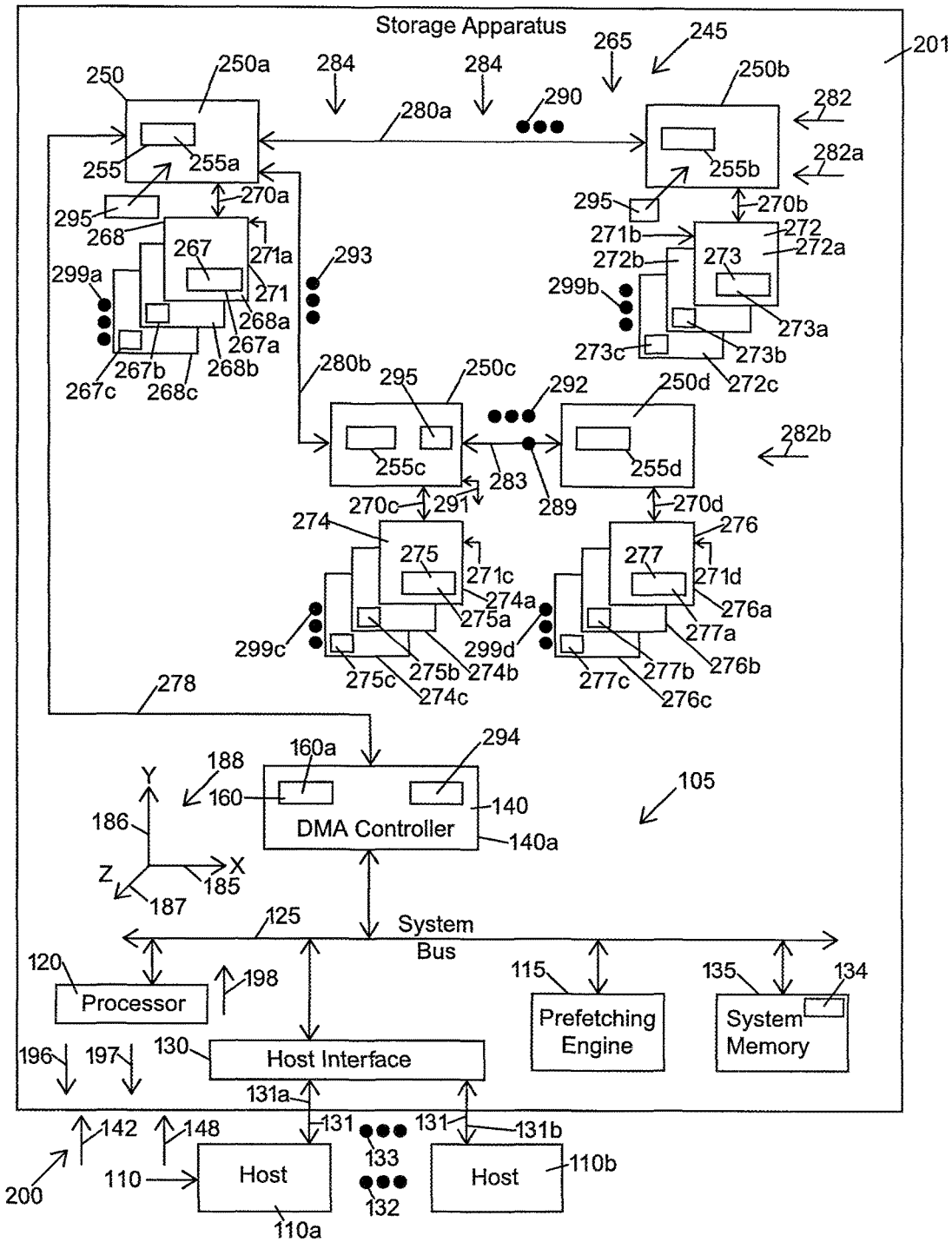
FIG. 2A is a block diagram of a storage system, in accordance with another embodiment of the invention.

Alternatively, a serial sub-chain branch 152 (FIG. 1C) could be configured directly from the non-volatile memory controller 150*c* to further expand the serial chain 182 with at least an additional prefetch buffer that is included in the at least one non-volatile memory controller and/or in the at least one non-volatile memory device in this additional branch 152, wherein this at least additional prefetch buffer is configured to store prefetch data; in the example wherein this additional branch 152 could be configured directly from the non-volatile memory controller 150*c* via the link 191, this additional branch 152 would have a layout that is similar to the layout 284 in FIG. 2A. The link 191 could be similar to the link 280*b* in FIG. 2A that forms a serial sub-chain that is similar to the serial sub-chain 282*b*. This at least another non-volatile memory controller can be coupled to the channel 191 so as to expand the serial sub-chain 182 via the serial sub-chain branch 152 (FIG. 1C) in any given direction (e.g., direction 185, direction 186, or direction 187).

Handshaking and data transmission between two non-volatile memory controllers (e.g., non-volatile memory controllers 150*a* and 150*b*), as well as handshaking and data transmission between a non-volatile memory controller (e.g., non-volatile memory controller 150*a*) and a DMA controller (e.g., DMA controller 140*a*) can be performed by different IC protocols. A non-volatile memory controller (e.g., controller 150*a*) can receive and transmit command, status, response, address, and data bytes to and from a DMA controller (e.g., controller 140*a*). A non-volatile memory controller (e.g., controller 150*a*) can also receive and transmit sideband signals to and from a DMA controller (e.g., controller 140*a*), wherein the sideband signals may be, for example, arbitration signals, messaging signals, and/or protocol handshakes.

Any given non-volatile memory controller (e.g., controller 150*a*) checks information in an incoming signal (e.g. incoming command, status, response, address, and/or data bytes) or in an incoming sideband signal in order to determine if the incoming signal (e.g., command, status, response, address, and/or data bytes and/or sideband signal) is intended (or is not intended) for the given non-volatile memory controller that is receiving a signal. If so, then the given non-volatile memory controller (that received a signal) will accordingly process the received incoming signal such as an incoming command, status response, address, and/or data bytes and/or sideband signal. If not, then the given non-volatile memory controller (that received the incoming signal) will then pass the aforementioned received incoming signal (e.g., an incoming command, status, response, address, and/or data bytes and/or sideband signal) to another given non-volatile memory controller in the same serial chain (e.g., a non-volatile memory controller 150*b* that is coupled via the channel 180 to the given receiving non-volatile memory controller 150*a*). A non-volatile memory controller can pass an incoming signal (e.g., incoming command, status, response, address and/or data bytes and/or sideband signal) to another non-volatile memory controller in the same serial chain via cutthrough, store forward, or buffering.

Other IO protocols may be alternatively used by the non-volatile memory controller (e.g., controllers 150*a* and 150*b*) and DMA controllers (e.g., controller 140*a*) in the transmission and reception of signals.

The number of non-volatile memory controllers and non-volatile memory modules in a given serial chain may vary. For example, the serial chain 182 comprises a single non-volatile memory controller 150*a*. As another example, the serial chain 182 comprises two or more (a plurality of) non-volatile memory controllers (e.g., controllers 150*a* and 150*b*). The number of non-volatile memory controllers in the serial chain 182 (and serial sub-chain 182*a*) may vary as symbolically shown by the dot symbols 190. If the serial sub-chain 182*a* includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 171*a*, 171*b*, 171*c*, or 171*d*) in the storage apparatus 101, the at least additional non-volatile memory device in the additional non-volatile memory module can store write data, cache data, return read data, and perform other flash memory device functions as, for example, discussed herein.

As another example, the serial sub-chain 182*b* comprises two or more (a plurality of) non-volatile memory controllers (e.g., controllers 150*a* and 150*c*). The number of non-volatile memory controllers in the serial chain 182 (and serial sub-chain 182*b*) may vary as symbolically shown by the dot symbols 192. The non-volatile memory controllers 150*c* and 150*d* are communicatively and/or electronically coupled by the channel 183. If the serial sub-chain 182*b* includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 171*a*, 171*b*, 171*c*, or 171*d*) in the storage apparatus 101, the at least additional non-volatile memory device in the additional non-volatile memory module can store write data, cache data, return read data, and perform other flash memory device functions as, for example, discussed herein.

The number of serial sub-chains in the serial chain 182 may vary as symbolically shown by the dot symbols 193.

The DMA controller 140*a* and any non-volatile memory controller that is directly or indirectly coupled to the DMA controller 140*a* are all communicatively or/and electrically coupled together in the serial chain 182. For example, the DMA controller 140*a*, the bus 178, the non-volatile memory controller 150*a*, the channel 180, the non-volatile memory controller 150*b*, and the non-volatile memory controller 150*c* are all communicatively or/and electrically coupled together. As another example, the DMA controller 140*a*, the channel 178, the non-volatile memory controller 150*a*, the channel 180, the non-volatile memory controller 150*b*, the non-volatile memory controller 150*c*, the channel 183, and the non-volatile memory controller 150*d* are all communicatively or/and electrically coupled together.

At least one serial chain (and/or at least one serial sub-chain) in the buffer topology 165 (e.g., serial chain 182 and/or serial chain 182*a* and/or serial sub-chain 182*b* and/or another serial chain and/or another serial sub-chain in the buffer topology 165) may include non-volatile memory controllers that vary in number in the X-direction (first direction) 185, Y-direction (second direction) 186, and/or Z-direction (third direction) 187. Therefore, one or more additional non-volatile memory controllers can be added to a given serial chain (or a given serial sub-chain) in the X-direction 185, Y-direction 186, and/or Z-direction 187 in the buffer topology 165.

Additionally, the buffer topology 165 can be expanded in the X-direction 185, Y-direction 186, and/or Z-direction 187 by adding at least an additional DMA controller in a storage apparatus as will be discussed below with reference to FIGS. 3 and 4 and by adding one or more additional non-volatile memory controllers coupled to the at least additional DMA controller and a non-volatile memory module is coupled to that one or more additional non-volatile memory controllers.

Other variations of the directions of the serial chain 182 and serial sub-chains 182*a* and/or 182*b* in the buffer topology 165 are possible in an embodiment of the invention.

As an example, any given serial sub-chain in the storage apparatus 101 can be uni-directional or multi-directional. For example, the serial sub-chain 182*b* is a uni-directional serial sub-chain if the channels 180 and 183 are disposed in a same direction (e.g., X-direction 185, Y-direction 186, or Z-direction 187). Since the serial sub-chain 182*b* is uni-directional, all allocated prefetch buffers in the sub-chain 182*b* are uni-directional allocated prefetch buffers (e.g., at least two of the prefetch buffer 155*c*, prefetch buffer 155*d*, data registers 175*a*, 175*b*, or 175*c*, and/or data registers 177*a*, 177*b*, or 177*c*). As another example, the serial sub-chain 182*b* is a multi-directional sub-chain if the channels 180 and 183 are disposed in two different directions (e.g., the channel 180 is disposed in the X-direction 185 and the channel 183 is disposed in the Y-direction 186). Since the serial sub-chain 182*b* is multi-directional, at least two allocated prefetch buffers in the sub-chain 182*b* are multi-directional allocated prefetch buffers (e.g., prefetch buffers 155*c* and 155*d* are multi-directional allocated prefetch buffers; e.g., data registers 175*a* and 177*a* are multi-directional allocated prefetch buffers; e.g., data registers 175*b* and 177*b* are multi-directional allocated prefetch buffers; and/or e.g., data registers 175*c* and 177*c* are multi-directional allocated prefetch buffers). Since a serial chain and/or a serial sub-chain in the memory topology 145 can be uni-directional or multi-directional, the serial chain and/or serial sub-chain can be appropriately disposed or configured to satisfy package constraints and/or other physical constraints that may be applicable to the memory topology 145. Similarly, since a serial chain and/or a serial sub-chain in the memory topology 145 can be uni-directional or multi-directional, buffers in the buffer topology 165 can be appropriately disposed or configured to satisfy package constraints and/or other physical constraints that may be applicable to the memory topology 145.

A DMA descriptor 194 is loaded by a local processor (e.g., processor 120 in FIG. 1A) into a DMA controller memory of the DMA controller 140*a*, in one example. In one example, the local processor initially creates a DMA descriptor 194. As another example, the local processor has a template in a locally accessible memory (e.g., RAM) that the local processor can access and control, and the local processor creates a DMA descriptor 194 from that template. In another example, the local processor 120 can instead inform a DMA controller 140a to read a DMA descriptor 194 in a given memory address of a memory (e.g., RAM) and the DMA controller 140a will subsequently read the DMA descriptor 194 in that given memory address.

The DMA descriptor 194 is configurable via software (or firmware) that is executed by the local processor. The DMA descriptor 194 comprises control information that will control a given memory transaction to be performed by the DMA controller 140a. As an example, the DMA controller 140a intelligently determines and intelligently selects one of the serial chains and one of the serial sub-chains (e.g., serial chain 182 and/or serial sub-chain 182a and/or serial sub-chain 182b) for use in a given memory transaction.

As an example, the control information in the descriptor 194 includes at least some of the following: the amount of bytes of the data to be transferred in the memory transaction, the source address of the data to be transferred in the memory transaction, the destination address of the data to be transferred in the memory transaction, the serial chain identifier that identifies the serial chain used for the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140a and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a DMA controller 140a may include a command/status register which is configurable via software (or firmware) that is executed by a local processor (e.g., IO processor 120). The register includes control information 194 used for the memory transaction and will advantageously relieve a firmware of having to write a descriptor that would have this control information 194.

In an embodiment of the invention, the descriptor 194 is passed from the DMA controller 140a to (and loaded into) a non-volatile memory controller (e.g., non-volatile memory controller 150a) that is directly coupled to the DMA controller 140a, and the non-volatile memory controller 150a will pass the descriptor 194 to the next non-volatile memory controllers (e.g., non-volatile memory controllers 150b and 150c) that are coupled to the non-volatile memory controller 150a in the buffer topology 165. A non-volatile memory controller in a serial chain and serial sub-chain will pass the descriptor 194 to the next given non-volatile memory controller in the given serial chain and given serial sub-chains and the descriptor 194 is passed serially along the given serial chain and given serial sub-chains.

In another embodiment of the invention, a derivative descriptor 195 is passed from the DMA controller 140a to a non-volatile memory controller that is directly coupled to the DMA controller 140a, and the non-volatile memory controller will pass the derivative descriptor to the next non-volatile memory controller in a given serial chain and given serial sub-chains and the derivative descriptor 195 is passed serially along the given serial chain and given serial sub-chains, as similarly discussed above.

The derivative descriptor 195 is a derivative of the descriptor 194 (or is extracted by the DMA controller 140a from the descriptor 194). After the descriptor 194 is loaded into the DMA controller 140a, the DMA controller 140a can parse the descriptor 194 in order to create the derivative descriptor 195 (or command 195 or sequence 195 or signal 195). The block 195 can also be a complete descriptor such as the descriptor 194 instead of a derivative descriptor. A descriptor 195 (or derivative descriptor 195 or command 195 or sequence 195 or signal 195) is intelligible to a given non-volatile memory controller (e.g., non-volatile memory controller 150a) in the memory topology 145 so that the given non-volatile memory controller can perform a memory transaction.

A given non-volatile memory controller executes the derivative descriptor 195 or descriptor 194 to permit the given non-volatile memory controller to perform operations such as, for example, the given non-volatile memory controller storing data from a host into one or more non-volatile memory devices that are coupled to the given non-volatile memory controller or the given non-volatile memory controller reading stored data from one or more non-volatile memory devices that are coupled to the given non-volatile memory controller wherein the stored data read from a non-volatile memory device is passed by the storage apparatus 101 to a host 110. Alternatively or additionally, the non-volatile memory controller uses a command 195 and/or sequence 195 and/or signal 195 to perform an operation related to a memory transaction.

A given non-volatile memory controller executes the derivative descriptor 195 or descriptor 194 to permit the given non-volatile memory controller to intelligently select a serial sub-chain for performing a given memory transaction. For example, the non-volatile memory controller 150a intelligently selects the serial sub-chain 182a or the serial sub-chain 182b for performing a given memory transaction in the storage apparatus 101. Assume in this example that the non-volatile memory controller 150a has selected the serial sub-chain 182b for performing a given memory transaction. For a given memory transaction that is a write operation, the non-volatile memory controller 150c, for example, in the selected serial sub-chain 182b, can execute a descriptor 194 (or derivative descriptor 195) in a memory of the non-volatile memory controller 150c so that the non-volatile memory controller 150c stores write data (e.g., from a host) into a non-volatile memory device (e.g., non-volatile memory device 174a) that is coupled to the non-volatile memory controller 150c. On the other hand, for a given memory transaction that is a read operation, the non-volatile memory controller 150c, for example, in the selected serial sub-chain 182b can execute a descriptor 194 (or a derivative descriptor 195) in a memory of the non-volatile memory controller 150c so that the non-volatile memory controller 150c reads stored data from a non-volatile memory device (e.g., non-volatile memory device 174a) that is coupled to the non-volatile memory controller 150c, and the storage apparatus 101 passes the stored data from the non-volatile memory device 174a to a host 110. Of course, the nonvolatile memory controller 150a can execute the descriptor 194 (or a derivative descriptor 195) so that the non-volatile memory controller 150a can intelligently select another serial sub-chain (e.g., serial sub-chain 182a) for performing a given memory transaction. Therefore, the descriptor 194 (or derivative descriptor 195) comprises control information that will control a given memory transaction to be performed by the non-volatile memory controller 150a. As an example, the non-volatile memory controller 150a intelligently determines and intelligently selects one of the serial sub-chains 182a or 182b for use in a given memory transaction, or the non-volatile memory controller 150a can write and store data into a non-volatile memory device (e.g., non-volatile memory device 168a) or can read stored data from a non-volatile memory device (e.g., non-volatile memory device 168a). Of course, more than two serial sub-chains can be directly coupled to (or associated with) the non-volatile memory controller 150a, and the non-volatile memory controller 150a intelligently selects a serial sub-chain among the more than two serial sub-chains for use in a given memory transaction.

As an example, the control information (in a descriptor 194 or a derivative descriptor 195) includes at least some of the following: the amount of bytes of the data to be transferred in the memory transaction, the source address of the data to be transferred in the memory transaction, the destination address of the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140a and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a non-volatile memory controller 150a may include a command/status register which is configurable via software (or firmware) that is executed by a local processor (e.g., processor 120). The register includes control information (in the descriptor 194 or the derivative descriptor 195) used for the memory transaction and will advantageously relieve a firmware of having to write a descriptor that would have this control information in the descriptor 194 or derivative descriptor 195.

As discussed above, the block 195 may be a descriptor, derivative descriptor, command or group or commands, sequence, or signal wherein the block 195 is transmitted between two controllers (e.g., between a DMA controller and a non-volatile memory controller or between two non-volatile memory controllers).

A derivative descriptor transmitted between two controllers may comprise some intact portions of the original descriptor 195 provided to the DMA controller 140 and some modified portions of the original descriptor 194. The intact portions may be, for example, the source address and the destination address (flash device address). A modified portion may include, for example, tagging (e.g., a tag that associates a reply with a previous command) and/or particular information in the handshaking between a DMA controller and a non-volatile memory controller or handshaking between two non-volatile memory controllers.

A sequence transmitted between two controllers may comprise a combination of commands, replies, status signals, handshaking signals, ping signals, and/or other signals between a DMA controller and a non-volatile memory controller, and/or between two non-volatile memory controllers in a serial chain or serial sub-chain. For example, a sequence may comprise handshaking and status signals, commands, ping signals, and/or replies between two controllers (e.g., between a DMA controller and a non-volatile memory controller, or between two non-volatile memory controllers) prior to, during, and after the transmission of data between the two controllers.

A signal transmitted between two controllers may comprise signals related to status, handshaking, data bytes, commands, replies, addresses, sideband signals, and/or other types of signals.

The non-volatile memory controllers 150b and 150c are both coupled in parallel via the node 181 to the non-volatile memory controller 150a. Therefore, the non-volatile memory controller buffers 155b and 155c are both coupled in parallel via the node 181 to the non-volatile memory controller buffer 155a.

The non-volatile memory controller 150d is coupled in series to the non-volatile memory controller 150c. Therefore, the non-volatile memory controller buffer 155d is coupled in series to the non-volatile memory controller buffer 155c.

The non-volatile memory controller 150a is coupled in series to the DMA controller 140a. Therefore, the non-volatile memory controller buffer 155a is coupled in series to the DMA controller buffer 160a.

The prefetch buffer 155b and the prefetch buffer 155c may be disposed in a same direction (e.g. X-direction 185) or may each be disposed in different directions (e.g., prefetch buffer 155b may be in the X-direction 185 and prefetch buffer 155c may be in the Y-direction 186). The prefetch buffer 155d may be in the X-direction 185, Y-direction 186, or Z-direction 187.

In an example operation of the system 100, the memory interface 105 responds to a memory transaction request 142 (e.g., memory read request 142) received via the host interface link 131 from a host 110a and received via the host interface 130. The memory interface 105 can respond to another memory transaction request 148 (e.g., another memory read request 148 that is subsequent to the memory read request 142) received via host interface link 131 from another host 110b or from the same host 110a. One or more host 110 can send memory transaction requests 142 or 148 to the memory interface 105 of the storage apparatus 101 via one or more host interface link 130. The number of hosts 110 and host interface links 133 that can be coupled to the storage apparatus 101 can vary as symbolically shown by the dot symbols 132 and 133, respectively. The memory interface 105 performs, on at least one memory module in the memory topology 145, a memory operation (e.g., a memory write operation or a memory read operation) that corresponds to the memory transaction request 142 that is requested by a host 110. For example, if the memory interface 105 receives a memory read transaction request 142, the memory interface 105 performs a read operation on at least one of the memory modules in the memory topology 145 and returns the result of the read operation, such as read data 196, along a host interface link 131 to a host 110 that sent the memory transaction request 142. Data returned as a result of the read operation is herein called "read data" 196.

The term "host", such as a host 110 shown in this embodiment, can be defined as any device that has the ability to transmit a memory read (or/and write) transaction request to storage apparatus 101. For example, this device may include a host 110 that can generate a memory transaction request 142 (e.g., memory read transaction request or/and memory write transaction request) and that can receive a response resulting from the processing of the memory transaction request 142 by the memory interface 105. The memory interface 105 may process memory transactions from one or more requesting device, such as at least one of the hosts 110a through 110b. For example, the host 110a may generate a memory read transaction request 142 that will cause the storage apparatus 101 to return a read data 196, while another host 110b may receive a response, such as a prefetch data 197 that is a result of another subsequent memory read transaction request 148 that is sent by the host 110b. As another example, the host 110a may generate a memory read transaction request 142 that will cause the storage apparatus 101 to return a read data 196, and the same host 110a may receive a response, such as a prefetch data 197 that is a result of another subsequent memory read transaction request 148 that is sent by the same host 110a. A prefetch data 197 is stored in at least one prefetch buffer in the memory topology 145 as discussed above.

Since the serial chain 182 is expandable and since the serial sub-chain 182a is expandable and/or since the serial sub-chain 182b is expandable, the memory interface 105 can allocate an expanded number or expandable number or configurable number of prefetch buffers in the buffer topology 165 in the storage apparatus 101. By allocating an expanded number or expandable number or configurable number of prefetch buffers, the storage apparatus 101 further reduces latency in memory read operations in the storage apparatus 101, while having serial chains and serial sub-chains that can be configured in one more directions to overcome package constraints or other physical constraints. This further reduction in latency is not available in current systems.

Another example is now presented of prefetching transactions in the storage apparatus 101 in order to reduce latency in memory read transactions in the storage apparatus 101. As similarly discussed above, the system bus 125 is a conduit for transferring data between the DMA controller 140, the local processor 120, the local memory 135, and the host interface 130. The local processor 120, the host interface 130, and the DMA controller 140 may access the local memory 135 via the system bus 125 as needed.

The host 110a sends a memory read transaction request 142 to the storage apparatus 101 for data located in the memory topology 145. Operating under program control, the local processor 120 analyzes and responds to the memory read transaction request 142 by generating DMA instructions 198 that will cause the DMA controller 140 to read this data from the memory topology 145 through at least a non-volatile memory controller 150. If this data is available, a non-volatile memory controller 150 will retrieve this data from a non-volatile memory device with this data. For example, if this data is in the non-volatile memory device 168a, then the non-volatile memory controller 150a will retrieve this data from the non-volatile memory device 168a. The non-volatile memory controller 150a then transfers this data to the DMA controller 140. The DMA controller 140 then transfers this data to the local memory 135, and the local processor 120 then eventually transfers this data from the local memory 135 to the host 110a via the host interface 130. Data obtained during this memory read transaction request is named "read data".

As another example, if this data is in the non-volatile memory device 172a, then the non-volatile memory controller 150b will retrieve this data from the non-volatile memory device 172a. The non-volatile memory controller 150b then transfers this data to the non-volatile memory controller 150a. The non-volatile memory controller 150a then transfers this data to the DMA controller 140. The DMA controller 140 then transfers this data to the local memory 135, and the local processor 120 then eventually transfers this data from the local memory 135 to the host 110a via the host interface 130. As noted above, data obtained during this memory read transaction request is named "read data".

The local processor 120 also identifies "prefetch data". Prefetch data is any data currently stored in the memory topology 145 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, the memory interface 105 determines whether this prefetch selection criterion is met by determining whether any stored data exists in the memory topology 145 that has a memory address within the same page as a memory address associated with the read data. The type of relationship between the read data and stored data is not intended to be limiting in any way. Any type of relationship may be used that increases the likelihood that the stored data selected for prefetching will be later requested by a host 110 coupled to a memory interface 105.

The local processor 120 may also perform an additional read operation, called an internal read operation. This internal read operation is a process executed by the local processor 120 to retrieve prefetch data 197 from the memory topology 145. This internal read operation includes the local processor 120 sending an instruction 198 to the DMA controller 140 to retrieve (via at least one non-volatile memory controller 150) a prefetch data 197 from the memory topology 145. For example, if the memory topology 145 addresses stored data by flash page, the instruction 198 contains the address of the specific flash page within a flash memory device (in memory topology 145) that holds the prefetch data 197. The instruction 198 also causes the DMA controller 140 to retrieve (via at least one non-volatile memory controller 150) a prefetch data 197 from the flash page and flash memory device (in memory topology 145) identified by the address mentioned above.

When the DMA controller 140 receives the instruction 198, the instruction 198 causes the DMA controller 140 to use at least one non-volatile memory controller 150 to cause at least one non-volatile memory device (in memory topology 145) to transfer the prefetch data 197. The internal read operation also includes the local processor 120 allocating at least one prefetch buffer to store the prefetch data 197. Allocating at least one prefetch buffer may be performed statically, such as at the time of manufacture, performed dynamically by the local processor 120, or both. In one embodiment of the invention, the processor 120 will allocate a number of prefetch buffers based on an amount of storage needed for a given prefetch data 197. For example, the memory interface 105 (including the processor 120) allocates a data register (e.g., data register 167a) in a non-volatile memory device (e.g., non-volatile memory device 168a) and a prefetch buffer 155a (in the non-volatile memory controller 150a) as storage space suitable for storing (buffering) the prefetch data 197. This action by the memory interface 105 may also render buffers (that have not been allocated as prefetch buffers), such as the data registers 167b and 167c and buffers 155b and 155c to be available to storage apparatus 101 for other memory uses. As discussed above, buffers in the storage apparatus 101 that are allocated as prefetch buffers for storing prefetch data are denoted herein as "prefetch buffers". If a host (host 110a and/or 110b) transmits a second memory read transaction request 148 to the storage apparatus 101 for data (wherein the second memory read transaction request 148 is subsequent to the first memory read transaction request 142), and this data has been previously stored as a prefetch data 197 in a prefetch buffer in the storage apparatus 101, then the local processor 120 responds by retrieving the prefetch data 197 from a prefetch buffer in the storage apparatus 101 and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the processor 120 may instead directly send the prefetch data 197 to the host (host 110a and/or 110b) or may instead process the prefetch data 197 in any other manner envisioned by a user. As also discussed above, the processor 120 can additionally allocate memory space 134 in the system memory 135 as a prefetch buffer for storing prefetch data 197 and/or can additionally allocate the DMA buffer 160a as a prefetch buffer for storing prefetch data 197.

As another example, the memory interface 105 (including the processor 120) allocates at least one prefetch buffer in the serial chain 182, at least one prefetch buffer in the serial sub-chain 182a, and at least one prefetch buffer in the serial sub-chain 182b. Therefore, the memory interface 105 allocates an increased number of prefetch buffers compared to conventional systems. For example, the memory interface 105 allocates at least the following prefetch buffers: (1) in the serial chain 182, the memory interface 105 allocates as prefetch buffers at least one of the buffer 155a, data registers 167a, 167b, and 167c; (2) in the serial sub-chain 182a, the memory interface 105 allocates as prefetch buffers at least one of the buffer 155b, data registers 173a, 173b, and 173c; and (3) in the serial sub-chain 182b, the memory interface 105 allocates as prefetch buffers at least one of the buffer 155c, data registers 175a, 175b, and 175c. The memory interface 105 can additionally allocate as prefetch buffers, at least one of the following: (1) at least an additional buffer in an additional non-volatile memory controller coupled to the non-volatile memory controller 150b in the serial sub-chain 182a and/or at least one data register in at least one non-volatile memory device coupled to that additional non-volatile memory controller in the serial sub-chain 182a; and/or (2) the prefetch buffer 155d in the non-volatile memory controller 150d and/or at least one of the data registers 177a, 177b, and 177d; and/or (3) at least an additional buffer in an additional non-volatile memory controller coupled to the non-volatile memory controller 150d in the serial sub-chain 182b and/or at least one data register in at least one non-volatile memory device coupled to that additional non-volatile memory controller in the serial sub-chain 182b; and/or at least one additional buffer and/or at least one data register in a serial sub-chain branch (e.g., branch 151 in FIG. 1B or branch 152 in FIG. 1C) that is coupled to the non-volatile memory controller 150c.

Therefore, the serial chain 182 and serial sub-chains 182a and 182b permit the memory interface 105 (and processor 120) to allocate an increased number of prefetch buffers for storing prefetch data in the serial chain 182 and serial sub-chains 182a and 182b, while being configurable in at least one direction to overcome package constraints or other physical constraints. Since there is an increased number of prefetch buffers in the storage apparatus 101, the prefetch data 197 can advantageously be much larger in size as compared to prefetch data that are stored in conventional systems. Additionally, the memory interface 105 (and processor 120) can allocate the buffer 160a (in DMA controller 140a) as a prefetch buffer and/or can allocate memory space 134 in the local memory 135 as a prefetch buffer in addition to allocated prefetch buffers in the serial chain 182 and serial sub-chains 182a and 182b so as to further increase the number of prefetch buffers in the buffer topology 165.

Note that the number non-volatile memory devices 168 and data registers 167 in the non-volatile memory module 171a may vary as symbolically shown by the dot symbols 199a.

Note that the number non-volatile memory devices 172 and data registers 173 in the non-volatile memory module 171b may vary as symbolically shown by the dot symbols 199b.

Note that the number non-volatile memory devices 174 and data registers 175 in the non-volatile memory module 171c may vary as symbolically shown by the dot symbols 199c.

Note that the number non-volatile memory devices 176 and data registers 177 in the non-volatile memory module 171d may vary as symbolically shown by the dot symbols 199d.

As another example, if a host (host 110a and/or 110b) transmits a second memory read transaction request 148 to the storage apparatus 101 for data (wherein the second memory read transaction request 148 is subsequent to the first memory read transaction request 142), and this data has been previously stored as a prefetch data 197 in prefetch buffers that are allocated in the serial chain 182 and serial sub-chains 182a and 182b (such as, for example, the example allocated prefetch buffers in the serial chain 182 and serial sub-chains 182b as discussed above), then the local processor 120 responds by retrieving the prefetch data 197 from the prefetch buffers in the serial chain 182 and serial sub-chains 182a and 182b and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the processor 120 can instead directly send the prefetch data 197 to the host (host 110*a* and/or 110*b*) or the processor 120 can process the prefetch data 197 in any other manner envisioned by a user.

FIG. 1B is a block diagram of a branch 151 from a serial sub-chain, in accordance with an embodiment of the invention. As similarly discussed above, the serial sub-chain branch 151 is coupled via the link 183 and node 189 to the non-volatile memory controller 150*c*. The serial sub-chain branch 151 comprises at least one of the non-volatile memory controller 150*e* and a non-volatile memory module 171*e* that is coupled to the non-volatile memory controller 150*e*. The branch 151 may further include a non-volatile memory controller 150*f* that is coupled via a channel 136 to the non-volatile memory controller 150*e* and a non-volatile memory module 171*f* that is coupled to the non-volatile memory controller 150*f*.

The non-volatile memory controller 150*e* is coupled via a memory bus 170*e* (or via a plurality of memory buses 170*e*) to a non-volatile memory module 171*e*. As an example, the non-volatile memory module 171*e* comprises a plurality of non-volatile memory devices 121 that may vary in number (e.g., non-volatile memory devices 121*a*, 121*b*, and 121*c*). As another example, the non-volatile memory module 171*e* comprises a single non-volatile memory device (e.g., non-volatile memory device 121*a*).

The non-volatile memory controller 150*f* is coupled via a memory bus 170*f* (or via a plurality of memory buses 170*f*) to a non-volatile memory module 171*f*. As an example, the non-volatile memory module 171*f* comprises a plurality of non-volatile memory devices 123 that may vary in number (e.g., non-volatile memory devices 123*a*, 123*b*, and 123*c*). As another example, the non-volatile memory module 171*f* comprises a single non-volatile memory device (e.g., non-volatile memory device 123*a*).

The branch 151 forms another serial sub-chain 182*c* in the serial chain 182.

The branch 151 can be expanded one or more directions (e.g., X-direction 185, Y-direction 186, and/or Z-direction 187). For example, the non-volatile memory controller 150*f* is coupled via the channel 136 to the non-volatile memory controller 150*e*. The channel 136 can perform at least some of the above discussed operations of the channel 183 in order to permit the non-volatile memory controller 150*e* and the non-volatile memory controller 150*f* to communicate with each other. For example, the channel 136 comprises one or more point-to-point lines which can be, for example, one flashbus or a plurality of flashbuses for transmitting signals such as command, status, response, address, and data bytes between the non-volatile memory controllers 150*e* and 150*f*. The two non-volatile memory controllers 150*e* and 150*f* can transmit the above-mentioned signals to each other via the channel 136 between the two non-volatile memory controllers 150*e* and 150*f*. A non-volatile memory controller (controllers 150*e* or 150*f*) can process the above-mentioned signals via cutthrough, store forward, or/and buffering.

As an example, the channel 136 comprises one or more point-to-point lines which can be, for example, a data bus that uses standard specification or a bus that uses a proprietary protocol (e.g., one flashbus or a plurality of flashbuses), wherein the channel 136 is configured for transmitting signals such as command, status, response, address, and data bytes between the non-volatile memory controller 150*e* and 150*f*.

In an embodiment of the invention, the channel 136 and the non-volatile memory controller 150*f* is included in the first serial chain 182 (and third serial sub-chain 182*c*) or can be omitted from the first serial chain 182 (and third serial sub-chain 182*c*).

The memory module 171*e* is included in the third serial sub-chain 182*c*. The memory module 171*f* may be included in the third serial sub-chain 182*c* (and serial sub-chain branch 151) if the non-volatile memory controller 150*f* is included in the first serial chain 182 (and third serial sub-chain 182*c*).

Additionally or alternatively, the serial sub-chain 182*c* is expandable as now discussed. A similar first type of signal path layout 184 (FIG. 1A) can be coupled between the non-volatile memory controller 150*f* and at least another non-volatile memory controller in the serial sub-chain 182*c* or another type of signal path layout (e.g., similar to a second type of signal path layout 284 in FIG. 2A) can be coupled between the non-volatile memory controller 150*f* and at least another non-volatile memory controller in the serial sub-chain 182*c*. At least one more of a given type of signal path layout (e.g., similar to layout 184 or layout 284) and at least one more non-volatile memory controller can further be added in the serial sub-chain 182*c* so that serial chain 182 (and/or serial sub-chain 182*c*) is expanded in a given direction (e.g., X-direction 185).

Additionally or alternatively, the serial sub-chain 182*c* is expandable as now discussed. A similar first type of signal path layout 184 (FIG. 1A) can be coupled between the non-volatile memory controller 150*e* and at least another non-volatile memory controller that can be coupled to the controller 150*e* or another type of signal path layout (e.g., similar to a second type of signal path layout 284 in FIG. 2A) can be coupled between the non-volatile memory controller 150*e* and at least another non-volatile memory controller that can be coupled to the controller 150*e*. This at least another non-volatile memory controller can be coupled to the channel 136 via a node (similar to node 189) so as to expand the serial chain 182 in yet another additional branch in a given direction (e.g., direction 185, direction 186, or direction 187). Therefore, this yet additional branch could be configured from the non-volatile memory controller 150*e* via a node to further expand the serial chain 182 with at least an additional prefetch buffer that is included in the at least one non-volatile memory controller and/or in the at least one non-volatile memory device in this yet additional branch, wherein this at least additional prefetch buffer is configured to store prefetch data. In this example, this yet additional branch will have a layout that is similar to the layout 184 in FIG. 1A. Alternatively, this yet additional branch could be configured directly from the non-volatile memory controller 150*e* to further expand the serial chain 182 with at least an additional prefetch buffer that is included in the at least one non-volatile memory controller and/or in the at least one non-volatile memory device in this yet additional branch, wherein this at least additional prefetch buffer is configured to store prefetch data; in the example wherein this yet additional branch could be configured directly from the non-volatile memory controller 150*e* via a link (similar to link 191), this yet additional branch would have a layout that is similar to the layout 284 in FIG. 2A. This link could be similar to the link 280*b* in FIG. 2A that forms a serial sub-chain that is similar to the serial sub-chain 282*b*.

The number of non-volatile memory controllers in the branch 151 (serial sub-chain 182*c*) may vary as shown by the dot symbols 137.

The number of serial sub-chains in the branch 151 may vary as shown by the dot symbols 138. Therefore, in one embodiment, the branch 151 comprises a single serial sub-chain 182*c* with at least one of the non-volatile memory controllers 150*e* and/or 150*f* and with at least one of the memory modules 171*e* and/or 171*f*, respectively. In another embodiment, the branch 151 comprises one or more additional serial sub-chains in addition to the serial sub-chain 182c in the branch 151.

Handshaking and data transmission between two non-volatile memory controllers (e.g., non-volatile memory controllers 150e and 150f) can be performed by different IC protocols. The non-volatile memory controllers 150e and 150f can perform functions that are similar to the functions performed by the non-volatile memory controllers shown in FIG. 1A.

In an embodiment of the invention, the non-volatile memory controller 150c will pass the derivative descriptor 195 to the next non-volatile memory controller(s) (e.g., non-volatile memory controllers 150d and 150e) in a given serial chain and given serial sub-chains and the derivative descriptor 195 is passed serially along the given serial chain and given serial sub-chains (e.g., the derivative descriptor 195 is passed to the non-volatile memory controller 150f and other controllers in the serial sub-chain 182c), as similarly discussed above. Details of the derivative descriptor 195 have been described above. For example, the non-volatile memory controller 150c intelligently selects the serial sub-chain 182b or the serial sub-chain 182c for performing a given memory transaction in the storage apparatus 101. The functions performed in the serial sub-chain 182c are similar to the functions performed in the other serial sub-chains (e.g., sub-chain 182b).

In one embodiment, the non-volatile memory controllers 150d and 150e are both coupled in parallel via the node 189 to the non-volatile memory controller 150c. Therefore, in this embodiment, the non-volatile memory controller buffers 155d (in controller 150d) and 155e (in controller 150e) are both coupled in parallel via the node 189 to the non-volatile memory controller buffer 155c (in controller 150c).

The non-volatile memory controller 150f is coupled in series to the non-volatile memory controller 150e. Therefore, the non-volatile memory controller buffer 155f (in controller 150f) is coupled in series to the non-volatile memory controller buffer 155e.

As an example, the data register 177a (which has been allocated as a prefetch buffer in the non-volatile memory device 176a) and the data register 122a (which has been allocated as a prefetch buffer in the non-volatile memory device 121a) are both coupled in parallel via the node 189 to the data register 175a (which has been allocated as a prefetch buffer in the non-volatile memory device 174a). As similarly discussed above, other data registers in any non-volatile memory devices in FIG. 1B may be, additionally or alternatively, allocated as prefetch buffers for storing prefetch data. Therefore, other data registers in FIG. 1B may be coupled in parallel.

As an example, the data register 122a is coupled in series to the data register 124a (which has been allocated as a prefetch buffer in the non-volatile memory device 123a). Other data registers in FIG. 1B may be coupled in series.

The prefetch buffer 155c and the prefetch buffer 155e may be disposed in a same direction (e.g. X-direction 185) or may each be disposed in different directions (e.g., prefetch buffer 155c may be in the X-direction 185 and prefetch buffer 155e may be in the Y-direction 186). The prefetch buffer 155f may be in the X-direction 185, Y-direction 186, or Z-direction 187.

The non-volatile memory devices 121a, 121b, and 121c comprises data the data registers 122a, 122b, and 122c, respectively. The memory interface 105 can allocate one or more of the data registers 122a-122c as prefetch buffers as similarly discussed above for other data registers.

Note that the number non-volatile memory devices 121 and data registers 122 in the non-volatile memory module 171e may vary as symbolically shown by the dot symbols 199e.

The non-volatile memory devices 123a, 123b, and 123c comprises data the data registers 124a, 124b, and 124c, respectively. The memory interface 105 can allocate one or more of the data registers 124a-124c as prefetch buffers as similarly discussed above for other data registers.

Note that the number non-volatile memory devices 123 and data registers 124 in the non-volatile memory module 171f may vary as symbolically shown by the dot symbols 199f.

The serial sub-chain 182c may be in the same direction (e.g., direction 185, direction 186, or direction 187) as the direction of the direction of the serial sub-chain 182b. Alternatively, the serial sub-chain 182c may be in a direction that is different from the direction of the serial sub-chain 182b.

As an example, the serial sub-chain 182c is a uni-directional serial sub-chain if the channels 183 and 136 are disposed in a same direction (e.g., X-direction 185, Y-direction 186, or Z-direction 187). Since the serial sub-chain 182c is uni-directional, all allocated prefetch buffers in the sub-chain 182c are uni-directional allocated prefetch buffers (e.g., at least two of the prefetch buffer 155e, prefetch buffer 155f, data registers 122a, 122b, or 122c, and/or data registers 124a, 124b, or 124c). As another example, the serial sub-chain 182c is a multi-directional sub-chain if the channels 183 and 136 are disposed in two different directions (e.g., the channel 183 is disposed in the X-direction 185 and the channel 136 is disposed in the Y-direction 186). Since the serial sub-chain 182c is multi-directional, at least two allocated prefetch buffers in the sub-chain 182c are multi-directional allocated prefetch buffers (e.g., prefetch buffers 155e and 155f are multi-directional allocated prefetch buffers; e.g., data registers 122a and 124a are multi-directional allocated prefetch buffers; e.g., data registers 122b and 124b are multi-directional allocated prefetch buffers; and/or e.g., data registers 122c and 124c are multi-directional allocated prefetch buffers). Since a serial chain and/or a serial sub-chain in the memory topology 145 can be uni-directional or multi-directional, the serial chain and/or serial sub-chain can be appropriately disposed or configured to satisfy package constraints and/or other physical constraints that may be applicable to the memory topology 145.

It is noted that a similar branch 151 can be coupled to at least one additional non-volatile memory controller in the serial chain 182.

FIG. 1C is a block diagram of a branch 152 from a serial sub-chain, in accordance with another embodiment of the invention. As similarly discussed above, the serial sub-chain branch 152 is coupled via the link 191 to the non-volatile memory controller 150c. The serial sub-chain branch 152 comprises at least one of the non-volatile memory controller 150g and a non-volatile memory module 171g that is coupled to the non-volatile memory controller 150g. The branch 152 may further include a non-volatile memory controller 150h that is coupled via a channel 139 to the non-volatile memory controller 150g and a non-volatile memory module 171h that is coupled to the non-volatile memory controller 150h.

The non-volatile memory controller 150g is coupled via a memory bus 170g (or via a plurality of memory buses 170g) to a non-volatile memory module 171g. As an example, the non-volatile memory module 171g comprises a plurality of non-volatile memory devices 126 that may vary in number (e.g., non-volatile memory devices 126a, 126b, and 126c). As another example, the non-volatile memory module 171g comprises a single non-volatile memory device (e.g., non-volatile memory device 126a).

The non-volatile memory controller 150h is coupled via a memory bus 170h (or via a plurality of memory buses 170h) to a non-volatile memory module 171h. As an example, the non-volatile memory module 171h comprises a plurality of non-volatile memory devices 128 that may vary in number (e.g., non-volatile memory devices 128a, 128b, and 128c). As another example, the non-volatile memory module 171h comprises a single non-volatile memory device (e.g., non-volatile memory device 128a).

The branch 152 forms another serial sub-chain 182d in the serial chain 182.

The branch 152 can be expanded one or more directions (e.g., X-direction 185, Y-direction 186, and/or Z-direction 187). For example, the non-volatile memory controller 150h is coupled via a channel 139 to the non-volatile memory controller 150g. The channel 139 can perform at least some of the above discussed operations of the channel 183 in order to permit the non-volatile memory controller 150g and the non-volatile memory controller 150h to communicate with each other. For example, the channel 139 comprises one or more point-to-point lines which can be, for example, one flashbus or a plurality of flashbuses for transmitting signals such as command, status, response, address, and data bytes between the non-volatile memory controllers 150g and 150h. The two non-volatile memory controllers 150g and 150h can transmit the above-mentioned signals to each other via the channel 139 between the two non-volatile memory controllers 150g and 150h. A non-volatile memory controller (controllers 150g or 150h) can process the above-mentioned signals via cutthrough, store forward, or/and buffering.

As an example, the channel 139 comprises one or more point-to-point lines which can be, for example, a data bus that uses standard specification or a bus that uses a proprietary protocol (e.g., one flashbus or a plurality of flashbuses), wherein the channel 139 is configured for transmitting signals such as command, status, response, address, and data bytes between the non-volatile memory controller 150g and 150h.

In an embodiment of the invention, the channel 139 and the non-volatile memory controller 150h is included in the first serial chain 182 (and fourth serial sub-chain 182d) or can be omitted from the first serial chain 182 (and fourth serial sub-chain 182d).

The memory module 171g is included in the fourth serial sub-chain 182d. The memory module 171h may be included in the fourth serial sub-chain 182d (and serial sub-chain branch 152) if the non-volatile memory controller 150h is included in the first serial chain 182 (and fourth serial sub-chain 182d).

Additionally or alternatively, the serial sub-chain 182d is expandable as now discussed. A similar first type of signal path layout 184 (FIG. 1A) can be coupled between the non-volatile memory controller 150h and at least another non-volatile memory controller in the serial sub-chain 182d or another type of signal path layout (e.g., similar to a second type of signal path layout 284 in FIG. 2A) can be coupled between the non-volatile memory controller 150h and at least another non-volatile memory controller in the serial sub-chain 182d. At least one more of a given type of signal path layout (e.g., similar to layout 184 or layout 284) and at least one more non-volatile memory controller can further be added in the serial sub-chain 182d so that serial chain 182 (and/or serial sub-chain 182d) is expanded in a given direction (e.g., X-direction 185).

Additionally or alternatively, the serial sub-chain 182d is expandable as now discussed. A similar first type of signal path layout 184 (FIG. 1A) can be coupled between the non-volatile memory controller 150g and at least another non-volatile memory controller that can be coupled to the controller 150g or another type of signal path layout (e.g., similar to a second type of signal path layout 284 in FIG. 2A) can be coupled between the non-volatile memory controller 150g and at least another non-volatile memory controller that can be coupled to the controller 150g. This at least another non-volatile memory controller can be coupled to the channel 139 via a node (similar to node 189) so as to expand the serial chain 182 in another yet additional branch in a given direction (e.g., direction 185, direction 186, or direction 187). Therefore, this yet additional branch could be configured from the non-volatile memory controller 150g via a node to further expand the serial chain 182 with at least an additional prefetch buffer that is included in the at least one non-volatile memory controller and/or in the at least one non-volatile memory device in this yet additional branch, wherein this at least additional prefetch buffer is configured to store prefetch data. In this example, this yet additional branch will have a layout that is similar to the layout 184 in FIG. 1A. Alternatively, this yet additional branch could be configured directly from the non-volatile memory controller 150g to further expand the serial chain 182 with at least an additional prefetch buffer that is included in the at least one non-volatile memory controller and/or in the at least one non-volatile memory device in this yet additional branch, wherein this at least additional prefetch buffer is configured to store prefetch data; in the example wherein this yet additional branch could be configured directly from the non-volatile memory controller 150g via a link (similar to link 191), this yet additional branch would have a layout that is similar to the layout 284 in FIG. 2A. This link could be similar to the link 280b in FIG. 2A that forms a serial sub-chain that is similar to the serial sub-chain 282b.

The number of non-volatile memory controllers in the branch 152 (serial sub-chain 182d) may vary as shown by the dot symbols 141.

The number of serial sub-chains in the branch 152 may vary as shown by the dot symbols 143. Therefore, in one embodiment, the branch 152 comprises a single serial sub-chain 182d with at least one of the non-volatile memory controllers 150g and/or 150h and with at least one of the memory modules 171g and/or 171h, respectively. In another embodiment, the branch 152 comprises one or more additional serial sub-chains in addition to the serial sub-chain 182d in the branch 152.

Handshaking and data transmission between two non-volatile memory controllers (e.g., non-volatile memory controllers 150g and 150h) can be performed by different IC protocols. The non-volatile memory controllers 150g and 150h can perform functions that are similar to the functions performed by the non-volatile memory controllers shown in FIG. 1A.

In an embodiment of the invention, the non-volatile memory controller 150c will pass the derivative descriptor 195 to the next non-volatile memory controller(s) (e.g., non-volatile memory controllers 150d and 150g) in a given serial chain and given serial sub-chains and the derivative descriptor 195 is passed serially along the given serial chain and given serial sub-chains (e.g., the derivative descriptor 195 is passed to the non-volatile memory controller 150h and another non-volatile memory controller that may be in the serial sub-chain 182*d*), as similarly discussed above. Details of the derivative descriptor 195 have been described above. For example, the non-volatile memory controller 150*c* intelligently selects the serial sub-chain 182*b* or the serial sub-chain 182*d* for performing a given memory transaction in the storage apparatus 101. The functions performed in the serial sub-chain 182*d* are similar to the functions performed in the other serial sub-chains (e.g., sub-chain 182*b*).

In an embodiment, the non-volatile memory controllers 150*d* and 150*g* are both coupled in parallel to the non-volatile memory controller 150*c* via the channel 183 and 191, respectively. The channels 183 and 191 are signal paths that are separated (or electrically insulated) from each other and that are each coupled to the non-volatile memory controller 150*c* for transmitting data, control signals, and other suitable signals, while providing ease of manufacturing due to the separated signal paths of the channels 183 and 191. Therefore, in this embodiment, the non-volatile memory controller buffers 155*d* (in controller 150*d*) and 155*g* (in controller 150*g*) are both coupled in parallel to the non-volatile memory controller buffer 155*c* (in controller 150*c*).

The non-volatile memory controller 150*g* is coupled in series to the non-volatile memory controller 150*h*. Therefore, the non-volatile memory controller buffer 155*h* (in controller 150*h*) is coupled in series to the non-volatile memory controller buffer 155*g*.

As an example, the data register 177*a* (which has been allocated as a prefetch buffer in the non-volatile memory device 176*a*) and the data register 127*a* (which has been allocated as a prefetch buffer in the non-volatile memory device 126*a*) are both coupled in parallel via the channels 183 and 191, respectively, to the data register 175*a* (which has been allocated as a prefetch buffer in the non-volatile memory device 174*a*). As similarly discussed above, other data registers in any non-volatile memory devices in FIG. 1C may be, additionally or alternatively, allocated as prefetch buffers for storing prefetch data. Therefore, other data registers in FIG. 1C may be coupled in parallel.

As an example, the data register 126*a* is coupled in series to the data register 129*a* (which has been allocated as a prefetch buffer in the non-volatile memory device 128*a*). Other data registers in FIG. 1C may be coupled in series.

The prefetch buffer 155*c* and the prefetch buffer 155*g* may be disposed in a same direction (e.g. X-direction 185) or may each be disposed in different directions (e.g., prefetch buffer 155*c* may be in the X-direction 185 and prefetch buffer 155*g* may be in the Y-direction 186). The prefetch buffer 155*h* may be in the X-direction 185, Y-direction 186, or Z-direction 187.

The non-volatile memory devices 126*a*, 126*b*, and 126*c* comprises data the data registers 127*a*, 127*b*, and 127*c*, respectively. The memory interface 105 can allocate one or more of the data registers 127*a*-127*c* as prefetch buffers as similarly discussed above for other data registers.

Note that the number non-volatile memory devices 126 and data registers 127 in the non-volatile memory module 171*g* may vary as symbolically shown by the dot symbols 199*g*.

The non-volatile memory devices 128*a*, 128*b*, and 128*c* comprises data the data registers 129*a*, 129*b*, and 129*c*, respectively. The memory interface 105 can allocate one or more of the data registers 129*a*-129*c* as prefetch buffers as similarly discussed above for other data registers.

Note that the number non-volatile memory devices 128 and data registers 129 in the non-volatile memory module 171*h* may vary as symbolically shown by the dot symbols 199*h*.

The serial sub-chain 182*d* may be in the same direction (e.g., direction 185, direction 186, or direction 187) as the direction of the direction of the serial sub-chain 182*b*. Alternatively, the serial sub-chain 182*d* may be in a direction that is different from the direction of the serial sub-chain 182*b*.

As an example, the serial sub-chain 182*d* is a uni-directional serial sub-chain if the channels 191 and 139 are disposed in a same direction (e.g., X-direction 185, Y-direction 186, or Z-direction 187). Since the serial sub-chain 182*d* is uni-directional, all allocated prefetch buffers in the sub-chain 182*d* are uni-directional allocated prefetch buffers (e.g., at least two of the prefetch buffer 155*g*, prefetch buffer 155*h*, data registers 127*a*, 127*b*, or 127*c*, and/or data registers 129*a*, 129*b*, or 129*c*). As another example, the serial sub-chain 182*d* is a multi-directional sub-chain if the channels 191 and 139 are disposed in two different directions (e.g., the channel 191 is disposed in the X-direction 185 and the channel 139 is disposed in the Y-direction 186). Since the serial sub-chain 182*d* is multi-directional, at least two allocated prefetch buffers in the sub-chain 182*d* are multi-directional allocated prefetch buffers (e.g., prefetch buffers 155*g* and 155*h* are multi-directional allocated prefetch buffers; e.g., data registers 127*a* and 129*a* are multi-directional allocated prefetch buffers; e.g., data registers 127*b* and 129*b* are multi-directional allocated prefetch buffers; and/or e.g., data registers 127*c* and 129*c* are multi-directional allocated prefetch buffers). Since a serial chain and/or a serial sub-chain in the memory topology 145 can be uni-directional or multi-directional, the serial chain and/or serial sub-chain can be appropriately disposed or configured to satisfy package constraints and/or other physical constraints that may be applicable to the memory topology 145.

It is noted that a similar branch 152 can be coupled to at least one additional non-volatile memory controller in the serial chain 182.

FIG. 2A is a block diagram that illustrates a system 200 (or apparatus 200), in accordance with another embodiment of the invention. The system 200 (apparatus 200) comprises a data storage apparatus 201 (data storage system 201) with configurable prefetch buffers. In an embodiment of the invention, the configurable prefetch buffers are serially configurable prefetch buffers, and/or serially expandable prefetch buffers, and/or are expandable uni-directional prefetch buffers, and/or are expandable multi-directional prefetch buffers. The prefetch buffers are configured for reducing latency in memory transactions in the system 200.

In FIG. 2A, as well as in the subsequent drawing figures discussed below, for purposes of explanation and/or clarity, numerous specific details are set forth in order to provide a thorough understanding thereof. It may be evident, however, that the novel embodiments can be practiced without these specific details shown in the drawing figures. The data storage apparatus 201 comprises a memory interface 105 as similarly discussed above, wherein the memory interface 105 may also perform an internal read operation if data exists in memory, and wherein that existing data (in memory) meets at least one prefetch selection criterion. This prefetch selection criterion may include a relationship between the read data and a data portion existing in memory, named "stored data". The type of relationship between the read data and stored data is not intended to be limiting in any way. Any type of relationship may be used that increases the likelihood that the stored data selected for prefetching will be later requested by a host 110 that is communicatively coupled to the memory interface 105. For example, the memory interface 105 determines that this prefetch selection criterion is met if stored data exists (in memory) wherein the stored data has a memory address that differs from the address of the read data within a selected memory address range. In another example, the memory interface 105 determines whether the prefetch selection criterion is met by determining whether any stored data exists (in memory) wherein the stored data has a memory address within the same page as a memory address associated with the read data.

A host 110 has the ability to transmit a memory read transaction request to the storage apparatus 201 having the above-mentioned memory interface 105. For example, a host 110 can generate a memory read transaction request and can receive a response resulting from the processing of the memory read transaction request by the memory interface 105. The memory interface 105 may process memory transactions from one or more requesting device, such as one or more hosts 110 (e.g., host 110*a* and/or host 110*b*) as similarly discussed above with reference to FIG. 1A.

As part of the internal read operation, the memory interface 105 allocates at least one prefetch buffer from buffers in the storage apparatus 201, wherein any given prefetch buffer is configured to store prefetch data. The number of prefetch buffers that are allocated by the memory interface 105 may be selected at the time of manufacture, at the time of initialization, or dynamically as needed by a data storage apparatus 201 that uses the prefetch buffers. In another embodiment of the invention, the memory interface 105 initially selects the number of prefetch buffers that are allocated for storing prefetch data, and the memory interface 105 then dynamically adjusts the number of prefetch buffers after initialization, depending on an amount of storage space that is needed for data to be treated as a prefetch data during the processing of the memory read transaction requests from a host(s) 110. For example, the memory interface 105 may allocate a data register (in a non-volatile memory device in the storage apparatus 201) as a storage space suitable for storing prefetch data, and so this allocated data register becomes an allocated prefetch buffer. This action may render non-allocated buffers (such as, for example, other data registers in the same non-volatile memory device and/or other data registers in other non-volatile memory devices in the storage apparatus 201) as available to the storage apparatus 201 for other memory uses as needed. By storing prefetch data in a prefetch buffer, that prefetch data is readily available to a requesting host 110 if that requesting host 110 performs a subsequent memory read transaction request to the storage apparatus 201 wherein the subsequent memory read transaction request is subsequent to the prefetch data being stored in a prefetch buffer.

As mentioned above, the number of buffers allocated as prefetch buffers in the storage apparatus 201 may be selected at the time of manufacture, during initialization, or during the processing of memory operations (memory read transactions and/or memory write transactions). In one example, the memory interface 105 may initially allocate a selected number of buffers as prefetch buffers in the storage apparatus 201 at the time of initialization, and then may dynamically adjust the number of buffers allocated as prefetch buffers after initialization, depending on an amount of storage needed for data treated as prefetch data during the processing of memory read transaction requests.

Allocation of a prefetch buffer in the above manner is not to be taken as a limitation in any way. One of ordinary skill in the art having the benefit of this disclosure may use other techniques or procedures to allocate a prefetch buffer for storing prefetch data. For example, the storage apparatus 201 may further include at least one HDD. During initialization, the memory interface 105 (which is operating under program control and which executes a prefetch engine 115 under the control of a processor 120) may perform a prefetch of data from random areas in this HDD. This configuration option may be preferable when low latency performance during random access is required, such as in database applications. Another option may include configuring the memory interface 105 through program code (e.g., code in the prefetch engine 115) to provide an option in the form of a vendor-specific interface command to allow the host 110 to select the prefetching method to be used by the memory interface 105 during initialization. For example, if the storage apparatus 201 will be used to store large files that tend to be stored sequentially, such as, for example, video files, then the memory interface 105 may be configured to prefetch sequential data from memory rather than random data. To reduce the initialization time of the storage apparatus 201, these prefetching options during initialization may be disabled. In another possible configuration, the storage apparatus 201 may support a host-controlled non-volatile cache command set. This command set allows a host 110 to keep selected data in a low latency non-volatile memory that may form a portion of a memory topology 245 that includes non-volatile memory devices in the storage apparatus 201, and this command set allows the selected data to be available as prefetch data during initialization. During initialization, the memory interface 105 (operating under program control in the prefetching engine 115) detects this selected data and automatically prefetches this selected data by storing the data in at least one prefetch buffer in the storage apparatus 201, depending the size of this selected data.

If the memory interface 105 receives a second memory read transaction request from the same host 110*a* (or a different host 110*b*), which may be subsequent to a first memory read transaction request, and the data requested by the memory read transaction request is currently available as a prefetch data in a prefetch buffer, then the memory interface 105 will initiate a forwarding transaction, reducing the read latency of the memory read transaction resulting from the second memory read transaction request. This forwarding transaction includes retrieving the prefetch data previously stored in a prefetch buffer, and forwarding the prefetch data to the requesting host 110.

As an example, if the memory interface 105 finds prefetch data during an internal read operation, then the memory interface 105 stores the prefetch data into a prefetch buffer in the storage apparatus 201. Also, if the memory interface 105 receives a second memory read transaction request, which may be subsequent to the earlier memory read transaction request for data, and this data has been previously stored as a prefetch data, and the prefetch data is stored in a prefetch buffer, then the memory interface 105 initiates a forwarding transaction. The forwarding transaction may include obtaining prefetch data from one or more prefetch buffers. For example, if the data requested in the second memory read transaction has been stored as a prefetch data, and the prefetch data is stored in prefetch buffer, the forwarding transaction includes retrieving prefetch data from the prefetch buffer and forwarding prefetch data to the host 110 that sent the second memory read transaction request. In another example, if the data requested in the second memory read transaction request is stored as a prefetch data, and the prefetch data is stored in a data register that has been allocated as a prefetch buffer, then the forwarding transaction includes retrieving the prefetch data from the data register and forwarding the prefetch data to the host 110 that sent the second memory read transaction request. Thus, the memory interface 105 may perform an internal read operation and forwarding transaction using any of the buffers, such as data registers (in memory flash devices in the storage apparatus 201) and buffers (in non-volatile memory controllers and/or DMA controller(s) in the storage apparatus 201) that the memory interface 105 has allocated as prefetch buffers.

In an embodiment of the invention, the memory interface 105 in the storage apparatus 201 may be similar to the memory interface 105 in the storage apparatus 101 of FIG. 1A. For example, the memory interface 105 comprises a system bus 125 and further comprises a host interface 130, a local processor 120, a local memory 135, and a Direct Memory Access (DMA) controller 140, wherein these components are communicatively coupled to and/or electrically coupled to the system bus 125. In an embodiment of the invention, the prefetching engine 115 is stored in the local memory 135 and is executed by the local processor 120 to permit operations that are described in this disclosure including prefetching operations, internal read operations, and forwarding transactions that are described herein.

In an embodiment of the invention, the storage apparatus 201 comprises one local processor 120 or a plurality of processors 120, one local memory 135 or a plurality of local memories 135, and one host interface 130 or a plurality of host interfaces 130.

One host 110 or a plurality of hosts 110 are coupled, via the host interface link 131, to the storage apparatus 201. The one or more hosts 110 that are coupled to the storage apparatus 201 may vary in number as symbolically shown by the dot symbols 132. The number of host interface links 131 that can be coupled between a host(s) 110 and the data storage apparatus 201 may be one or more host interfaces links 131 and may vary as shown by the dot symbols 133. As an example, the hosts 110 comprise a host 110a and a host 110b that are both coupled, via the host interface link 131, to the storage apparatus 201. As another example, the hosts 110 comprise: (1) a host 110a that is coupled, via a first host interface link 131a, to the storage apparatus 201, and (2) a host 110b that is coupled, via a second host interface link 131b, to the storage apparatus 201. As another example, only a single host 110a is coupled, via the host interface link 131a, to the storage apparatus 201.

In another embodiment of the invention, at least one of the host interface links 131a or 131b may be wired communication link or a wireless communication link that communicatively couples the hosts 110a or 110b, respectively, to the storage apparatus 201. The number of hosts 110 that can be communicatively coupled to the storage apparatus 201 may vary. Therefore, one or more hosts 110 can be communicatively coupled to the storage apparatus 201. A host 110 can be communicatively coupled to the storage apparatus 201 by a wired communication link (e.g., a data bus) or by a wireless communication link such as, by way of example and not by way of limitation, an optical communication link, a radio frequency (RF) communication link, or another type of wireless communication link.

The storage apparatus 201 comprises a second serial chain 282 and this second serial chain 282 comprises the DMA controller 140a, a bus 278, a non-volatile memory controller 250a, the channels 280a and 280b, a non-volatile memory controller 250b, and a non-volatile memory controller 250c. The second serial chain 282 may further include a non-volatile memory controller 250d that is coupled by a channel 283 to the non-volatile memory controller 250c.

The non-volatile memory controller 250a is coupled via the channel 280a to the non-volatile memory controller 250b. The channel 280a comprises one or more point-to-point lines which can be, for example, a data bus that uses standard specification or a bus that uses a proprietary protocol (e.g., one flashbus or a plurality of flashbuses), wherein the channel 280a is configured for transmitting signals such as command, status, response, address, and data bytes between the non-volatile memory controllers 250a and 250b. The two non-volatile memory controllers 250a and 250b can transmit the above-mentioned signals to each other via the channel 280a between the two non-volatile memory controllers 250a and 250b. A non-volatile memory controller (controllers 250a or 250b) can process the above-mentioned signals via cutthrough, store forward, or/and buffering.

The non-volatile memory controller 250a is coupled via a channel 280b to the non-volatile memory controller 250c. The channel 280b comprises one or more point-to-point lines which can be, for example, a data bus that uses standard specification or a bus that uses a proprietary protocol (e.g., one flashbus or a plurality of flashbuses), wherein the channel 280b is configured for transmitting signals such as command, status, response, address, and data bytes between the non-volatile memory controllers 250a and 250c. The two non-volatile memory controllers 250a and 250c can transmit the above-mentioned signals to each other via the channel 280b between the two non-volatile memory controllers 250a and 250c. A non-volatile memory controller (controllers 250a or 250bc) can process the above-mentioned signals via cutthrough, store forward, or/and buffering.

The channel 283 can perform at least some of the above discussed operations of the channels 280a or 280b in order to permit the non-volatile memory controller 250c and the non-volatile memory controller 250d to communicate with each other. For example, the channel 283 comprises one or more point-to-point lines which can be, for example, a data bus that uses standard specification or a bus that uses a proprietary protocol (e.g., one flashbus or a plurality of flashbuses), wherein the channel 283 is configured for transmitting signals such as command, status, response, address, and data bytes between the non-volatile memory controller 250c and 250d. The two non-volatile memory controllers 250c and 250d can transmit the above-mentioned signals to each other via the channel 283 between the two non-volatile memory controllers 250c and 250d. A non-volatile memory controller (controllers 250c or 250d) can process the above-mentioned signals via cutthrough, store forward, or/and buffering.

In an embodiment of the invention, the second serial chain 282 comprises a first serial sub-chain 282a and a second serial sub-chain 282b.

In an embodiment of the invention, the channel 283 and the non-volatile memory controller 250d are included in the second serial chain 282 (and second serial sub-chain 282b) or can be omitted from the second serial chain 282 (and serial sub-chain 282b). The memory modules 271a, 271b, and 271c are included in the second serial chain 282. The memory module 271d may be included in the second serial chain 282 (and second serial sub-chain 282b) if the nonvolatile memory controller 250d is included in the second serial chain 282 (and second serial sub-chain 282b).

In an embodiment of the invention, the first serial sub-chain 282a comprises the non-volatile memory controller 250a, the memory module 271a, the channel 280a, the non-volatile memory controller 250b, and the memory module 271b, and the second serial sub-chain 282b comprises the non-volatile memory controller 250a, the memory module 271a, the channel 280b, the non-volatile memory controller 250c and the memory module 271c. The second serial sub-chain 282b can further include the channel 283, the non-volatile memory controller 250d, and the memory module 271d.

The channel 280a connects the non-volatile memory controller 250a to the non-volatile memory controller 250b, while the channel 280b that connects the non-volatile memory controller 250a to the non-volatile memory controller 250c, and the connection between the non-volatile memory controller 250a and the non-volatile memory controllers 250b and 250c is a second type of signal path layout 284.

The bus 280a and bus 280b are signal paths that are separated (or electrically insulated) from each other and that are each coupled to the non-volatile memory controller 250a for transmitting data, control signals, and other suitable signals, while providing ease of manufacturing due to the separated signal paths of the bus 280a and bus 280b. The number of buses coupled to the non-volatile memory controller 250a may vary as symbolically shown by the dot symbols 293. Therefore, in another embodiment of the invention, the non-volatile memory controller 250a is directly coupled by only two buses (e.g., buses 280a and 280b) to non-volatile memory controllers in the storage apparatus 201, while in another embodiment of the invention, the non-volatile memory controller 250a is directly coupled by more than three buses (e.g., buses 280a and 280b and at least an additional bus) to non-volatile memory controllers in the storage apparatus 201. Therefore, at least two serial sub-chains 282a and 282b may be coupled to (and share) the non-volatile memory controller 250a.

In an embodiment of the invention, the serial sub-chain 282a is expandable as now discussed. A similar first type of signal path layout 184 (FIG. 1A) can be coupled between the non-volatile memory controller 250b and at least another non-volatile memory controller in the serial sub-chain 282a or a similar second type of signal path layout 284 (FIG. 2A) can be coupled between the non-volatile memory controller 250b and at least another non-volatile memory controller in the serial sub-chain 282a. At least one more of a given type of signal path layout (e.g., similar to layout 184 or layout 284) and at least one more non-volatile memory controller can further be added in the serial sub-chain 282a so that the serial chain 282 (and/or serial sub-chain 282a) is expanded in a given direction (e.g., X-direction 185). As noted above, the X-direction 185, Y-direction 186, and Z-direction 187 form a three-dimensional coordinate system 188.

However, any serial chain (e.g., serial chain 282) and any serial sub-chain (e.g., serial sub-chain 282a and/or serial sub-chain 282b) in the data storage apparatus 201 may be disposed in any direction such as, for example, directions that are offset from and/or that are on an angular offset from the X-axis 185, Y-axis 186, and/or Z-axis 187 to, for example, satisfy packaging constraints or other physical constraints.

In an embodiment of the invention, the serial chain 282 is a uni-directional chain if the serial sub-chains 282a and 282b are in a same direction (e.g., one of X-direction 185, Y-direction 186, or Z-direction 187). Therefore, the prefetch buffers (as discussed below) in the serial chain 282 are uni-directional prefetch buffers in a same direction (e.g., one of X-direction 185, Y-direction 186, or Z-direction 187).

In an embodiment of the invention, the serial chain 282 is a multi-directional (multiple directional) chain if the serial sub-chains 282a and 282b are in different directions (e.g., the sub-chain 282a is in the X-direction 185 and the sub-chain 282b is in the Y-direction 186; or the sub-chain 282a is in the X-direction 185 and the sub-chain 282b is in the Z-direction 187; or the sub-chain 282a is in the Y-direction 186 and the sub-chain 282b is in the Z-direction 187). Therefore, the prefetch buffers (as discussed below) in the serial chain 282 are uni-directional prefetch buffers in a same direction (e.g., one of X-direction 185, Y-direction 186, or Z-direction 187) or are multi-directional prefetch buffers.

Additionally or alternatively, the serial sub-chain 282b is expandable as now discussed. A similar first type of signal path layout 184 (FIG. 1A) can be coupled between the non-volatile memory controller 250d and at least another non-volatile memory controller in the serial sub-chain 282b or another type of signal path layout (e.g., similar to a second type of signal path layout 284 in FIG. 2A) can be coupled between the non-volatile memory controller 250d and at least another non-volatile memory controller in the serial sub-chain 282b. At least one more of a given type of signal path layout (e.g., similar to layout 184 or layout 284) and at least one more non-volatile memory controller can further be added in the serial sub-chain 282b so that the serial chain 282 (and/or serial sub-chain 282b) is expanded in a given direction (e.g., X-direction 185).

Additionally or alternatively, the serial sub-chain 282b is expandable as now discussed. A similar first type of signal path layout 184 can be coupled between the non-volatile memory controller 250c and at least another non-volatile memory controller in a serial sub-chain branch 251 (FIG. 2B) or another type of signal path layout (e.g., similar to a second type of signal path layout 284 in FIG. 2A) can be coupled between the non-volatile memory controller 250c and at least another non-volatile memory controller in a serial sub-chain branch 252 (FIG. 2C). This at least another non-volatile memory controller can be coupled to the channel 283 via the node 289 so as to expand the serial chain 282 via the serial sub-chain branch 251 (FIG. 2B) in any given direction (e.g., direction 185, direction 186, or direction 187). Therefore, this additional branch 251 could be configured from the non-volatile memory controller 250c via the node 289 to further expand the serial chain 282 with at least an additional prefetch buffer that is included in the at least one non-volatile memory controller and/or in the at least one non-volatile memory device in this additional branch 251, wherein this at least additional prefetch buffer is configured to store prefetch data. In this example, wherein this additional branch 251 (FIG. 2B) is connected to the node 289, this additional branch 251 will have a layout that is similar to the layout 184 in FIG. 1A.

Alternatively, a serial sub-chain branch 252 (FIG. 2C) could be configured directly from the non-volatile memory controller 250c to further expand the serial chain 282 with at least an additional prefetch buffer that is included in the at least one non-volatile memory controller and/or in the at least one non-volatile memory device in this additional branch 252, wherein this at least additional prefetch buffer is configured to store prefetch data; in the example wherein this additional branch 252 could be configured directly from the non-volatile memory controller 250c via the link 291, this additional branch 252 would have a layout that is similar to the layout 284 in FIG. 2A. The link 291 could be similar to the link 280b in FIG. 2A that forms a serial sub-chain that is similar to the serial sub-chain 282b. This at least another non-volatile memory controller can be coupled to the channel 291 so as to expand the serial sub-chain 282 via the serial sub-chain branch 252 (FIG. 2C) in any given direction (e.g., direction 185, direction 186, or direction 187).

Handshaking and data transmission between two non-volatile memory controllers (e.g., non-volatile memory controllers 250a and 250b), as well as handshaking and data transmission between a non-volatile memory controller (e.g., non-volatile memory controller 250a) and a DMA controller (e.g., DMA controller 140a) can be performed by different IC protocols. A non-volatile memory controller (e.g., controller 250a) can receive and transmit command, status, response, address, and data bytes to and from a DMA controller (e.g., controller 140a). A non-volatile memory controller (e.g., controller 250a) can also receive and transmit sideband signals to and from a DMA controller (e.g., controller 140a), wherein the sideband signals may be, for example, arbitration signals, messaging signals, and/or protocol handshakes.

Any given non-volatile memory controller (e.g., controller 250a) checks information in an incoming signal (e.g. incoming command, status, response, address, and/or data bytes) or in an incoming sideband signal in order to determine if the incoming signal (e.g., command, status, response, address, and/or data bytes and/or sideband signal) are intended (or are not intended) for the given non-volatile memory controller that is receiving a signal. If so, then the given non-volatile memory controller (that received a signal) will accordingly process the received incoming signal such as an incoming command, status response, address, and/or data bytes and/or sideband signal. If not, then the given non-volatile memory controller (that received the incoming signal) will then pass the aforementioned received incoming signal (e.g., an incoming command, status, response, address, and/or data bytes and/or sideband signal) to another given non-volatile memory controller in the same serial chain (e.g., a non-volatile memory controller 250b that is coupled via the channel 280a to the given receiving non-volatile memory controller 250a). A non-volatile memory controller can pass an incoming signal (e.g., incoming command, status, response, address and/or data bytes and/or sideband signal) to another non-volatile memory controller in the same serial chain via cutthrough, store forward, or buffering.

Other IO protocols may be alternatively used by the non-volatile memory controller (e.g., controllers 250a and 250b) and DMA controllers (e.g., controller 140a) in the transmission and reception of signals.

The number of non-volatile memory controllers and non-volatile memory modules in a given serial chain may vary. For example, the serial chain 282 comprises a single non-volatile memory controller 250a. As another example, the serial chain 282 comprises two or more (a plurality of) non-volatile memory controllers (e.g., controllers 250a and 250b). The number of non-volatile memory controllers in the serial chain 282 (and serial sub-chain 282a) may vary as symbolically shown by the dot symbols 290. If the serial sub-chain 282a includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 271a, 271b, 271c, or 271d) in the storage apparatus 201, the at least additional non-volatile memory device in the additional non-volatile memory module can store write data, cache data, return read data, and perform other flash memory device functions as, for example, discussed herein.

As another example, the serial sub-chain 282b comprises two or more (a plurality of) non-volatile memory controllers (e.g., controllers 250a and 250c). The number of non-volatile memory controllers in the serial chain 282 (and serial sub-chain 282b) may vary as symbolically shown by the dot symbols 292. The non-volatile memory controllers 250c and 250d are communicatively and/or electronically coupled by the channel 283. If the serial sub-chain 282b includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 271a, 271b, 271c, and/or 271d) in the storage apparatus 201, the at least additional non-volatile memory device in the additional non-volatile memory module can store write data, cache data, return read data, and perform other flash memory device functions as, for example, discussed herein.

The number of serial sub-chains in the serial chain 282 may vary as symbolically shown by the dot symbols 293.

The DMA controller 140a and any non-volatile memory controller that is directly or indirectly coupled to the DMA controller 140a are all communicatively or/and electrically coupled together in the serial chain 282. For example, the DMA controller 140a, the non-volatile memory controller 250a, the non-volatile memory controller 250b, and the non-volatile memory controller 250c are all communicatively or/and electrically coupled together. As another example, the DMA controller 140a, the non-volatile memory controller 250a, the non-volatile memory controller 250b, the non-volatile memory controller 250c, and the non-volatile memory controller 250d are all communicatively or/and electrically coupled together.

At least one serial chain (and/or at least one serial sub-chain) in the buffer topology 265 (e.g., serial chain 282 and/or serial chain 282a and/or serial sub-chain 282b and/or another serial chain and/or another serial sub-chain in the buffer topology 265) may include non-volatile memory controllers that vary in number in the X-direction (first direction) 185, Y-direction (second direction) 186, and/or Z-direction (third direction) 187. Therefore, one or more additional non-volatile memory controllers can be added to a given serial chain (or a given serial sub-chain) in the X-direction 185, Y-direction 186, and/or Z-direction 187 in the buffer topology 265.

Additionally, the buffer topology 265 can be expanded in the X-direction 185, Y-direction 186, and/or Z-direction 187 by adding at least an additional DMA controller in a storage apparatus as will be discussed below with reference to FIGS. 3 and 4 and by adding one or more additional non-volatile memory controllers coupled to the at least additional DMA controller and a non-volatile memory module is coupled to that one or more additional non-volatile memory controllers.

Other variations of the directions of the serial chain 282 and serial sub-chains 282a and/or 282b in the buffer topology 265 are possible in an embodiment of the invention.

As an example, any given serial sub-chain in the storage apparatus 201 can be uni-directional or multi-directional. For example, the serial sub-chain 282b is a uni-directional serial sub-chain if the channels 280b and 283 are disposed in a same direction (e.g., X-direction 185, Y-direction 186, or Z-direction 187. Since the serial sub-chain 282*b* is uni-directional, all allocated prefetch buffers in the sub-chain 282*b* are uni-directional allocated prefetch buffers (e.g., at least two of the prefetch buffer 255*c*, prefetch buffer 255*d*, data registers 275*a*, 275*b*, or 275*c*, and/or data registers 277*a*, 277*b*, or 277*c*). As another example, the serial sub-chain 282*b* is a multi-directional sub-chain if the channels 280*b* and 283 are disposed in two different directions (e.g., the channel 280*a* is disposed in the X-direction 185 and the channel 283 is disposed in the Y-direction 186). Since the serial sub-chain 282*b* is multi-directional, at least two allocated prefetch buffers in the sub-chain 282*b* are multi-directional allocated prefetch buffers (e.g., prefetch buffers 255*c* and 255*d* are multi-directional allocated prefetch buffers; e.g., data registers 275*a* and 277*a* are multi-directional allocated prefetch buffers; e.g., data registers 275*b* and 277*b* are multi-directional allocated prefetch buffers; and/or e.g., data registers 275*c* and 277*c* are multi-directional allocated prefetch buffers). Since a serial chain and/or a serial sub-chain in the memory topology 245 can be uni-directional or multi-directional, the serial chain and/or serial sub-chain can be appropriately disposed or configured to satisfy package constraints and/or other physical constraints that may be applicable to the memory topology 245.

A DMA descriptor 294 is loaded by a local processor (e.g., processor 120) into a DMA controller memory of the DMA controller 140*a*, in one example. In one example, the local processor initially creates a DMA descriptor 294. As another example, the local processor has a template in a locally accessible memory (e.g., RAM) that the local processor can access and control, and the local processor creates a DMA descriptor 294 from that template. In another example, the local processor 120 can instead inform a DMA controller 140*a* to read a DMA descriptor 294 in a given memory address of a memory (e.g., RAM) and the DMA controller will subsequently read the DMA descriptor 294 in that given memory address.

The DMA descriptor 294 is configurable via software (or firmware) that is executed by the local processor. The DMA descriptor 294 comprises control information that will control a given memory transaction to be performed by the DMA controller 140*a*. As an example, the DMA controller 140*a* intelligently determines and intelligently selects one of the serial chains (e.g., serial chain 282 and/or serial sub-chain 282*a* and/or serial sub-chain 282*b*) for use in a given memory transaction.

As an example, the control information in the descriptor 294 includes at least some of the following: the amount of bytes of the data to be transferred in the memory transaction, the source address of the data to be transferred in the memory transaction, the destination address of the data to be transferred in the memory transaction, the serial chain identifier that identifies the serial chain used for the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140*a* and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a DMA controller 140*a* may include a command/status register which is configurable via software (or firmware) that is executed by a local processor (e.g., IC processor 120). The register includes control information 294 used for the memory transaction and will advantageously relieve a firmware of having to write a descriptor that would have this control information 294.

In an embodiment of the invention, the descriptor 294 is passed from the DMA controller 140*a* to (and loaded into) a non-volatile memory controller (e.g., non-volatile memory controller 250*a*) that is directly coupled to the DMA controller 140*a*, and the non-volatile memory controller 250*a* will pass the descriptor 294 to the next non-volatile memory controllers (e.g., non-volatile memory controllers 250*b* and 250*c*) that are coupled to the non-volatile memory controller 250*a* in the buffer topology 265. A non-volatile memory controller in a serial chain and serial sub-chain will pass the descriptor 294 to the next given non-volatile memory controller in the given serial chain and given serial sub-chains and the descriptor 294 is passed serially along the given serial chain and given serial sub-chains.

In another embodiment of the invention, a derivative descriptor 295 is passed from the DMA controller 140*a* to a non-volatile memory controller that is directly coupled to the DMA controller 140*a*, and the non-volatile memory controller will pass the derivative descriptor to the next non-volatile memory controller in a given serial chain and given serial sub-chains and the derivative descriptor 295 is passed serially along the given serial chain and given serial sub-chains, as similarly discussed above.

The derivative descriptor 295 is a derivative of the descriptor 294 (or is extracted by the DMA controller 140*a* from the descriptor 294). After the descriptor 294 is loaded into the DMA controller 140*a*, the DMA controller 140*a* can parse the descriptor 294 in order to create the derivative descriptor 295 (or command 295 or sequence 295 or signal 295). The block 295 can also be a complete descriptor such as the descriptor 294 instead of a derivative descriptor. A descriptor 295 (or derivative descriptor 295 or command 295 or sequence 295 or signal 295) is intelligible to a given non-volatile memory controller (e.g., non-volatile memory controller 250*a*) in the buffer topology 265 so that the given non-volatile memory controller can perform a memory transaction.

A given non-volatile memory controller executes the derivative descriptor 295 or descriptor 294 to permit the given non-volatile memory controller to perform operations such as, for example, the given non-volatile memory controller storing data from a host into one or more non-volatile memory devices that are coupled to the given non-volatile memory controller or the given non-volatile memory controller reading stored data from one or more non-volatile memory devices that are coupled to the given non-volatile memory controller wherein the stored data read from a non-volatile memory device is passed by the storage apparatus 201 to a host 110. Alternatively or additionally, the non-volatile memory controller uses a command 295 and/or sequence 295 and/or signal 295 to perform an operation related to a memory transaction.

A given non-volatile memory controller executes the derivative descriptor 295 or descriptor 294 to permit the given non-volatile memory controller to intelligently select a serial sub-chain for performing a given memory transaction. For example, the non-volatile memory controller 250a intelligently selects the serial sub-chain 282a or the serial sub-chain 282b for performing a given memory transaction in the storage apparatus 201. Assume in this example that the non-volatile memory controller 250a has selected the serial sub-chain 282b for performing a given memory transaction. For a given memory transaction that is a write operation, the non-volatile memory controller 250c, for example, in the selected serial sub-chain 282b, can execute a descriptor 294 (or derivative descriptor 295) in a memory of the non-volatile memory controller 250c so that the non-volatile memory controller 250c stores write data (e.g., from a host) into a non-volatile memory device (e.g., non-volatile memory device 274a) that is coupled to the non-volatile memory controller 250c. On the other hand, for a given memory transaction that is a read operation, the non-volatile memory controller 250c, for example, in the selected serial sub-chain 282b can execute a descriptor 294 (or a derivative descriptor 295) in a memory of the non-volatile memory controller 250c so that the non-volatile memory controller 250c reads stored data from a non-volatile memory device (e.g., non-volatile memory device 274a) that is coupled to the non-volatile memory controller 250c, and the storage apparatus 201 passes the stored data from the non-volatile memory device 274a to a host 110. Of course, the non-volatile memory controller 250a can execute the descriptor 294 (or a derivative descriptor 295) so that the non-volatile memory controller 250a can intelligently select another serial sub-chain (e.g., serial sub-chain 282a) for performing a given memory transaction. Therefore, the descriptor 294 (or derivative descriptor 295) comprises control information that will control a given memory transaction to be performed by the non-volatile memory controller 250a. As an example, the non-volatile memory controller 250a intelligently determines and intelligently selects one of the serial sub-chains 282a or 282b for use in a given memory transaction, or the non-volatile memory controller 250a can write and store data into a non-volatile memory device (e.g., non-volatile memory device 268a) or can read stored data from a non-volatile memory device (e.g., non-volatile memory device 268a). Of course, more than two serial sub-chains can be directly coupled to (or associated with) the non-volatile memory controller 250a, and the non-volatile memory controller 250a intelligently selects a serial sub-chain among the more than two serial sub-chains for use in a given memory transaction.

As an example, the control information (in a descriptor 294 or a derivative descriptor 295) includes at least some of the following: the amount of bytes of the data to be transferred in the memory transaction, the source address of the data to be transferred in the memory transaction, the destination address of the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140a and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a non-volatile memory controller 250a may include a command/status register which is configurable via software (or firmware) that is executed by a local processor (e.g., processor 120). The register includes control information (in the descriptor 294 or the derivative descriptor 295) used for the memory transaction and will advantageously relieve a firmware of having to write a descriptor that would have this control information in the descriptor 294 or derivative descriptor 295.

As discussed above, the block 295 may be a descriptor, derivative descriptor, command or group or commands, sequence, or signal wherein the block 295 is transmitted between two controllers (e.g., between a DMA controller and a non-volatile memory controller or between two non-volatile memory controllers).

A derivative descriptor transmitted between two controllers may comprise some intact portions of the original descriptor 295 provided to the DMA descriptor 294 and some modified portions of the original descriptor 294. The intact portions may be, for example, the source address and the destination address (flash device address). A modified portion may include, for example, tagging (e.g., a tag that associates a reply with a previous command) and/or particular information in the handshaking between a DMA controller and a non-volatile memory controller or handshaking between two non-volatile memory controllers.

A sequence transmitted between two controllers may comprise a combination of commands, replies, status signals, handshaking signals, ping signals, and/or other signals between a DMA controller and a non-volatile memory controller, and/or between two non-volatile memory controllers in a serial chain or serial sub-chain. For example, a sequence may comprise handshaking and status signals, commands, ping signals, and/or replies between two controllers (e.g., between a DMA controller and a non-volatile memory controller, or between two non-volatile memory controllers) prior to, during, and after the transmission of data between the two controllers.

A signal transmitted between two controllers may comprise signals related to status, handshaking, data bytes, commands, replies, addresses, sideband signals, and/or other types of signals.

The non-volatile memory controller 250d is coupled in series to the non-volatile memory controller 250c. Therefore, the non-volatile memory controller buffer 255d is coupled in series to the non-volatile memory controller buffer 255c.

The non-volatile memory controller 250a is coupled in series to the DMA controller 140a. Therefore, the nonvolatile memory controller buffer 255a is coupled in series to the DMA controller buffer 160a.

In an example operation of the storage apparatus 201, the memory interface 105 responds to a memory transaction request 142 (e.g., memory read request 142) received via the host interface link 131 from a host 110a and received via the host interface 130. The memory interface 105 can respond to another memory transaction request 148 (e.g., another memory read request 148 that is subsequent to the memory read request 142) received via host interface link 131 from another host 110b or from the same host 110a. One or more host 110 can send memory transaction requests 142 or 148 to the memory interface 105 of the storage apparatus 201 via one or more host interface link 130. The number of hosts 110 and host interface links 133 that can be coupled to the storage apparatus 201 can vary as symbolically shown by the dot symbols 132 and 133, respectively. The memory interface 105 performs, on at least one memory module in the memory topology 245, a memory operation (e.g., a memory write operation or a memory read operation) that corresponds to the memory transaction request 142 that is requested by a host 110. For example, if the memory interface 105 receives a memory read transaction request 142, the memory interface 105 performs a read operation on at least one of the memory modules in the memory topology 245 and returns the result of the read operation, such as read data 196, along a host interface link 131 to a host 110 that sent the memory transaction request 142. Data returned as a result of the read operation is herein called "read data" 196.

The term "host", such as a host 110 shown in this embodiment, can be defined as any device that has the ability to transmit a memory read (or/and write) transaction request to storage apparatus 201. For example, this device may include a host 110 that can generate a memory transaction request 142 (e.g., memory read transaction request or/and memory write transaction request) and that can receive a response resulting from the processing of the memory transaction request 142 by the memory interface 105. The memory interface 105 may process memory transactions from one or more requesting device, such as at least one of the hosts 110a through 110b. For example, the host 110a may generate a memory read transaction request 142 that will cause the storage apparatus 201 to return a read data 196, while another host 110b may receive a response, such as a prefetch data 197 that is a result of another subsequent memory read transaction request 148 that is sent by the host 110b. As another example, the host 110a may generate a memory read transaction request 142 that will cause the storage apparatus 201 to return a read data 196, and the same host 110a may receive a response, such as a prefetch data 197 that is a result of another subsequent memory read transaction request 148 that is sent by the same host 110a. A prefetch data 197 is stored in a prefetch buffer as discussed above.

Since the serial chain 282 is expandable and since the serial sub-chain 282a is expandable and/or since the serial sub-chain 282b is expandable, the memory interface 105 can allocate an expanded number or expandable number or configurable number of prefetch buffers in the storage apparatus 201. By allocating an expanded number or expandable number or configurable number of prefetch buffers, the storage apparatus 201 further reduces latency in memory read operations in the storage apparatus 201. This further reduction in latency is not available in current systems.

Another example is now presented of prefetching transactions in the storage apparatus 201 in order to reduce latency in memory read transactions in the storage apparatus 201. As similarly discussed above, the system bus 125 is a conduit for transferring data between the DMA controller 140, the local processor 120, the local memory 135, and the host interface 130. The local processor 120, the host interface 130, and the DMA controller 140 may access the local memory 135 via the system bus 125 as needed.

The host 110a sends a memory read transaction request 142 to the storage apparatus 201 for data located in the memory topology 145. Operating under program control, the local processor 120 analyzes and responds to the memory read transaction request 142 by generating DMA instructions that will cause the DMA controller 140 to read this data from the memory topology 245 through at least the non-volatile memory controller 250a. If this data is available, a non-volatile memory controller 250 will retrieve this data from a non-volatile memory device with this data. For example, if this data is in the non-volatile memory device 268a, then the non-volatile memory controller 250a will retrieve this data from the non-volatile memory device 268a. The non-volatile memory controller 250a then transfers this data to the DMA controller 140. The DMA controller 140 then transfers this data to the local memory 135, and the local processor 120 then eventually transfers this data from the local memory 135 to the host 110a via the host interface 130. Data obtained during this memory read transaction request is herein named "read data".

As another example, if this data is in the non-volatile memory device 272a, then the non-volatile memory controller 250b will retrieve this data from the non-volatile memory device 272a. The non-volatile memory controller 250b then transfers this data to the non-volatile memory controller 250a. The non-volatile memory controller 250a then transfers this data to the DMA controller 140. The DMA controller 140 then transfers this data to the local memory 135, and the local processor 120 then eventually transfers this data from the local memory 135 to the host 110a via the host interface 130. As noted above, data obtained during this memory read transaction request is herein named "read data".

The local processor 120 also identifies "prefetch data". Prefetch data is any data currently stored in memory topology 245 that meets a prefetch selection criterion. This prefetch selection criterion may include a relationship between the read data and any stored data. For example, this prefetch selection criterion may be met if stored data exists wherein the stored data has a memory address within a selected memory address range from the memory address of the read data. In another example, memory interface 105 determines whether this prefetch selection criterion is met by determining whether any stored data exists in memory topology 245 wherein the stored data has a memory address within the same page as a memory address associated with the read data. The type of relationship between the read data and stored data is not intended to be limiting in any way. Any type of relationship may be used that increases the likelihood that the stored data selected for prefetching will be later requested by a host 110 coupled to a memory interface 105.

The local processor 120 may also perform an additional read operation, called an internal read operation. This internal read operation is a process executed by the local processor 120 to retrieve prefetch data 197 from the memory topology 245. This internal read operation includes the local processor 120 sending an instruction 198 to the DMA controller 140 to retrieve (via at least one non-volatile memory controller 250) a prefetch data 197 from the memory topology 245. For example, if the memory topology 245 addresses stored data by flash page, the instruction 198 contains the address of the specific flash page within a flash memory device (in memory topology 245) that holds the prefetch data 197. The instruction 198 also causes the DMA controller 140 to retrieve (via at least one non-volatile memory controller 250) a prefetch data 197 from the flash page and flash memory device (in memory topology 245) identified by the address mentioned above.

When the DMA controller 140 receives the instruction 198, the instruction 198 causes the DMA controller 140 to use at least one non-volatile memory controller 250 to cause at least one non-volatile memory device (in memory topology 245) to transfer the prefetch data 197. The internal read operation also includes the local processor 120 allocating at least one prefetch buffer to store the prefetch data 197. Allocating at least one prefetch buffer may be performed statically, such as at the time of manufacture, performed dynamically by the local processor 120, or both. In one embodiment of the invention, the processor 120 will allocate a number of prefetch buffers based on an amount of storage needed for a given prefetch data 197. For example, the memory interface 105 (including the processor 120) allocates a data register (e.g., data register 267a) in a non-volatile memory device (e.g., non-volatile memory device 268a) and a prefetch buffer 255a (in the non-volatile memory controller 250a) as storage space suitable for storing (buffering) the prefetch data 197. This action by the memory interface 105 may also render buffers (that have not been allocated as prefetch buffers), such as the data registers 267b and 267c and buffers 255b and 255c to be available to storage apparatus 201 for other memory uses. As discussed above, buffers in the storage apparatus 201 that are allocated as prefetch buffers for storing prefetch data are denoted herein as "prefetch buffers". If a host (host 110a and/or 110b) transmits a second memory read transaction request 148 to the storage apparatus 201 for data (wherein the second memory read transaction request 148 is subsequent to the first memory read transaction request 142), and this data has been previously stored as a prefetch data 197 in a prefetch buffer in the storage apparatus 201, then the local processor 120 responds by retrieving the prefetch data 197 from a prefetch buffer in the storage apparatus 201 and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the prefetch data 197 may instead be sent directly to the host (host 110a and/or 110b) or processed in any other manner envisioned by a user. As also discussed above, the processor 120 can additionally allocate memory space 134 in the system memory 135 as a prefetch buffer for storing prefetch data 197 and/or can additionally allocate the DMA buffer 160a as a prefetch buffer for storing prefetch data 197.

As another example, the memory interface 105 (including the processor 120) allocates at least one prefetch buffer in the serial chain 282, at least one prefetch buffer in the serial sub-chain 282a, and at least one prefetch buffer in the serial sub-chain 282b. Therefore, the memory interface 105 allocates an increased number of prefetch buffers compared to conventional systems. For example, the memory interface 105 allocates at least the following prefetch buffers: (1) in the serial chain 282, the memory interface 105 allocates as prefetch buffers at least one of the buffer 255a, data registers 267a, 267b, and 267c; (2) in the serial chain 282a, the memory interface 105 allocates as prefetch buffers at least one of the buffer 255b, data registers 273a, 273b, and 273c; and (3) in the serial chain 282b, the memory interface 105 allocates as prefetch buffers at least one of the buffer 255ac, data registers 275a, 275b, and 275c. The memory interface 105 can additionally allocate as prefetch buffers, at least one of the following: (1) at least an additional buffer in an additional non-volatile memory controller coupled to the non-volatile memory controller 250b in the serial sub-chain 282a and/or at least one data register in at least one non-volatile memory device coupled to that additional non-volatile memory controller in the serial sub-chain 282a; and/or (2) the prefetch buffer 255d in the non-volatile memory controller 250d and/or at least one of the data registers 277a, 277b, and 277d; and/or (3) at least an additional buffer in an additional non-volatile memory controller coupled to the non-volatile memory controller 250d in the serial sub-chain 282b and/or at least one data register in at least one non-volatile memory device coupled to that additional non-volatile memory controller in the serial sub-chain 282b; and/or at least one additional buffer and/or at least one data register in a serial sub-chain branch (e.g., branch 251 in FIG. 2B or branch 252 in FIG. 2C) that is coupled to the non-volatile memory controller 250c.

Therefore, the serial chain 282 and serial sub-chains 282a and 282b permit the memory interface 105 (and processor 120) to allocate an increased number of prefetch buffers for storing prefetch data in the serial chain 282 and serial sub-chains 282a and 282b. Since there is an increased number of prefetch buffers in the storage apparatus 201, the prefetch data 197 can be much larger in size as compared to prefetch data that are stored in conventional systems. Additionally, the memory interface 105 (and processor 120) can allocate the buffer 160a (in DMA controller 140a) as a prefetch buffer and/or can allocate memory space 134 in the local memory 135 as a prefetch buffer in addition to allocated prefetch buffers in the serial chain 282 and serial sub-chains 282a and 282b.

Note that the number non-volatile memory devices 268 and data registers 267 in the non-volatile memory module 271a may vary as symbolically shown by the dot symbols 299a.

Note that the number non-volatile memory devices 272 and data registers 273 in the non-volatile memory module 271b may vary as symbolically shown by the dot symbols 299b.

Note that the number non-volatile memory devices 274 and data registers 275 in the non-volatile memory module 271c may vary as symbolically shown by the dot symbols 299c.

Note that the number non-volatile memory devices 276 and data registers 277 in the non-volatile memory module 271d may vary as symbolically shown by the dot symbols 299d.

If a host (host 110a and/or 110b) transmits a second memory read transaction request 148 to the storage apparatus 201 for data (wherein the second memory read transaction request 148 is subsequent to the first memory read transaction request 142), and this data has been previously stored as a prefetch data 197 in prefetch buffers that are allocated in the serial chain 282 and serial sub-chains 282a and/or 282b (such as, for example, the example allocated prefetch buffers in the serial chain 282 and serial sub-chains 282b as discussed above), then the local processor 120 responds by retrieving the prefetch data 197 from the prefetch buffers in the serial chain 282 and serial sub-chains 282*a* and 282*b* and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110*a* and/or host 110*b*). One of ordinary skill in the art having the benefit of this disclosure would readily recognize that rather than using a local memory 135 to store prefetch data 197, the prefetch data 197 may instead be sent directly to the host (host 110*a* and/or 110*b*) or processed in any other manner envisioned by a user. As also discussed above, the processor 120 can additionally allocate memory space in the system memory 135 as a prefetch buffer for storing prefetch data 197 and/or can additionally allocate the DMA buffer 160*a* as a prefetch buffer for storing prefetch data 197.

Figure 2B:
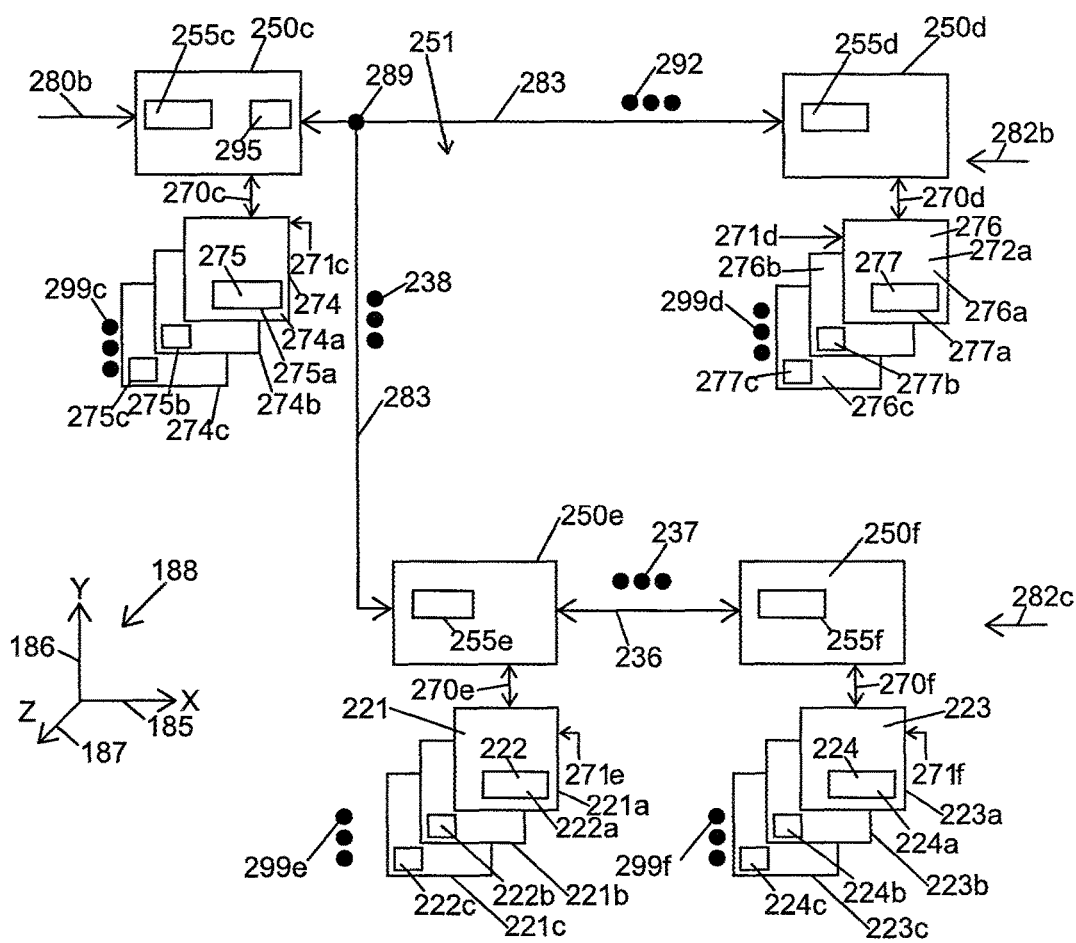
FIG. 2B is a block diagram of a branch of a serial sub-chain, in accordance with an embodiment of the invention.
Figure 2C:
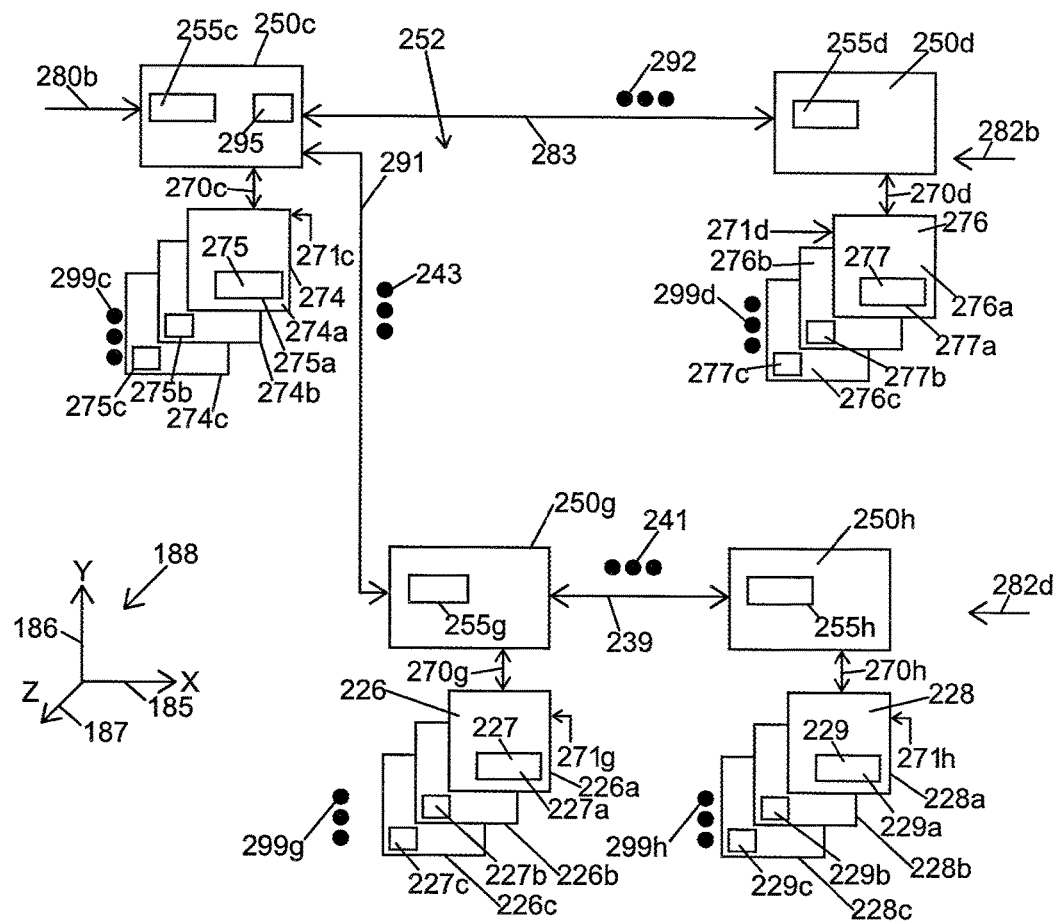
FIG. 2C is a block diagram of a branch of a serial sub-chain, in accordance with another embodiment of the invention.

FIG. 2B is a block diagram of a branch 251 from a serial sub-chain, in accordance with an embodiment of the invention. As similarly discussed above, the serial sub-chain branch 251 is coupled via the link 283 and node 289 to the non-volatile memory controller 250*c*. The serial sub-chain branch 251 comprises at least one of the non-volatile memory controller 250*e* and a non-volatile memory module 271*e* that is coupled to the non-volatile memory controller 250*e*. The branch 251 may further include a non-volatile memory controller 250*f* that is coupled via a channel 236 to the non-volatile memory controller 250*e* and a non-volatile memory module 271*f* that is coupled to the non-volatile memory controller 250*f*.

The non-volatile memory controller 250*e* is coupled via a memory bus 270*e* (or via a plurality of memory buses 270*e*) to a non-volatile memory module 271*e*. As an example, the non-volatile memory module 271*e* comprises a plurality of non-volatile memory devices 221 that may vary in number (e.g., non-volatile memory devices 221*a*, 221*b*, and 221*c*). As another example, the non-volatile memory module 271*e* comprises a single non-volatile memory device (e.g., non-volatile memory device 221*a*).

The non-volatile memory controller 250*f* is coupled via a memory bus 270*f* (or via a plurality of memory buses 270*f*) to a non-volatile memory module 271*f*. As an example, the non-volatile memory module 271*f* comprises a plurality of non-volatile memory devices 223 that may vary in number (e.g., non-volatile memory devices 223*a*, 223*b*, and 223*c*). As another example, the non-volatile memory module 271*f* comprises a single non-volatile memory device (e.g., non-volatile memory device 223*a*).

The branch 251 forms another serial sub-chain 282*c* in the serial chain 282.

The branch 251 can be expanded one or more directions (e.g., X-direction 185, Y-direction 186, and/or Z-direction 187). For example, the non-volatile memory controller 250*f* is coupled via the channel 236 to the non-volatile memory controller 250*e*. The channel 236 can perform at least some of the above discussed operations of the channel 283 in order to permit the non-volatile memory controller 250*e* and the non-volatile memory controller 250*f* to communicate with each other. For example, the channel 236 comprises one or more point-to-point lines which can be, for example, one flashbus or a plurality of flashbuses for transmitting signals such as command, status, response, address, and data bytes between the non-volatile memory controllers 250*e* and 250*f*. The two non-volatile memory controllers 250*e* and 250*f* can transmit the above-mentioned signals to each other via the channel 236 between the two non-volatile memory controllers 250*e* and 250*f*. A non-volatile memory controller (controllers 250*e* or 250*f*) can process the above-mentioned signals via cutthrough, store forward, or/and buffering.

As an example, the channel 236 comprises one or more point-to-point lines which can be, for example, a data bus that uses standard specification or a bus that uses a proprietary protocol (e.g., one flashbus or a plurality of flashbuses), wherein the channel 236 is configured for transmitting signals such as command, status, response, address, and data bytes between the non-volatile memory controller 250*e* and 250*f*.

In an embodiment of the invention, the channel 236 and the non-volatile memory controller 250*f* is included in the second serial chain 282 (and third serial sub-chain 282*c*) or can be omitted from the second serial chain 282 (and third serial sub-chain 282*c*).

The memory module 271*e* is included in the third serial sub-chain 282*c*. The memory module 271*f* may be included in the third serial sub-chain 282*c* (and serial sub-chain branch 251) if the non-volatile memory controller 250*f* is included in the second serial chain 282 (and third serial sub-chain 282*c*).

Additionally or alternatively, the serial sub-chain 282*c* is expandable as now discussed. A similar first type of signal path layout 184 (FIG. 1A) can be coupled between the non-volatile memory controller 250*f* and at least another non-volatile memory controller in the serial sub-chain 282*c* or another type of signal path layout (e.g., similar to a second type of signal path layout 284 in FIG. 2A) can be coupled between the non-volatile memory controller 250*f* and at least another non-volatile memory controller in the serial sub-chain 282*c*. At least one more of a given type of signal path layout (e.g., similar to layout 184 or layout 284) and at least one more non-volatile memory controller can further be added in the serial sub-chain 282*c* so that serial chain 282 (and/or serial sub-chain 282*c*) is expanded in a given direction (e.g., X-direction 185).

Additionally or alternatively, the serial sub-chain 282*c* is expandable as now discussed. A similar first type of signal path layout 184 (FIG. 1A) can be coupled between the non-volatile memory controller 250*e* and at least another non-volatile memory controller that can be coupled to the controller 250*e* or another type of signal path layout (e.g., similar to a second type of signal path layout 284 in FIG. 2A) can be coupled between the non-volatile memory controller 250*e* and at least another non-volatile memory controller that can be coupled to the controller 250*e*. This at least another non-volatile memory controller can be coupled to the channel 236 via a node (similar to node 189) so as to expand the serial chain 282 in yet another additional branch in a given direction (e.g., direction 185, direction 186, or direction 187). Therefore, this yet additional branch could be configured from the non-volatile memory controller 250*e* via a node to further expand the serial chain 282 with at least an additional prefetch buffer that is included in the at least one non-volatile memory controller and/or in the at least one non-volatile memory device in this yet additional branch, wherein this at least additional prefetch buffer is configured to store prefetch data. In this example, this yet additional branch will have a layout that is similar to the layout 184 in FIG. 1A. Alternatively, this yet additional branch could be configured directly from the non-volatile memory controller 250*e* to further expand the serial chain 282 with at least an additional prefetch buffer that is included in the at least one non-volatile memory controller and/or in the at least one non-volatile memory device in this yet additional branch, wherein this at least additional prefetch buffer is configured to store prefetch data; in the example wherein this yet additional branch could be configured directly from the non-volatile memory controller 250e via a link (similar to link 191), this yet additional branch would have a layout that is similar to the layout 284 in FIG. 2A. This link could be similar to the link 280b in FIG. 2A that forms a serial sub-chain that is similar to the serial sub-chain 282b.

The number of non-volatile memory controllers in the branch 251 (serial sub-chain 282c) may vary as shown by the dot symbols 237.

The number of serial sub-chains in the branch 251 may vary as shown by the dot symbols 238. Therefore, in one embodiment, the branch 251 comprises a single serial sub-chain 282c with at least one of the non-volatile memory controllers 250e and/or 250f and with at least one of the memory modules 271e and/or 271f, respectively. In another embodiment, the branch 251 comprises one or more additional serial sub-chains in addition to the serial sub-chain 282c in the branch 251.

Handshaking and data transmission between two non-volatile memory controllers (e.g., non-volatile memory controllers 250e and 250f) can be performed by different IC protocols. The non-volatile memory controllers 250e and 250f can perform functions that are similar to the functions performed by the non-volatile memory controllers shown in FIG. 2A.

In an embodiment of the invention, the non-volatile memory controller 250c will pass the derivative descriptor 295 to the next non-volatile memory controller(s) (e.g., non-volatile memory controllers 250d and 250e) in a given serial chain and given serial sub-chains and the derivative descriptor 295 is passed serially along the given serial chain and given serial sub-chains (e.g., the derivative descriptor 295 is passed to the non-volatile memory controller 250f and other controllers in the serial sub-chain 282c), as similarly discussed above. Details of the derivative descriptor 295 have been described above. For example, the non-volatile memory controller 250c intelligently selects the serial sub-chain 282b or the serial sub-chain 282c for performing a given memory transaction in the storage apparatus 201. The functions performed in the serial sub-chain 282c are similar to the functions performed in the other serial sub-chains (e.g., sub-chain 282b).

In one embodiment, the non-volatile memory controllers 250d and 250e are both coupled in parallel via the node 289 to the non-volatile memory controller 250c. Therefore, in this embodiment, the non-volatile memory controller buffers 255d (in controller 250d) and 255e (in controller 250e) are both coupled in parallel via the node 289 to the non-volatile memory controller buffer 255c (in controller 250c).

The non-volatile memory controller 250f is coupled in series to the non-volatile memory controller 250e. Therefore, the non-volatile memory controller buffer 255f (in controller 250f) is coupled in series to the non-volatile memory controller buffer 255e.

As an example, the data register 277a (which has been allocated as a prefetch buffer in the non-volatile memory device 276a) and the data register 222a (which has been allocated as a prefetch buffer in the non-volatile memory device 221a) are both coupled in parallel via the node 289 to the data register 275a (which has been allocated as a prefetch buffer in the non-volatile memory device 274a). As similarly discussed above, other data registers in any non-volatile memory devices in FIG. 2B may be, additionally or alternatively, allocated as prefetch buffers for storing prefetch data. Therefore, other data registers in FIG. 2B may be coupled in parallel.

As an example, the data register 222a is coupled in series to the data register 224a (which has been allocated as a prefetch buffer in the non-volatile memory device 223a). Other data registers in FIG. 2B may be coupled in series.

The prefetch buffer 255c and the prefetch buffer 255e may be disposed in a same direction (e.g. X-direction 185) or may each be disposed in different directions (e.g., prefetch buffer 255c may be in the X-direction 185 and prefetch buffer 255e may be in the Y-direction 186). The prefetch buffer 255f may be in the X-direction 185, Y-direction 186, or Z-direction 187.

The non-volatile memory devices 221a, 221b, and 221c comprises data the data registers 222a, 222b, and 222c, respectively. The memory interface 105 can allocate one or more of the data registers 222a-222c as prefetch buffers as similarly discussed above for other data registers.

Note that the number non-volatile memory devices 221 and data registers 222 in the non-volatile memory module 271e may vary as symbolically shown by the dot symbols 299e.

The non-volatile memory devices 223a, 223b, and 223c comprises data the data registers 224a, 224b, and 224c, respectively. The memory interface 105 can allocate one or more of the data registers 224a-224c as prefetch buffers as similarly discussed above for other data registers.

Note that the number non-volatile memory devices 223 and data registers 224 in the non-volatile memory module 271f may vary as symbolically shown by the dot symbols 299f.

The serial sub-chain 282c may be in the same direction (e.g., direction 185, direction 186, or direction 187) as the direction of the direction of the serial sub-chain 282b. Alternatively, the serial sub-chain 282c may be in a direction that is different from the direction of the serial sub-chain 282b.

As an example, the serial sub-chain 282c is a uni-directional serial sub-chain if the channels 283 and 236 are disposed in a same direction (e.g., X-direction 185, Y-direction 186, or Z-direction 187). Since the serial sub-chain 282c is uni-directional, all allocated prefetch buffers in the sub-chain 282c are uni-directional allocated prefetch buffers (e.g., at least two of the prefetch buffer 255e, prefetch buffer 255f, data registers 222a, 222b, or 222c, and/or data registers 224a, 224b, or 224c). As another example, the serial sub-chain 282c is a multi-directional sub-chain if the channels 283 and 236 are disposed in two different directions (e.g., the channel 283 is disposed in the X-direction 185 and the channel 236 is disposed in the Y-direction 186). Since the serial sub-chain 282c is multi-directional, at least two allocated prefetch buffers in the sub-chain 282c are multi-directional allocated prefetch buffers (e.g., prefetch buffers 255e and 255f are multi-directional allocated prefetch buffers; e.g., data registers 222a and 224a are multi-directional allocated prefetch buffers; e.g., data registers 222b and 224b are multi-directional allocated prefetch buffers; and/or e.g., data registers 222c and 224c are multi-directional allocated prefetch buffers). Since a serial chain and/or a serial sub-chain in the memory topology 245 can be uni-directional or multi-directional, the serial chain and/or serial sub-chain can be appropriately disposed or configured to satisfy package constraints and/or other physical constraints that may be applicable to the memory topology 245.

It is noted that a similar branch 251 can be coupled to at least one additional non-volatile memory controller in the serial chain 282.

FIG. 2C is a block diagram of a branch 252 from a serial sub-chain, in accordance with another embodiment of the invention. As similarly discussed above, the serial sub-chain branch 252 is coupled via the link 291 to the non-volatile memory controller 250c. The serial sub-chain branch 252 comprises at least one of the non-volatile memory controller 250g and a non-volatile memory module 271g that is coupled to the non-volatile memory controller 250g. The branch 252 may further include a non-volatile memory controller 250h that is coupled via a channel 239 to the non-volatile memory controller 250g and a non-volatile memory module 271h that is coupled to the non-volatile memory controller 250h.

The non-volatile memory controller 250g is coupled via a memory bus 270g (or via a plurality of memory buses 270g) to a non-volatile memory module 271g. As an example, the non-volatile memory module 271g comprises a plurality of non-volatile memory devices 226 that may vary in number (e.g., non-volatile memory devices 226a, 226b, and 226c). As another example, the non-volatile memory module 271g comprises a single non-volatile memory device (e.g., non-volatile memory device 226a).

The non-volatile memory controller 250h is coupled via a memory bus 270h (or via a plurality of memory buses 270h) to a non-volatile memory module 271h. As an example, the non-volatile memory module 271h comprises a plurality of non-volatile memory devices 228 that may vary in number (e.g., non-volatile memory devices 228a, 228b, and 228c). As another example, the non-volatile memory module 271h comprises a single non-volatile memory device (e.g., non-volatile memory device 228a).

The branch 252 forms another serial sub-chain 282d in the serial chain 282.

The branch 252 can be expanded one or more directions (e.g., X-direction 185, Y-direction 186, and/or Z-direction 187). For example, the non-volatile memory controller 250h is coupled via a channel 239 to the non-volatile memory controller 250g. The channel 239 can perform at least some of the above discussed operations of the channel 283 in order to permit the non-volatile memory controller 250g and the non-volatile memory controller 250h to communicate with each other. For example, the channel 239 comprises one or more point-to-point lines which can be, for example, one flashbus or a plurality of flashbuses for transmitting signals such as command, status, response, address, and data bytes between the non-volatile memory controllers 250g and 250h. The two non-volatile memory controllers 250g and 250h can transmit the above-mentioned signals to each other via the channel 239 between the two non-volatile memory controllers 250g and 250h. A non-volatile memory controller (controllers 250g or 250h) can process the above-mentioned signals via cutthrough, store forward, or/and buffering.

As an example, the channel 239 comprises one or more point-to-point lines which can be, for example, a data bus that uses standard specification or a bus that uses a proprietary protocol (e.g., one flashbus or a plurality of flashbuses), wherein the channel 239 is configured for transmitting signals such as command, status, response, address, and data bytes between the non-volatile memory controller 250g and 250h.

In an embodiment of the invention, the channel 239 and the non-volatile memory controller 250h is included in the second serial chain 282 (and fourth serial sub-chain 282d) or can be omitted from the second serial chain 282 (and fourth serial sub-chain 282d).

The memory module 271g is included in the fourth serial sub-chain 282d. The memory module 271h may be included in the fourth serial sub-chain 282d (and serial sub-chain branch 252) if the non-volatile memory controller 250h is included in the second serial chain 282 (and fourth serial sub-chain 282d).

Additionally or alternatively, the serial sub-chain 282d is expandable as now discussed. A similar first type of signal path layout 184 (FIG. 1A) can be coupled between the non-volatile memory controller 250h and at least another non-volatile memory controller in the serial sub-chain 282d or another type of signal path layout (e.g., similar to a second type of signal path layout 284 in FIG. 2A) can be coupled between the non-volatile memory controller 250h and at least another non-volatile memory controller in the serial sub-chain 282d. At least one more of a given type of signal path layout (e.g., similar to layout 184 or layout 284) and at least one more non-volatile memory controller can further be added in the serial sub-chain 282d so that serial chain 282 (and/or serial sub-chain 282d) is expanded in a given direction (e.g., X-direction 185).

Additionally or alternatively, the serial sub-chain 282d is expandable as now discussed. A similar first type of signal path layout 184 (FIG. 1A) can be coupled between the non-volatile memory controller 250g and at least another non-volatile memory controller that can be coupled to the controller 250g or another type of signal path layout (e.g., similar to a second type of signal path layout 284 in FIG. 2A) can be coupled between the non-volatile memory controller 250g and at least another non-volatile memory controller that can be coupled to the controller 250g. This at least another non-volatile memory controller can be coupled to the channel 239 via a node (similar to node 189) so as to expand the serial chain 282 in another yet additional branch in a given direction (e.g., direction 185, direction 186, or direction 187). Therefore, this yet additional branch could be configured from the non-volatile memory controller 250g via a node to further expand the serial chain 282 with at least an additional prefetch buffer that is included in the at least one non-volatile memory controller and/or in the at least one non-volatile memory device in this yet additional branch, wherein this at least additional prefetch buffer is configured to store prefetch data. In this example, this yet additional branch will have a layout that is similar to the layout 184 in FIG. 1A. Alternatively, this yet additional branch could be configured directly from the non-volatile memory controller 250g to further expand the serial chain 282 with at least an additional prefetch buffer that is included in the at least one non-volatile memory controller and/or in the at least one non-volatile memory device in this yet additional branch, wherein this at least additional prefetch buffer is configured to store prefetch data; in the example wherein this yet additional branch could be configured directly from the non-volatile memory controller 250g via a link (similar to link 191), this yet additional branch would have a layout that is similar to the layout 284 in FIG. 2A. This link could be similar to the link 280b in FIG. 2A that forms a serial sub-chain that is similar to the serial sub-chain 282b.

The number of non-volatile memory controllers in the branch 252 (serial sub-chain 282d) may vary as shown by the dot symbols 241.

The number of serial sub-chains in the branch 252 may vary as shown by the dot symbols 243. Therefore, in one embodiment, the branch 252 comprises a single serial sub-chain 282d with at least one of the non-volatile memory controllers 250g and/or 250h and with at least one of the memory modules 271g and/or 271h, respectively. In another embodiment, the branch 252 comprises one or more additional serial sub-chains in addition to the serial sub-chain 282d in the branch 252.

Handshaking and data transmission between two non-volatile memory controllers (e.g., non-volatile memory controllers 250g and 250h) can be performed by different IC protocols. The non-volatile memory controllers 250g and 250h can perform functions that are similar to the functions performed by the non-volatile memory controllers shown in FIG. 2A.

In an embodiment of the invention, the non-volatile memory controller 250c will pass the derivative descriptor 295 to the next non-volatile memory controller(s) (e.g., non-volatile memory controllers 250d and 250g) in a given serial chain and given serial sub-chains and the derivative descriptor 295 is passed serially along the given serial chain and given serial sub-chains (e.g., the derivative descriptor 295 is passed to the non-volatile memory controller 250h and another non-volatile memory controller that may be in the serial sub-chain 282d), as similarly discussed above. Details of the derivative descriptor 295 have been described above. For example, the non-volatile memory controller 250c intelligently selects the serial sub-chain 282b or the serial sub-chain 282d for performing a given memory transaction in the storage apparatus 201. The functions performed in the serial sub-chain 282d are similar to the functions performed in the other serial sub-chains (e.g., sub-chain 282b).

In an embodiment, the non-volatile memory controllers 250d and 250g are both coupled in parallel to the non-volatile memory controller 250c via the channel 283 and 291, respectively. The channels 283 and 291 are signal paths that are separated (or electrically insulated) from each other and that are each coupled to the non-volatile memory controller 250c for transmitting data, control signals, and other suitable signals, while providing ease of manufacturing due to the separated signal paths of the channels 283 and 291. Therefore, in this embodiment, the non-volatile memory controller buffers 255d (in controller 250d) and 255g (in controller 250g) are both coupled in parallel to the non-volatile memory controller buffer 255c (in controller 250c).

The non-volatile memory controller 250g is coupled in series to the non-volatile memory controller 250h. Therefore, the non-volatile memory controller buffer 255h (in controller 250h) is coupled in series to the non-volatile memory controller buffer 255g.

As an example, the data register 277a (which has been allocated as a prefetch buffer in the non-volatile memory device 276a) and the data register 227a (which has been allocated as a prefetch buffer in the non-volatile memory device 226a) are both coupled in parallel via the channels 283 and 291, respectively, to the data register 275a (which has been allocated as a prefetch buffer in the non-volatile memory device 274a). As similarly discussed above, other data registers in any non-volatile memory devices in FIG. 2C may be, additionally or alternatively, allocated as prefetch buffers for storing prefetch data. Therefore, other data registers in FIG. 2C may be coupled in parallel.

As an example, the data register 226a is coupled in series to the data register 229a (which has been allocated as a prefetch buffer in the non-volatile memory device 228a). Other data registers in FIG. 2C may be coupled in series.

The prefetch buffer 255c and the prefetch buffer 255g may be disposed in a same direction (e.g. X-direction 185) or may each be disposed in different directions (e.g., prefetch buffer 255c may be in the X-direction 185 and prefetch buffer 255g may be in the Y-direction 186). The prefetch buffer 255h may be in the X-direction 185, Y-direction 186, or Z-direction 187.

The non-volatile memory devices 226a, 226b, and 226c comprises data the data registers 227a, 227b, and 227c, respectively. The memory interface 105 can allocate one or more of the data registers 227a-227c as prefetch buffers as similarly discussed above for other data registers.

Note that the number non-volatile memory devices 226 and data registers 227 in the non-volatile memory module 271g may vary as symbolically shown by the dot symbols 299g.

The non-volatile memory devices 228a, 228b, and 228c comprises data the data registers 229a, 229b, and 229c, respectively. The memory interface 105 can allocate one or more of the data registers 229a-229c as prefetch buffers as similarly discussed above for other data registers.

Note that the number non-volatile memory devices 228 and data registers 229 in the non-volatile memory module 271h may vary as symbolically shown by the dot symbols 299h.

The serial sub-chain 282d may be in the same direction (e.g., direction 185, direction 186, or direction 187) as the direction of the direction of the serial sub-chain 282b. Alternatively, the serial sub-chain 282d may be in a direction that is different from the direction of the serial sub-chain 282b.

As an example, the serial sub-chain 282d is a uni-directional serial sub-chain if the channels 291 and 239 are disposed in a same direction (e.g., X-direction 185, Y-direction 186, or Z-direction 187). Since the serial sub-chain 282d is uni-directional, all allocated prefetch buffers in the sub-chain 282d are uni-directional allocated prefetch buffers (e.g., at least two of the prefetch buffer 255g, prefetch buffer 255h, data registers 227a, 227b, or 227c, and/or data registers 229a, 229b, or 229c). As another example, the serial sub-chain 282d is a multi-directional sub-chain if the channels 291 and 239 are disposed in two different directions (e.g., the channel 291 is disposed in the X-direction 185 and the channel 239 is disposed in the Y-direction 186). Since the serial sub-chain 282d is multi-directional, at least two allocated prefetch buffers in the sub-chain 282d are multi-directional allocated prefetch buffers (e.g., prefetch buffers 255g and 255h are multi-directional allocated prefetch buffers; e.g., data registers 227a and 229a are multi-directional allocated prefetch buffers; e.g., data registers 227b and 229b are multi-directional allocated prefetch buffers; and/or e.g., data registers 227c and 229c are multi-directional allocated prefetch buffers). Since a serial chain and/or a serial sub-chain in the memory topology 245 can be uni-directional or multi-directional, the serial chain and/or serial sub-chain can be appropriately disposed or configured to satisfy package constraints and/or other physical constraints that may be applicable to the memory topology 245.

It is noted that a similar branch 252 can be coupled to at least one additional non-volatile memory controller in the serial chain 282.

Figure 3:
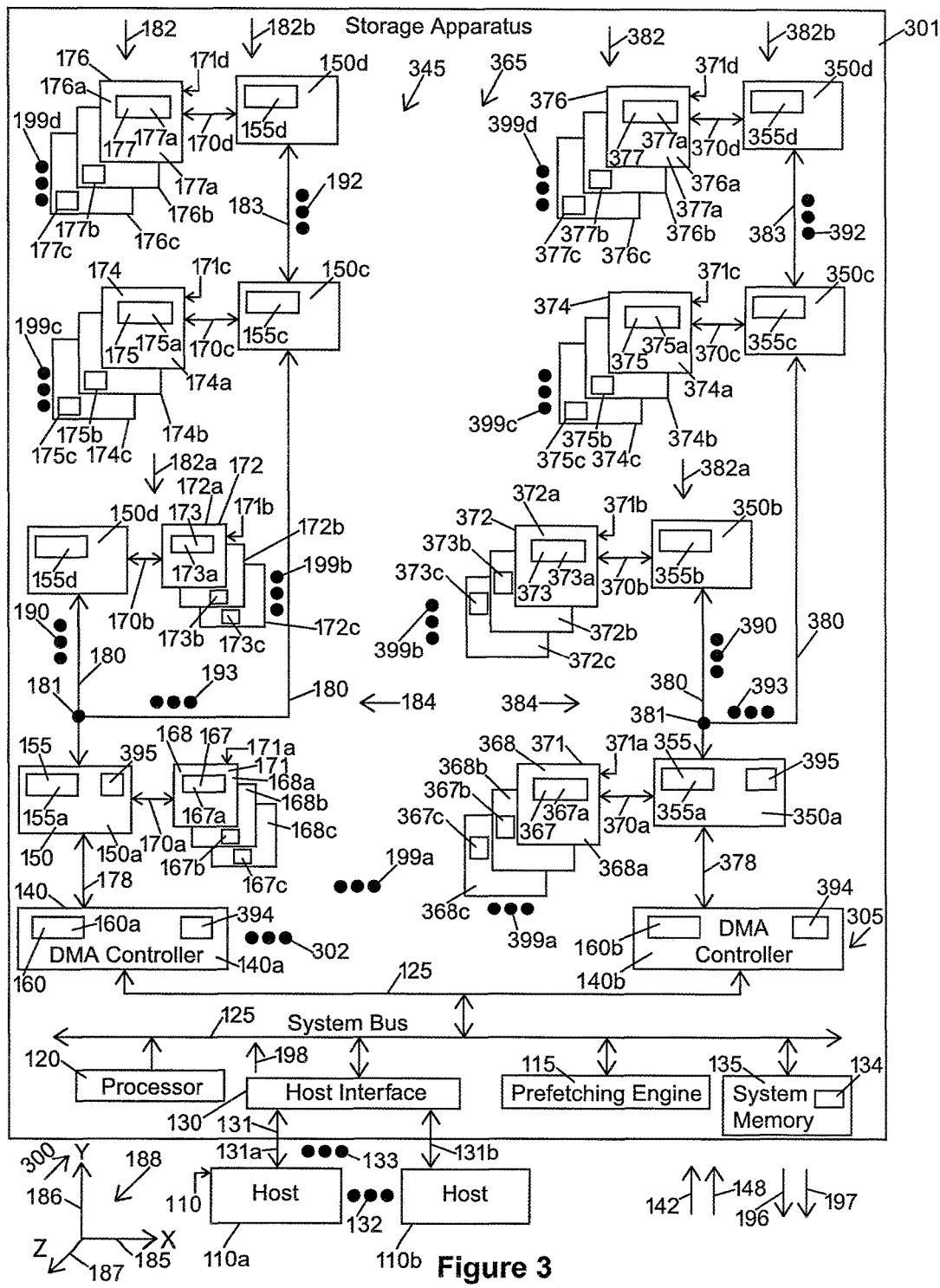
FIG. 3 is a block diagram of a storage system, in accordance with another embodiment of the invention.

FIG. 3 is a block diagram that illustrates a system 300 (or apparatus 300), in accordance with another embodiment of the invention. The system 300 (apparatus 300) comprises a data storage apparatus 301 (data storage system 301) with configurable prefetch buffers for storing prefetch data. In an embodiment of the invention, the configurable prefetch buffers may be serially configurable prefetch buffers, and/or serially expandable prefetch buffers, and/or are expandable uni-directional prefetch buffers, and/or are expandable multi-directional prefetch buffers.

The data storage apparatus 301 comprises at least some of the elements in the data storage apparatus 101 (FIG. 1A) and additional element that will be discussed below. For example, the storage apparatus 301 comprises the serial chain 182, serial sub-chain 182a, serial sub-chain 182b that have been described above. The storage apparatus 301 may further comprise one or more branches 151 (FIG. 1B) and/or one or more branches 152 (FIG. 1C) that are included in the serial chain 182. The operation and functions of the serial chain 182, serial sub-chain 182a, and serial sub-chain 182b have been similarly described above.

One or more hosts 110 may be communicatively coupled to the storage apparatus 301 and can transmit the requests 142 and 148 to the storage apparatus 301 and can receive the read data 196 and prefetch data 197 from the storage apparatus 301. Example memory transactions regarding the requests 142 and 148, read data 196, and prefetch data 197 have been similarly discussed above.

The storage apparatus 301 may include other features of (and may perform other functions of) the storage apparatus 101 as similarly discussed above with reference to FIGS. 1A, 1B, and 1C.

The storage apparatus 301 further comprises a memory interface 305 which has similar elements and functions as the memory interface 105 as discussed above. In an embodiment of the invention, the storage apparatus 301 comprises a plurality of DMA controllers 140. For example, the storage apparatus 301 comprises the DMA controllers 140a and 140b that are both coupled to the system bus 125. The DMA controller 140a is coupled to the serial chain 182 as similarly discussed above. The DMA controller 140b is coupled to the serial chain 382 which will be discussed below. The number of DMA controllers 140 in the storage apparatus 301 may vary as symbolically shown by the dot symbols 302.

In FIG. 3, as well as in the subsequent drawing figures discussed below, for purposes of explanation and/or clarity, numerous specific details are set forth in order to provide a thorough understanding thereof. It may be evident, however, that the novel embodiments can be practiced without these specific details shown in the drawing figures. In other instances, well known structures and devices are shown in block diagram form in order to facilitate a description thereof. The intention is to cover all modifications, equivalents, and alternatives consistent with the claimed subject matter.

In the description herein, the elements 350 are shown as example elements 350a, 350b, 350c, 350d, and other similar numeral reference with the prefix "350". The element 350 is generally referred to as memory controller 350 or flash memory controller 350 for convenience. The element 350 can be a flash memory controller 350 or another type of memory controller 350 that can function with nonvolatile memory devices in a memory module, depending on the type of nonvolatile memory devices in a memory module that functions with the memory controller 350. The above numerical convention is similarly used for other elements with different numerical references in the drawing figures (e.g., the non-volatile memory controller buffers that are allocated as prefetch buffers are symbolized as buffers 355 and are specifically shown as buffers 355a through 355d).

The storage apparatus 301 comprises a serial chain 382 and this serial chain 382 comprises the DMA controller 140b, a bus 378, a non-volatile memory controller 350a, the channel 380, a non-volatile memory controller 350b, and a non-volatile memory controller 350c. The serial chain 382 may further include a non-volatile memory controller 350d that is coupled by a channel 383 to the non-volatile memory controller 350c.

Each non-volatile memory controller 350 comprises an associated memory controller buffer 355 (e.g., each flash memory controller 350 comprises an associated flash memory controller buffer 355). The memory interface 305, based on the operations of the processor 120 and prefetching engine 115, is configured to allocate at least some of the memory controller buffers 355 and 155 as prefetch buffers as will be similarly discussed below in various example operations. The memory interface 105 can also allocate other memory controller buffers 155 as shown in FIGS. 1B and 1C as prefetch buffers and other memory controllers in a branch in the serial chain 382 as prefetch buffers. The memory controller buffers in each of the drawing figures in this disclosure are generally referred to as non-volatile memory controller buffers (e.g., flash memory controller buffers).

In an embodiment of the invention, the storage apparatus 301 comprises a plurality of memory controllers 350. For example, the storage apparatus 301 comprises the memory controllers 350a, 350b, 350c, and 350d in the serial chain 382. The number of memory controllers 350 in the storage apparatus 301 may vary.

In an embodiment of the invention, the non-volatile memory controllers 350a, 350b, 350c, and 350d include the non-volatile memory controller buffers 355a, 355b, 355c, and 355d, respectively. The memory interface 305 allocates one or more of the non-volatile memory controller buffers 355a, 355b, 355c, and 355d as allocated prefetch buffers for storing prefetch data. Since the number of non-volatile memory controllers 350 may vary, the number of non-volatile memory controller buffers 355 (and the number of allocated prefetch buffers) may vary as well in the storage apparatus 301. The processor 120 executes the prefetching engine 115 in order to allocate any or all of the non-volatile memory controller buffers 355a, 355b, 355c, and 355d as allocated prefetch buffers.

The non-volatile memory devices 368a, 368b, and 368c include the data registers 367a, 367b, and 367c, respectively. Since the number of non-volatile memory devices 368 may vary, the number of data registers 367 may vary as well in the storage apparatus 301. The memory interface 305 allocates one or more of the data registers 367a, 367b, and 367c as allocated prefetch buffers for storing prefetch data. The processor 120 executes the prefetching engine 115 in order to allocate any of the data registers 367a, 367b, and 367c as allocated prefetch buffers.

The non-volatile memory devices 372a, 372b, and 372c include the data registers 373a, 373b, and 373c, respectively. Since the number of non-volatile memory devices 372 may vary, the number of data registers 373 may vary as well in the storage apparatus 301. The memory interface 305 allocates one or more of the data registers 373a, 373b, and 373c as allocated prefetch buffers for storing prefetch data. The processor 120 executes the prefetching engine 115 in order to allocate any of the data registers 373a, 373b, and 373c as allocated prefetch buffers.

The non-volatile memory devices 374a, 374b, and 374c include the data registers 375a, 375b, and 375c, respectively. Since the number of non-volatile memory devices 374 may vary, the number of data registers 375 may vary as well in the storage apparatus 301. The memory interface 305 allocates one or more of the data registers 375a, 375b, and 375c as allocated prefetch buffers for storing prefetch data. The processor 120 executes the prefetching engine 115 in order to allocate any of the data registers 375a, 375b, and 375c as allocated prefetch buffers.

The non-volatile memory devices 376a, 376b, and 376c include the data registers 377a, 377b, and 377c, respectively. Since the number of non-volatile memory devices 376 may vary, the number of data registers 377 may vary as well in the storage apparatus 301. The memory interface 305 allocates one or more of the data registers 377*a*, 377*b*, and 377*c* as allocated prefetch buffers for storing prefetch data. The processor 120 executes the prefetching engine 115 in order to allocate any of the data registers 377*a*, 377*b*, and 377*c* as allocated prefetch buffers.

Each DMA controller 140 comprises an associated DMA controller buffer 160. In the example of FIG. 3, the storage apparatus 301 comprises the DMA controller 140*a* that includes the DMA controller buffer 160*a* and the DMA controller 140*b* that includes the DMA controller buffer 160*b*. The memory interface 105 allocates the DMA controller buffers 160*a* and 160*b* as allocated prefetch buffers 160*a* and 160*b* for both storing prefetch data. The processor 120 executes the prefetching engine 115 in order to allocate the DMA controller buffers 160*a* and 160*b* as allocated prefetch buffers.

The memory interface 305, based on the operations of the processor 120 and prefetching engine 115, is configured to allocate one or more of the DMA controller buffers 160 as prefetch buffers as will be similarly discussed below in various example operations.

The number of DMA controllers 140 in the storage apparatus 301 may vary. Since the number of DMA controllers 140 may vary, the number of DMA controller buffers 160 may vary as well in the storage apparatus 301.

In an embodiment of the invention, the storage apparatus 301 comprises a prefetch buffer topology 365 that comprises the buffers 355 in the flash memory controllers 350, the buffers 160 in the DMA controllers 140, and/or the data registers in the flash memory devices in the storage apparatus 301. If the memory interface 305 allocates any of the buffers 355, buffers 160, or data registers as prefetch buffers, then the buffers 355, buffers 160, or data registers can each store prefetch data. In an embodiment of the invention, the memory interface 305 can also allocate memory space 134 in the system memory 135 as a prefetch buffer for storing prefetch data, in addition to the memory interface 105 allocating any of the buffers 355, buffers 160, and/or data registers as prefetch buffers for storing prefetch data. Additionally or alternatively, data registers in other non-volatile memory devices (e.g., devices 372*a*, 372*b*, and/or 372*c*) in the memory topology 345 may be allocated as prefetch buffers. The processor 120 executes the prefetching engine 115 in order to allocate the memory space 134 in the local memory 135 as an allocated prefetch buffer and/or in order to allocate the data registers in other non-volatile memory devices as allocated prefetch buffers.

In an embodiment of the invention, the storage apparatus 301 comprises non-volatile memory modules 371 (e.g., flash memory modules 371) that each includes at least one non-volatile memory device (e.g., flash memory device). For example, the storage apparatus 301 comprises non-volatile memory modules (e.g., flash memory modules) 371*a*, 371*b*, 371*c*, and 371*d* that are coupled to the non-volatile memory controllers (e.g., flash memory controllers) 350*a*, 350*b*, 350*c*, and 350*d*, respectively. The number of non-volatile memory modules 371 (e.g., flash memory modules 371) and the number of non-volatile memory devices (e.g., flash memory devices) in the storage apparatus 301 may vary.

In the storage apparatus 301, one or more of the non-volatile memory controllers (e.g., flash memory controllers) and one or more of the non-volatile memory devices (e.g., flash memory devices) need not be directly connected to the DMA controller 140 (e.g., DMA controller 140*b*). The point-to-point non-volatile memory controller topology in the storage apparatus 301 comprises a plurality of non-volatile memory controllers (e.g., flash controller modules or flash controllers), and the non-volatile memory controllers are coupled (directly or indirectly) to the DMA controller 140*b* in order to advantageously allow a greater plurality of non-volatile memory devices (e.g., flash devices) to be accessed that are otherwise not physically possible due to package limitations of a controller chip.

A non-volatile memory controller 350 (e.g., controller 350*a*) can be any non-volatile memory interface controller that can function with a non-volatile memory device (e.g., flash device or another type of non-volatile memory device) in the storage apparatus 301.

The non-volatile memory controller 350*a* is coupled via a memory bus 370*a* (or via a plurality of memory buses 370*a*) to a non-volatile memory module 371*a*. As an example, the non-volatile memory module 371*a* comprises a plurality of non-volatile memory devices 368 that may vary in number (e.g., non-volatile memory devices 368*a*, 368*b*, and 368*c*). As another example, the non-volatile memory module 371*a* comprises a single non-volatile memory device (e.g., non-volatile memory device 368*a*).

The non-volatile memory controller 350*b* is coupled via a memory bus 370*b* (or via a plurality of memory buses 370*b*) to a non-volatile memory module 371*b*. As an example, the non-volatile memory module 371*b* comprises a plurality of non-volatile memory devices 372 that may vary in number (e.g., non-volatile memory devices 372*a*, 372*b*, and 372*c*). As another example, the non-volatile memory module 371*b* comprises a single non-volatile memory device (e.g., non-volatile memory device 372*a*).

The non-volatile memory controller 350*c* is coupled via a memory bus 370*c* (or via a plurality of memory buses 370*c*) to a non-volatile memory module 371*c*. As an example, the non-volatile memory module 371*c* comprises a plurality of non-volatile memory devices 374 that may vary in number (e.g., non-volatile memory devices 374*a*, 374*b*, and 374*c*). As another example, the non-volatile memory module 371*c* comprises a single non-volatile memory device (e.g., non-volatile memory device 374*a*).

The non-volatile memory controller 350*d* is coupled via a memory bus 370*d* (or via a plurality of memory buses 370*d*) to a non-volatile memory module 371*d*. As an example, the non-volatile memory module 371*d* comprises a plurality of non-volatile memory devices 376 that may vary in number (e.g., non-volatile memory devices 376*a*, 376*b*, and 376*c*). As another example, the non-volatile memory module 371*d* comprises a single non-volatile memory device (e.g., non-volatile memory device 376*a*).

The DMA controller 140*b* is directly coupled by a DMA-controller-to-Memory-controller bus 378 to the non-volatile memory controller 350*a*. The bus 378 is a signal path for transmitting data, control signals, and other suitable signals between the DMA controller 140*b* and the non-volatile memory controller 350*a*.

In the storage apparatus 301, at least two non-volatile memory controllers (e.g., flash controllers) are indirectly coupled to the DMA controller 140*b*. For example, the non-volatile memory controllers 350*b* and 350*c* are indirectly coupled to the DMA controller 140*b* via the non-volatile memory controller 350*a* wherein the non-volatile memory controller 350*a* is between the DMA controller 140*b* and the non-volatile memory controllers 350*b* and 350*c*. Therefore, the buffer topology 365 is formed by multiple components that form a network-like fabric memory interface that will be discussed below. This network-like fabric memory interface comprises an IO (input/output) non-volatile memory interconnect (flash interconnect) which can be embodied as a network of DMA controllers, flashbus links (or non-volatile memory bus links), and flashbus (non-volatile memory) controllers, and/or as a point-to-point serial bus topology and/or network-like fabric.

A given memory transaction in the storage apparatus 301 comprises, for example, storing data from a host 110 to a non-volatile memory device (e.g., flash device) in a selected serial chain (or selected serial sub-chain) in the memory topology 345 in the storage apparatus 301 or reading data from a non-volatile memory device in a selected serial chain (or selected serial sub-chain) in the memory topology 345 in the storage apparatus 301, wherein the data read from the non-volatile memory device is transmitted by the storage apparatus 301 to a requesting host 110. As an example, in a given memory transaction, a given non-volatile memory controller (e.g., flash controller) will write data from a host 110 to a non-volatile memory device (e.g., flash memory device) coupled to that given non-volatile memory controller, or that given non-volatile memory controller will read data from a non-volatile memory device coupled to that given non-volatile memory controller wherein that data that is read from the non-volatile memory device is transmitted by the storage apparatus 301 to a requesting host 110.

The non-volatile memory controller 350a is coupled via a channel 380 to the non-volatile memory controller 350b. The channel 380 comprises one or more point-to-point lines which can be, for example, a data bus that uses standard specification or a bus that uses a proprietary protocol (e.g., one flashbus or a plurality of flashbuses), wherein the channel 380 is configured for transmitting signals such as command, status, response, address, and data bytes between the non-volatile memory controllers 350a and 350b. The two non-volatile memory controllers 350a and 350b can transmit the above-mentioned signals to each other via the channel 380 between the two non-volatile memory controllers 350a and 350b. A non-volatile memory controller (controllers 350a or 350b) can process the above-mentioned signals via cutthrough, store forward, or/and buffering.

The non-volatile memory controller 350a is coupled via the same channel 380 to the non-volatile memory controller 350c. The channel 380 comprises one or more point-to-point lines which can be, for example, one flashbus or a plurality of flashbuses for transmitting signals such as command, status, response, address, and data bytes between the non-volatile memory controllers 350a and 350c. The two non-volatile memory controllers 350a and 350c can transmit the above-mentioned signals to each other via the channel 380 between the two non-volatile memory controllers 350a and 350c. A non-volatile memory controller (controllers 350a or 350c) can process the above-mentioned signals via cutthrough, store forward, or/and buffering.

The non-volatile memory controllers 350b and 350c are coupled by the channel 380 to the non-volatile memory controller 350a via an electrical node 381 which can be internal in the non-volatile memory controller 350a or external to the non-volatile memory controller 350a.

The non-volatile memory controller 350a is directly coupled via the DMA-controller-to-Memory-controller bus 378 to the DMA controller 140b. It is also noted that the bus 378 that connects the non-volatile memory controller 350a and the DMA controller 140b also transmits signals such as command, status, response, address, and data bytes between the non-volatile memory controller 350a and the DMA controller 140b. The DMA controller 140b can also process the above-mentioned signals via cutthrough, store forward, or/and buffering.

The storage apparatus 301 comprises a serial chain 382 and this serial chain 382 comprises the DMA controller 140b, the bus 378, the non-volatile memory controller 350a, the channel 380, the non-volatile memory controller 350b, and the non-volatile memory controller 350c, and the non-volatile memory devices that are coupled to the non-volatile memory controllers in the serial chain 382.

The non-volatile memory controller 350c is coupled by a channel 383 to the non-volatile memory controller 350d. The channel 383, the non-volatile memory controller 350d, and any non-volatile memory device that is coupled to the non-volatile memory controller 350d may each be elements that are included in the serial chain 382 as well. The channel 383 can perform at least some of the above discussed operations of the channel 380 in order to permit the non-volatile memory controller 350c and the non-volatile memory controller 350d to communicate with each other. For example, the channel 383 comprises one or more point-to-point lines which can be, for example, a data bus that uses standard specification or a bus that uses a proprietary protocol (e.g., one flashbus or a plurality of flashbuses), wherein the channel 383 is configured for transmitting signals such as command, status, response, address, and data bytes between the non-volatile memory controller 350c and 350d. The two non-volatile memory controllers 350c and 350d can transmit the above-mentioned signals to each other via the channel 383 between the two non-volatile memory controllers 350c and 350d. A non-volatile memory controller (controllers 350c or 350d) can process the above-mentioned signals via cutthrough, store forward, or/and buffering.

In an embodiment of the invention, the serial chain 382 comprises a first serial sub-chain 382a and a second serial sub-chain 382b.

In an embodiment of the invention, the channel 383 and the non-volatile memory controller 350d are included in the serial chain 382 (and second serial sub-chain 382b) or can be omitted from the serial chain 382 (and second serial sub-chain 382b). The memory modules 371a, 371b, and 371c are included in the serial chain 382. The memory module 371d may be included in the serial chain 382 (and second serial sub-chain 382b) if the non-volatile memory controller 350d is included in the serial chain 382 (and second serial sub-chain 382b).

In an embodiment of the invention, the first serial sub-chain 382a comprises the non-volatile memory controller 350a, the memory module 371a, the channel 380, the non-volatile memory controller 350b, and the memory module 371b, and the second serial sub-chain 382b comprises the non-volatile memory controller 350a, the memory module 371a, the channel 380, the non-volatile memory controller 350c and the memory module 371c. The second serial sub-chain 382b can further include the channel 383, the non-volatile memory controller 350d, and the memory module 371d.

The channel 380 that connects the non-volatile memory controller 350a to the non-volatile memory controllers 350b and 350c is a third type of signal path layout 384.

In an embodiment of the invention, the serial sub-chain 382a is expandable as now discussed. A similar third type of signal path layout 384 can be coupled between the non-volatile memory controller 350b and at least another non-volatile memory controller in the serial sub-chain 382a or another type of signal path layout (e.g., similar to a second type of signal path layout 284 in FIG. 2A) can be coupled between the non-volatile memory controller 350b and at least another non-volatile memory controller in the serial sub-chain 382a. At least one more of a given type of signal path layout (e.g., similar to layout 384 or layout 284) and at least one more non-volatile memory controller can further be added in the serial sub-chain 382a so that the serial chain 382 (and/or serial sub-chain 382a) is expanded in a given direction (e.g., X-direction 185).

Note that the third type of signal layout 384 is similar in configuration as the first type of signal layout 184 (FIG. 1A).

However, any serial chain (e.g., serial chain 382) and any serial sub-chain (e.g., serial sub-chain 382a and/or serial sub-chain 382b) in the data storage apparatus 301 may be disposed in any direction such as, for example, directions that are offset from and/or that are on an angular offset from the X-axis 185, Y-axis 186, and/or Z-axis 187 to, for example, satisfy packaging constraints or other physical constraints.

In an embodiment of the invention, the serial chain 382 is a uni-directional chain if the serial sub-chains 382a and 382b are in a same direction (e.g., one of X-direction 185, Y-direction 186, or Z-direction 187). Therefore, the prefetch buffers (as discussed below) in the serial chain 382 are uni-directional prefetch buffers in a same direction (e.g., one of X-direction 185, Y-direction 186, or Z-direction 187).

In another embodiment of the invention, the serial chain 382 is a multi-directional (multiple directional) chain if the serial sub-chains 382a and 382b are in different directions (e.g., the sub-chain 382a is in the X-direction 185 and the sub-chain 382b is in the Y-direction 186; or the sub-chain 382a is in the X-direction 185 and the sub-chain 382b is in the Z-direction 187; or the serial sub-chain 382a is in the Y-direction 186 and the serial sub-chain 382b is in the Z-direction 187). Therefore, the prefetch buffers (as discussed below) in the serial chain 382 are uni-directional prefetch buffers in a same direction (e.g., one of X-direction 185, Y-direction 186, or Z-direction 187) or are multi-directional prefetch buffers.

Additionally or alternatively, the serial sub-chain 382b is expandable as now discussed. A similar third type of signal path layout 384 can be coupled between the non-volatile memory controller 350d and at least another non-volatile memory controller in the serial sub-chain 382b or another type of signal path layout (e.g., similar to a second type of signal path layout 284 in FIG. 2A) can be coupled between the non-volatile memory controller 350d and at least another non-volatile memory controller in the serial sub-chain 382b. At least one more of a given type of signal path layout (e.g., similar to layout 384 or layout 284) and at least one more non-volatile memory controller can further be added in the serial sub-chain 382b so that serial chain 382 (and/or serial sub-chain 382b) is expanded in a given direction (e.g., X-direction 185).

Additionally or alternatively, the serial sub-chain 382b is expandable as now discussed. A similar third type of signal path layout 384 can be coupled between the non-volatile memory controller 350c and at least another non-volatile memory controller in a serial sub-chain branch (e.g., similar to branch 151 in FIG. 1B) or another type of signal path layout (e.g., similar to a second type of signal path layout 284 in FIG. 2A) can be coupled between the non-volatile memory controller 150c and at least another non-volatile memory controller in a serial sub-chain branch (e.g., similar to branch 152 in FIG. 1C). This at least another non-volatile memory controller can be coupled to the channel 383 via a node (e.g., similar to node 189 in FIG. 1A) so as to expand the serial chain 382 via the above-noted serial sub-chain branch in any given direction (e.g., direction 185, direction 186, or direction 187). Therefore, this above-noted additional branch could be configured from the non-volatile memory controller 350c via a node to further expand the serial chain 382 with at least an additional prefetch buffer that is included in the at least one non-volatile memory controller and/or in the at least one non-volatile memory device in this above-noted additional branch, wherein this at least additional prefetch buffer is configured to store prefetch data. In this example, wherein this above-noted additional branch 151 is connected to a node, this above-noted additional branch will have a layout that is similar to the layout 384.

Alternatively, a serial sub-chain branch (similar to branch 152 in FIG. 1C) could be configured directly from the non-volatile memory controller 350c to further expand the serial chain 382 with at least an additional prefetch buffer that is included in the at least one non-volatile memory controller and/or in the at least one non-volatile memory device in this above-noted additional branch that is similar to branch 152, wherein this at least additional prefetch buffer is configured to store prefetch data; in the example wherein this above-noted additional branch could be configured directly from the non-volatile memory controller 350c via a link (e.g., similar to the link 191 in FIG. 1A), this above-noted additional branch would have a layout that is similar to the layout 284 in FIG. 2A. The above-noted link could be similar to the link 280b in FIG. 2A that forms a serial sub-chain that is similar to the serial sub-chain 282b. This at least another non-volatile memory controller can be coupled to the above noted link so as to expand the serial sub-chain 382 via the above-noted serial sub-chain branch (similar to branch 152 in FIG. 1C) in any given direction (e.g., direction 185, direction 186, or direction 187).

Handshaking and data transmission between two non-volatile memory controllers (e.g., non-volatile memory controllers 350a and 350b), as well as handshaking and data transmission between a non-volatile memory controller (e.g., non-volatile memory controller 350a) and a DMA controller (e.g., DMA controller 140b) can be performed by different IO protocols and have been similarly described above with respect to the handshaking and data transmission between non-volatile memory controllers in FIG. 1A and the handshaking between data transmission between a non-volatile memory controller and a DMA controller 140 in FIG. 1A.

The number of non-volatile memory controllers and non-volatile memory modules in a given serial chain may vary. For example, the serial chain 382 comprises a single non-volatile memory controller 350a. As another example, the serial chain 382 comprises two or more (a plurality of) non-volatile memory controllers (e.g., controllers 350a and 350b). The number of non-volatile memory controllers in the serial chain 382 (and serial sub-chain 382a) may vary as symbolically shown by the dot symbols 390. If the serial sub-chain 382a includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 371a, 371b, 371c, or 371d) in the storage apparatus 301, the at least additional non-volatile memory device in the additional non-volatile memory module can store write data, cache data, return read data, and perform other flash memory device functions as, for example, discussed herein.

As another example, the serial sub-chain 382b comprises two or more (a plurality of) non-volatile memory controllers (e.g., controllers 350a and 350c). The number of nonvolatile memory controllers in the serial chain 382 (and serial sub-chain 382b) may vary as symbolically shown by the dot symbols 392. The non-volatile memory controllers 350c and 350d are communicatively and/or electronically coupled by the channel 383. If the serial sub-chain 382b includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 371a, 371b, 371c, or 371d) in the storage apparatus 301, the at least additional non-volatile memory device in the additional non-volatile memory module can store write data, cache data, return read data, and perform other flash memory device functions as, for example, discussed herein.

The number of serial sub-chains in the serial chain 382 may vary as symbolically shown by the dot symbols 393.

The DMA controller 140b and any non-volatile memory controller that is directly or indirectly coupled to the DMA controller 140b are all communicatively or/and electrically coupled together in the serial chain 382. For example, the DMA controller 140b, the bus 378, the non-volatile memory controller 350a, the channel 380, the non-volatile memory controller 350b, and the non-volatile memory controller 350c are all communicatively or/and electrically coupled together. As another example, the DMA controller 140b, the channel 378, the non-volatile memory controller 350a, the channel 380, the non-volatile memory controller 350b, the non-volatile memory controller 350c, the channel 383, and the non-volatile memory controller 350d are all communicatively or/and electrically coupled together.

At least one serial chain (and/or at least one serial sub-chain) in the buffer topology 365 (e.g., serial chain 382 and/or serial chain 382a and/or serial sub-chain 382b and/or another serial chain and/or another serial sub-chain in the buffer topology 365) may include non-volatile memory controllers that vary in number in the X-direction (first direction) 185, Y-direction (second direction) 186, and/or Z-direction (third direction) 187. Therefore, one or more additional non-volatile memory controllers can be added to a given serial chain (or a given serial sub-chain) in the X-direction 185, Y-direction 186, and/or Z-direction 187 in the buffer topology 365.

Additionally, the buffer topology 365 can be expanded in the X-direction 185, Y-direction 186, and/or Z-direction 187 by adding at least an additional DMA controller in a storage apparatus 301, in addition to the DMA controllers 140a and 140b and by adding one or more additional non-volatile memory controllers coupled to the at least additional DMA controller and a non-volatile memory module is coupled to that one or more additional non-volatile memory controllers.

Other variations of the directions of the serial chain 382 and serial sub-chains 382a and/or 382b in the buffer topology 365 are possible in an embodiment of the invention.

As an example, any given serial sub-chain in the storage apparatus 301 can be uni-directional or multi-directional. For example, the serial sub-chain 382b is a uni-directional serial sub-chain if the channels 380 and 383 are disposed in a same direction (e.g., X-direction 185, Y-direction 186, or Z-direction 187). Since the serial sub-chain 382b is uni-directional, all allocated prefetch buffers in the sub-chain 382b are uni-directional allocated prefetch buffers (e.g., at least two of the prefetch buffer 355c, prefetch buffer 355d, data registers 375a, 375b, or 375c, and/or data registers 377a, 377b, or 377c). As another example, the serial sub-chain 382b is a multi-directional sub-chain if the channels 380 and 383 are disposed in two different directions (e.g., the channel 380 is disposed in the X-direction 185 and the channel 383 is disposed in the Y-direction 186). Since the serial sub-chain 382b is multi-directional, at least two allocated prefetch buffers in the sub-chain 382b are multi-directional allocated prefetch buffers (e.g., prefetch buffers 355c and 355d are multi-directional allocated prefetch buffers; e.g., data registers 375a and 377a are multi-directional allocated prefetch buffers; e.g., data registers 375b and 377b are multi-directional allocated prefetch buffers; and/or e.g., data registers 375c and 377c are multi-directional allocated prefetch buffers). Since a serial chain and/or a serial sub-chain in the memory topology 345 can be uni-directional or multi-directional, the serial chain and/or serial sub-chain can be appropriately disposed or configured to satisfy package constraints and/or other physical constraints that may be applicable to the memory topology 345. Similarly, since a serial chain and/or a serial sub-chain in the memory topology 345 can be uni-directional or multi-directional, buffers in the buffer topology 365 can be appropriately disposed or configured to satisfy package constraints and/or other physical constraints that may be applicable to the memory topology 345.

A DMA descriptor 394 is loaded by a local processor (e.g., processor 120) into a DMA controller memory of the DMA controller 140 (e.g., DMA controllers 140a and 140b), in one example. In one example, the local processor initially creates a DMA descriptor 394. As another example, the local processor has a template in a locally accessible memory (e.g., RAM) that the local processor can access and control, and the local processor creates a DMA descriptor 394 from that template. In another example, the local processor 120 can instead inform a DMA controller 140 (e.g., DMA controller 140b) to read a DMA descriptor 394 in a given memory address of a memory (e.g., RAM) and the DMA controller 140b will subsequently read the DMA descriptor 394 in that given memory address.

The DMA descriptor 394 is configurable via software (or firmware) that is executed by the local processor. The DMA descriptor 394 comprises control information that will control a given memory transaction to be performed by the DMA controller 140b. As an example, the DMA controller 140b intelligently determines and intelligently selects one of the serial chains and one of the serial sub-chains (e.g., serial chain 382 and/or serial sub-chain 382a and/or serial sub-chain 382b) for use in a given memory transaction. As also similarly described above with reference to FIG. 1A, the DMA controller 140a intelligently determines and intelligently selects one of the serial chains and one of the serial sub-chains (e.g., serial chain 182 and/or serial sub-chain 182a and/or serial sub-chain 182b) for use in a given memory transaction based on the descriptor 394.

As an example, the control information in the descriptor 394 includes at least some of the following: the amount of bytes of the data to be transferred in the memory transaction, the source address of the data to be transferred in the memory transaction, the destination address of the data to be transferred in the memory transaction, the serial chain identifier that identifies the serial chain used for the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140b and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a DMA controller 140b may include a command/status register which is configurable via software (or firmware) that is executed by a local processor (e.g., IO processor 120). The register includes control information 394 used for the memory transaction and will advantageously relieve a firmware of having to write a descriptor that would have this control information 394.

In an embodiment of the invention, the descriptor 394 is passed from the DMA controller 140 (e.g., DMA controllers 140a and 140b) to (and loaded into) a non-volatile memory controller (e.g., non-volatile memory controller 350a) that is directly coupled to the DMA controller 140b, and the non-volatile memory controller 350a will pass the descriptor 394 to the next non-volatile memory controllers (e.g., non-volatile memory controllers 350b and 350c) that are coupled to the non-volatile memory controller 350a in the buffer topology 365. A non-volatile memory controller in a serial chain and serial sub-chain will pass the descriptor 394 to the next given non-volatile memory controller in the given serial chain and given serial sub-chains and the descriptor 194 is passed serially along the given serial chain and given serial sub-chains.

In another embodiment of the invention, a derivative descriptor 195 is passed from the DMA controller 140 (e.g., DMA controllers 140a and 140b) to a non-volatile memory controller that is directly coupled to the DMA controller 140b, and the non-volatile memory controller will pass the derivative descriptor to the next non-volatile memory controller in a given serial chain and given serial sub-chains and the derivative descriptor 395 is passed serially along the given serial chain and given serial sub-chains, as similarly discussed above.

The derivative descriptor 395 is a derivative of the descriptor 394 (or is extracted by the DMA controller 140b from the descriptor 394). After the descriptor 394 is loaded into the DMA controller 140b, the DMA controller 140b can parse the descriptor 394 in order to create the derivative descriptor 395 (or command 395 or sequence 395 or signal 395). The block 395 can also be a complete descriptor such as the descriptor 394 instead of a derivative descriptor. A descriptor 395 (or derivative descriptor 395 or command 395 or sequence 395 or signal 395) is intelligible to a given non-volatile memory controller (e.g., non-volatile memory controller 350a) in the memory topology 345 so that the given non-volatile memory controller can perform a memory transaction.

A given non-volatile memory controller executes the derivative descriptor 395 or descriptor 394 to permit the given non-volatile memory controller to perform operations such as, for example, the given non-volatile memory controller storing data from a host into one or more non-volatile memory devices that are coupled to the given non-volatile memory controller or the given non-volatile memory controller reading stored data from one or more non-volatile memory devices that are coupled to the given non-volatile memory controller wherein the stored data read from a non-volatile memory device is passed by the storage apparatus 301 to a host 110. Alternatively or additionally, the non-volatile memory controller uses a command 395 and/or sequence 395 and/or signal 395 to perform an operation related to a memory transaction.

A given non-volatile memory controller executes the derivative descriptor 395 or descriptor 394 to permit the given non-volatile memory controller to intelligently select a serial sub-chain for performing a given memory transaction. For example, the non-volatile memory controller 350a intelligently selects the serial sub-chain 382a or the serial sub-chain 382b for performing a given memory transaction in the storage apparatus 301. Assume in this example that the non-volatile memory controller 350a has selected the serial sub-chain 382b for performing a given memory transaction. For a given memory transaction that is a write operation, the non-volatile memory controller 350c, for example, in the selected serial sub-chain 382b, can execute a descriptor 394 (or derivative descriptor 395) in a memory of the non-volatile memory controller 350c so that the non-volatile memory controller 350c stores write data (e.g., from a host) into a non-volatile memory device (e.g., non-volatile memory device 374a) that is coupled to the non-volatile memory controller 350c. On the other hand, for a given memory transaction that is a read operation, the non-volatile memory controller 350c, for example, in the selected serial sub-chain 382b can execute a descriptor 394 (or a derivative descriptor 395) in a memory of the non-volatile memory controller 350c so that the non-volatile memory controller 350c reads stored data from a non-volatile memory device (e.g., non-volatile memory device 374a) that is coupled to the non-volatile memory controller 350c, and the storage apparatus 301 passes the stored data from the non-volatile memory device 374a to a host 110. Of course, the non-volatile memory controller 350a can execute the descriptor 394 (or a derivative descriptor 395) so that the non-volatile memory controller 350a can intelligently select another serial sub-chain (e.g., serial sub-chain 382a) for performing a given memory transaction. Therefore, the descriptor 394 (or derivative descriptor 395) comprises control information that will control a given memory transaction to be performed by the non-volatile memory controller 350a. As an example, the non-volatile memory controller 350a intelligently determines and intelligently selects one of the serial sub-chains 382a or 382b for use in a given memory transaction, or the non-volatile memory controller 350a can write and store data into a non-volatile memory device (e.g., non-volatile memory device 368a) or can read stored data from a non-volatile memory device (e.g., non-volatile memory device 368a). Of course, more than two serial sub-chains can be directly coupled to (or associated with) the non-volatile memory controller 350a, and the non-volatile memory controller 350a intelligently selects a serial sub-chain among the more than two serial sub-chains for use in a given memory transaction.

As an example, the control information (in a descriptor 394 or a derivative descriptor 395) includes at least some of the following: the amount of bytes of the data to be transferred in the memory transaction, the source address of the data to be transferred in the memory transaction, the destination address of the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controllers 140a or 140b and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a non-volatile memory controller 350a may include a command/status register which is configurable via software (or firmware) that is executed by a local processor (e.g., processor 120). The register includes control information (in the descriptor 394 or the derivative descriptor 395) used for the memory transaction and will advantageously relieve a firmware of having to write a descriptor that would have this control information in the descriptor 394 or derivative descriptor 395.

As discussed above, the block 395 may be a descriptor, derivative descriptor, command or group or commands, sequence, or signal wherein the block 395 is transmitted between two controllers (e.g., between a DMA controller and a non-volatile memory controller or between two non-volatile memory controllers).

A derivative descriptor transmitted between two controllers may comprise some intact portions of the original descriptor 395 provided to the DMA descriptor 394 and some modified portions of the original descriptor 394. The intact portions may be, for example, the source address and the destination address (flash device address). A modified portion may include, for example, tagging (e.g., a tag that associates a reply with a previous command) and/or particular information in the handshaking between a DMA controller and a non-volatile memory controller or handshaking between two non-volatile memory controllers.

A sequence transmitted between two controllers may comprise a combination of commands, replies, status signals, handshaking signals, ping signals, and/or other signals between a DMA controller and a non-volatile memory controller, and/or between two non-volatile memory controllers in a serial chain or serial sub-chain. For example, a sequence may comprise handshaking and status signals, commands, ping signals, and/or replies between two controllers (e.g., between a DMA controller and a non-volatile memory controller, or between two non-volatile memory controllers) prior to, during, and after the transmission of data between the two controllers.

A signal transmitted between two controllers may comprise signals related to status, handshaking, data bytes, commands, replies, addresses, sideband signals, and/or other types of signals.

The non-volatile memory controllers 350b and 350c are both coupled in parallel via the node 381 to the non-volatile memory controller 350a. Therefore, the non-volatile memory controller buffers 355b and 355c are both coupled in parallel via the node 381 to the non-volatile memory controller buffer 355a.

The non-volatile memory controller 350d is coupled in series to the non-volatile memory controller 350c. Therefore, the non-volatile memory controller buffer 355d is coupled in series to the non-volatile memory controller buffer 355c.

The non-volatile memory controller 350a is coupled in series to the DMA controller 140b. Therefore, the non-volatile memory controller buffer 355a is coupled in series to the DMA controller buffer 160b.

The prefetch buffer 355b and the prefetch buffer 355c may be disposed in a same direction (e.g. X-direction 185) or may each be disposed in different directions (e.g., prefetch buffer 355b may be in the X-direction 185 and prefetch buffer 355c may be in the Y-direction 186). The prefetch buffer 355d may be in the X-direction 185, Y-direction 186, or Z-direction 187.

In an example operation of the system 300, the memory interface 305 responds to a memory transaction request 142 (e.g., memory read request 142) received via the host interface link 131 from a host 110a and received via the host interface 130. The memory interface 305 can respond to another memory transaction request 148 (e.g., another memory read request 148 that is subsequent to the memory read request 142) received via host interface link 131 from another host 110b or from the same host 110a. One or more host 110 can send memory transaction requests 142 or 148 to the memory interface 305 of the storage apparatus 301 via one or more host interface link 130. The number of hosts 110 and host interface links 133 that can be coupled to the storage apparatus 301 can vary as symbolically shown by the dot symbols 132 and 133, respectively. The memory interface 305 performs, on at least one memory module in the memory topology 345, a memory operation (e.g., a memory write operation or a memory read operation) that corresponds to the memory transaction request 142 that is requested by a host 110. For example, if the memory interface 305 receives a memory read transaction request 142, the memory interface 305 performs a read operation on at least one of the memory modules in the memory topology 345 and returns the result of the read operation, such as read data 196, along a host interface link 131 to a host 110 that sent the memory transaction request 142. Data returned as a result of the read operation is herein called "read data" 196.

The term "host", such as a host 110 shown in this embodiment, can be defined as any device that has the ability to transmit a memory read (or/and write) transaction request to storage apparatus 301. For example, this device may include a host 110 that can generate a memory transaction request 142 (e.g., memory read transaction request or/and memory write transaction request) and that can receive a response resulting from the processing of the memory transaction request 142 by the memory interface 305. The memory interface 305 may process memory transactions from one or more requesting device, such as at least one of the hosts 110a through 110b. For example, the host 110a may generate a memory read transaction request 142 that will cause the storage apparatus 301 to return a read data 196, while another host 110b may receive a response, such as a prefetch data 197 that is a result of another subsequent memory read transaction request 148 that is sent by the host 110b. As another example, the host 110a may generate a memory read transaction request 142 that will cause the storage apparatus 301 to return a read data 196, and the same host 110a may receive a response, such as a prefetch data 197 that is a result of another subsequent memory read transaction request 148 that is sent by the same host 110a. A prefetch data 197 is stored in at least one prefetch buffer in the memory topology 345 as discussed above.

Since the serial chain 382 is expandable and since the serial sub-chain 382a is expandable and/or since the serial sub-chain 382b is expandable, the memory interface 305 can allocate an expanded number or expandable number or configurable number of prefetch buffers in the buffer topology 365 in the storage apparatus 301. By allocating an expanded number or expandable number or configurable number of prefetch buffers, the storage apparatus 301 further reduces latency in memory read operations in the storage apparatus 301, while having serial chains and serial sub-chains that can be configured in one more directions to overcome package constraints or other physical constraints. This further reduction in latency is not available in current systems.

Another example is now presented of prefetching transactions in the storage apparatus 301 in order to reduce latency in memory read transactions in the storage apparatus 301. As similarly discussed above, the system bus 125 is a conduit for transferring data between the DMA controller 140, the local processor 120, the local memory 135, and the host interface 130. The local processor 120, the host interface 130, and the DMA controller 140 may access the local memory 135 via the system bus 125 as needed.

The host 110a sends a memory read transaction request 142 to the storage apparatus 301 for data located in the memory topology 345. Operating under program control, the local processor 120 analyzes and responds to the memory read transaction request 142 by generating DMA instructions 198 that will cause the DMA controller 140 to read this data from the memory topology 345 through at least a non-volatile memory controller 350. If this data is available, a non-volatile memory controller 350 will retrieve this data from a non-volatile memory device with this data. For example, if this data is in the non-volatile memory device 368a, then the non-volatile memory controller 350a will retrieve this data from the non-volatile memory device 368a. The non-volatile memory controller 350a then transfers this data to the DMA controller 140 (e.g., DMA controller 140b0. The DMA controller 140 then transfers this data to the local memory 135, and the local processor 120 then eventually transfers this data from the local memory 135 to the host 110a via the host interface 130. Data obtained during this memory read transaction request is named "read data".

As another example, if this data is in the non-volatile memory device 372a, then the non-volatile memory controller 350b will retrieve this data from the non-volatile memory device 372a. The non-volatile memory controller 350b then transfers this data to the non-volatile memory controller 350a. The non-volatile memory controller 350a then transfers this data to the DMA controller 140 (e.g., DMA controller 140b). The DMA controller 140 then transfers this data to the local memory 135, and the local processor 120 then eventually transfers this data from the local memory 135 to the host 110a via the host interface 130.

As noted above, data obtained during this memory read transaction request is named "read data".

The local processor 120 also identifies "prefetch data". Prefetch data is any data currently stored in the memory topology 345 that meets a prefetch selection criterion. This prefetch selection criterion may include a relationship between the read data and any stored data. For example, this prefetch selection criterion may be met if stored data exists that has a memory address within a selected memory address range from the memory address of the read data. In another example, the memory interface 305 determines whether this prefetch selection criterion is met by determining whether any stored data exists in the memory topology 345 that has a memory address within the same page as a memory address associated with the read data. The type of relationship between the read data and stored data is not intended to be limiting in any way. Any type of relationship may be used that increases the likelihood that the stored data selected for prefetching will be later requested by a host 110 coupled to a memory interface 305.

The local processor 120 may also perform an additional read operation, called an internal read operation. This internal read operation is a process executed by the local processor 120 to retrieve prefetch data 197 from the memory topology 345. This internal read operation includes the local processor 120 sending an instruction 198 to the DMA controller 140 (e.g., DMA controller 140b) to retrieve (e.g., via at least one non-volatile memory controller 350) a prefetch data 197 from the memory topology 345. For example, if the memory topology 345 addresses stored data by flash page, the instruction 198 contains the address of the specific flash page within a flash memory device (in memory topology 345) that holds the prefetch data 197. The instruction 198 also causes the DMA controller 140 to retrieve (via at least one non-volatile memory controller 350) a prefetch data 197 from the flash page and flash memory device (in memory topology 345) identified by the address mentioned above.

When the DMA controller 140 receives the instruction 198, the instruction 198 causes the DMA controller 140 to use at least one non-volatile memory controller 350 to cause at least one non-volatile memory device (in memory topology 345) to transfer the prefetch data 197. The internal read operation also includes the local processor 120 allocating at least one prefetch buffer to store the prefetch data 197. Allocating at least one prefetch buffer may be performed statically, such as at the time of manufacture, performed dynamically by the local processor 120, or both. In one embodiment of the invention, the processor 120 will allocate a number of prefetch buffers based on an amount of storage needed for a given prefetch data 197. For example, the memory interface 305 (including the processor 120) allocates a data register (e.g., data register 367a) in a non-volatile memory device (e.g., non-volatile memory device 368a) and a prefetch buffer 355a (in the non-volatile memory controller 350a) as storage space suitable for storing (buffering) the prefetch data 197. This action by the memory interface 305 may also render buffers (that have not been allocated as prefetch buffers), such as the data registers 367b and 367c and buffers 355b and 355c to be available to storage apparatus 301 for other memory uses. As discussed above, buffers in the storage apparatus 301 that are allocated as prefetch buffers for storing prefetch data are denoted herein as "prefetch buffers". If a host (host 110a and/or 110b) transmits a second memory read transaction request 148 to the storage apparatus 301 for data (wherein the second memory read transaction request 148 is subsequent to the first memory read transaction request 142), and this data has been previously stored as a prefetch data 197 in a prefetch buffer in the storage apparatus 301, then the local processor 120 responds by retrieving the prefetch data 197 from a prefetch buffer in the storage apparatus 301 and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the processor 120 may instead directly send the prefetch data 197 to the host (host 110a and/or 110b) or may instead process the prefetch data 197 in any other manner envisioned by a user. As also discussed above, the processor 120 can additionally allocate memory space 134 in the system memory 135 as a prefetch buffer for storing prefetch data 197 and/or can additionally allocate the DMA buffer 160b as a prefetch buffer for storing prefetch data 197.

As another example, the memory interface 305 (including the processor 120) allocates at least one prefetch buffer in the serial chain 382, at least one prefetch buffer in the serial sub-chain 382a, and at least one prefetch buffer in the serial sub-chain 382b. Therefore, the memory interface 305 allocates an increased number of prefetch buffers compared to conventional systems. For example, the memory interface 305 allocates at least the following prefetch buffers: (1) in the serial chain 382, the memory interface 305 allocates as prefetch buffers at least one of the buffer 355a, data registers 367a, 367b, and 367c; (2) in the serial sub-chain 382a, the memory interface 305 allocates as prefetch buffers at least one of the buffer 355b, data registers 373a, 373b, and 373c; and (3) in the serial sub-chain 382b, the memory interface 305 allocates as prefetch buffers at least one of the buffer 355c, data registers 375a, 375b, and 375c. The memory interface 305 can additionally allocate as prefetch buffers, at least one of the following: (1) at least an additional buffer in an additional non-volatile memory controller coupled to the non-volatile memory controller 350b in the serial sub-chain 382a and/or at least one data register in at least one non-volatile memory device coupled to that additional non-volatile memory controller in the serial sub-chain 382a; and/or (2) the prefetch buffer 355d in the non-volatile memory controller 350d and/or at least one of the data registers 377a, 377b, and 377d; and/or (3) at least an additional buffer in an additional non-volatile memory controller coupled to the non-volatile memory controller 350d in the serial sub-chain 382b and/or at least one data register in at least one non-volatile memory device coupled to that additional non-volatile memory controller in the serial sub-chain 382b; and/or at least one additional buffer and/or at least one data register in a serial sub-chain branch (e.g., similar to branch 151 in FIG. 1B or branch 152 in FIG. 1C) that is coupled to the non-volatile memory controller 350c.

Therefore, the serial chain 382 and serial sub-chains 382a and 382b permit the memory interface 305 (and processor 120) to allocate an increased number of prefetch buffers for storing prefetch data in the serial chain 382 and serial sub-chains 382a and 382b, while being configurable in at least one direction to overcome package constraints or other physical constraints. Since there is an increased number of prefetch buffers in the storage apparatus 301, the prefetch data 197 can advantageously be much larger in size as compared to prefetch data that are stored in conventional systems. Additionally, the memory interface 305 (and processor 120) can allocate the buffer 160b (in DMA controller 140b) as a prefetch buffer and/or can allocate memory space 134 in the local memory 135 as a prefetch buffer in addition to allocated prefetch buffers in the serial chain 382 and serial sub-chains 382a and 382b so as to further increase the number of prefetch buffers in the buffer topology 365.

Note that the number non-volatile memory devices 368 and data registers 367 in the non-volatile memory module 371a may vary as symbolically shown by the dot symbols 399a.

Note that the number non-volatile memory devices 372 and data registers 373 in the non-volatile memory module 371b may vary as symbolically shown by the dot symbols 399b.

Note that the number non-volatile memory devices 374 and data registers 375 in the non-volatile memory module 371c may vary as symbolically shown by the dot symbols 399c.

Note that the number non-volatile memory devices 376 and data registers 377 in the non-volatile memory module 371d may vary as symbolically shown by the dot symbols 399d.

As another example, if a host (host 110a and/or 110b) transmits a second memory read transaction request 148 to the storage apparatus 301 for data (wherein the second memory read transaction request 148 is subsequent to the first memory read transaction request 142), and this data has been previously stored as a prefetch data 197 in prefetch buffers that are allocated in the serial chain 382 and serial sub-chains 382a and 382b (such as, for example, the example allocated prefetch buffers in the serial chain 382 and serial sub-chains 382b as discussed above), then the local processor 120 responds by retrieving the prefetch data 197 from the prefetch buffers in the serial chain 382 and serial sub-chains 382a and 382b and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the processor 120 can instead directly send the prefetch data 197 to the host (host 110a and/or 110b) or the processor 120 can process the prefetch data 197 in any other manner envisioned by a user.

As another example, if a host (host 110a and/or 110b) transmits a second memory read transaction request 148 to the storage apparatus 301 for data (wherein the second memory read transaction request 148 is subsequent to the first memory read transaction request 142), and this data has been previously stored as a prefetch data 197 in prefetch buffers that are allocated in the serial chains 182 and 382, then the local processor 120 responds by retrieving the prefetch data 197 from the prefetch buffers in the serial chains 182 and 382 and serial by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the processor 120 can instead directly send the prefetch data 197 to the host (host 110a and/or 110b) or the processor 120 can process the prefetch data 197 in any other manner envisioned by a user. In this example, the above-discussed prefetch data is stored in at least one prefetch buffer (e.g., prefetch buffer 155a, data register 167a, prefetch buffer 155b, data register 173a, prefetch buffer 155c, and/or data register 175a) in the serial chain 182 and is stored in at least one prefetch buffer (e.g., prefetch buffer 355a, data register 367a, prefetch buffer 355b, data register 373a, prefetch buffer 355c, and/or data register 375a) in the serial chain 382.

Figure 4:
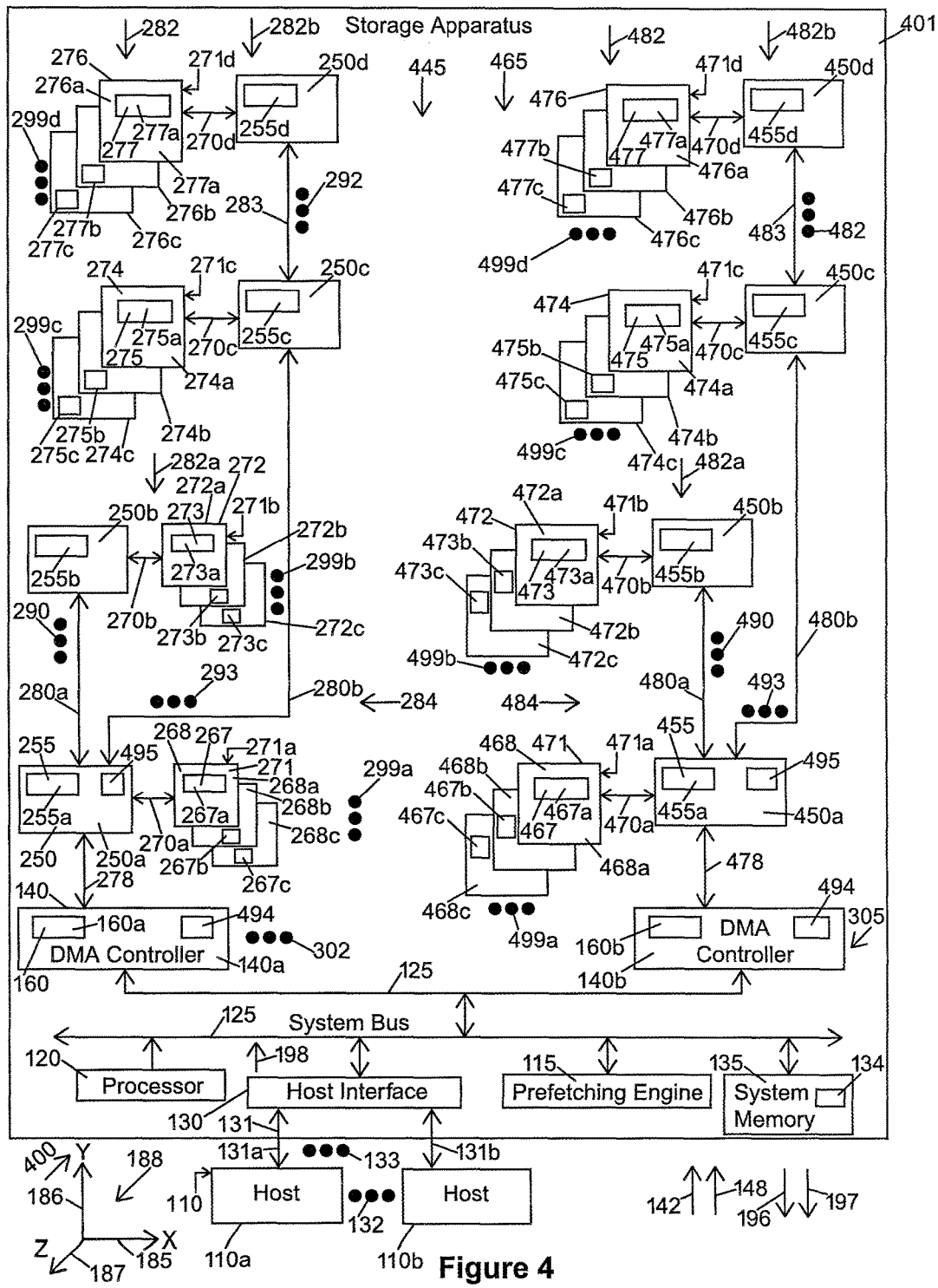
FIG. 4 is a block diagram of a storage system, in accordance with another embodiment of the invention.

FIG. 4 is a block diagram that illustrates a system 400 (or apparatus 400), in accordance with another embodiment of the invention. The system 400 (apparatus 400) comprises a data storage apparatus 401 (data storage system 401) with configurable prefetch buffers. In an embodiment of the invention, the configurable prefetch buffers are serially configurable prefetch buffers, and/or serially expandable prefetch buffers, and/or are expandable uni-directional prefetch buffers, and/or are expandable multi-directional prefetch buffers. The prefetch buffers are configured for reducing latency in memory transactions in the system 400.

The data storage apparatus 401 comprises at least some of the elements in the data storage apparatus 201 (FIG. 2A) and additional element that will be discussed below. For example, the storage apparatus 401 comprises the serial chain 282, serial sub-chain 282a, and serial sub-chain 282b that have been described above. The storage apparatus 401 may further comprise one or more branches 151 (FIG. 1B) and/or one or more branches 152 (FIG. 1C) that are included in the serial chain 282. The operation and functions of the serial chain 282, serial sub-chain 282a, and serial sub-chain 282b have been similarly described above.

One or more hosts 110 may be communicatively coupled to the storage apparatus 401 and can transmit the requests 142 and 148 to the storage apparatus 401 and can receive the read data 196 and prefetch data 197 from the storage apparatus 401. Example memory transactions regarding the requests 142 and 148, read data 196, and prefetch data 197 have been similarly discussed above.

The storage apparatus 401 may include other features of (and may perform other functions of) the storage apparatus 201 as similarly discussed above with reference to FIGS. 2A, 2B, and 2C.

The storage apparatus 401 further comprises a memory interface 305 which has similar elements and functions as the memory interface 105 as discussed above and which also has been discussed above with reference to FIG. 3. In an embodiment of the invention, the storage apparatus 401 comprises a plurality of DMA controllers 140. For example, the storage apparatus 401 comprises the DMA controllers 140a and 140b that are both coupled to the system bus 125. The DMA controller 140a is coupled to the serial chain 282 as similarly discussed above. The DMA controller 140b is coupled to the serial chain 482 which will be discussed below. The number of DMA controllers 140 in the storage apparatus 301 may vary as symbolically shown by the dot symbols 302.

In FIG. 4, for purposes of explanation and/or clarity, numerous specific details are set forth in order to provide a thorough understanding thereof. It may be evident, however, that the novel embodiments can be practiced without these specific details shown in the drawing figures. In other instances, well known structures and devices are shown in block diagram form in order to facilitate a description thereof. The intention is to cover all modifications, equivalents, and alternatives consistent with the claimed subject matter.

In the description herein, the elements 450 are shown as example elements 450a, 450b, 450c, 450d, and other similar numeral reference with the prefix "450". The element 450 is generally referred to as memory controller 450 or flash memory controller 450 for convenience. The element 450 can be a flash memory controller 450 or another type of memory controller 450 that can function with nonvolatile memory devices in a memory module, depending on the type of nonvolatile memory devices in a memory module that functions with the memory controller 450. The above numerical convention is similarly used for other elements with different numerical references in the drawing figures (e.g., the non-volatile memory controller buffers that are allocated as prefetch buffers are symbolized as buffers 455 and are specifically shown as buffers 455a through 455d).

The storage apparatus 401 comprises a serial chain 482 and this serial chain 482 comprises the DMA controller 140b, a bus 478, a non-volatile memory controller 450a, the channels 480a and 480b, a non-volatile memory controller 450b, and a non-volatile memory controller 450c. The serial chain 482 may further include a non-volatile memory controller 450d that is coupled by a channel 483 to the non-volatile memory controller 450c.

The non-volatile memory controller 450a is coupled via the channel 480a to the non-volatile memory controller 450b. The channel 480a comprises one or more point-to-point lines which can be, for example, a data bus that uses standard specification or a bus that uses a proprietary protocol (e.g., one flashbus or a plurality of flashbuses), wherein the channel 480a is configured for transmitting signals such as command, status, response, address, and data bytes between the non-volatile memory controllers 450a and 450b. The two non-volatile memory controllers 450a and 450b can transmit the above-mentioned signals to each other via the channel 480a between the two non-volatile memory controllers 450a and 450b. A non-volatile memory controller (controllers 450a or 450b) can process the above-mentioned signals via cutthrough, store forward, or/and buffering.

The non-volatile memory controller 450a is coupled via a channel 480b to the non-volatile memory controller 450c. The channel 480b comprises one or more point-to-point lines which can be, for example, a data bus that uses standard specification or a bus that uses a proprietary protocol (e.g., one flashbus or a plurality of flashbuses), wherein the channel 480b is configured for transmitting signals such as command, status, response, address, and data bytes between the non-volatile memory controllers 450a and 450c. The two non-volatile memory controllers 450a and 450c can transmit the above-mentioned signals to each other via the channel 480b between the two non-volatile memory controllers 450a and 450c. A non-volatile memory controller (controllers 450a or 450bc) can process the above-mentioned signals via cutthrough, store forward, or/and buffering.

The channel 483 can perform at least some of the above discussed operations of the channels 480a or 480b in order to permit the non-volatile memory controller 450c and the non-volatile memory controller 450d to communicate with each other. For example, the channel 483 comprises one or more point-to-point lines which can be, for example, a data bus that uses standard specification or a bus that uses a proprietary protocol (e.g., one flashbus or a plurality of flashbuses), wherein the channel 483 is configured for transmitting signals such as command, status, response, address, and data bytes between the non-volatile memory controller 450*c* and 450*d*. The two non-volatile memory controllers 450*c* and 450*d* can transmit the above-mentioned signals to each other via the channel 483 between the two non-volatile memory controllers 450*c* and 450*d*. A non-volatile memory controller (controllers 450*c* or 450*d*) can process the above-mentioned signals via cutthrough, store forward, or/and buffering.

In an embodiment of the invention, the second serial chain 482 comprises a first serial sub-chain 482*a* and a second serial sub-chain 482*b*.

In an embodiment of the invention, the channel 483 and the non-volatile memory controller 450*d* are included in the first serial chain 482 (and second serial sub-chain 482*b*) or can be omitted from the first serial chain 482 (and serial sub-chain 482*b*). The memory modules 471*a*, 471*b*, and 471*c* are included in the first serial chain 482. The memory module 471*d* may be included in the first serial chain 482 (and second serial sub-chain 482*b*) if the non-volatile memory controller 450*d* is included in the first serial chain 482 (and second serial sub-chain 482*b*).

In an embodiment of the invention, the first serial sub-chain 482*a* comprises the non-volatile memory controller 450*a*, the memory module 471*a*, the channel 480*a*, the non-volatile memory controller 450*b*, and the memory module 471*b*, and the second serial sub-chain 482*b* comprises the non-volatile memory controller 450*a*, the memory module 471*a*, the channel 480*b*, the non-volatile memory controller 450*c* and the memory module 471*c*. The second serial sub-chain 482*b* can further include the channel 483, the non-volatile memory controller 450*d*, and the memory module 471*d*.

The channel 480*a* connects the non-volatile memory controller 450*a* to the non-volatile memory controller 450*b*, while the channel 480*b* that connects the non-volatile memory controller 450*a* to the non-volatile memory controller 450*c*, and the connection between the non-volatile memory controller 450*a* and the non-volatile memory controllers 450*b* and 450*c* is a fourth type of signal path layout 484. The fourth type of signal path layout 484 is similar to the second type of signal path layout 284 in FIG. 2A.

The bus 480*a* and bus 480*b* are signal paths that are separated (or electrically insulated) from each other and that are each coupled to the non-volatile memory controller 450*a* for transmitting data, control signals, and other suitable signals, while providing ease of manufacturing due to the separated signal paths of the bus 480*a* and bus 480*b*. The number of buses coupled to the non-volatile memory controller 450*a* may vary as symbolically shown by the dot symbols 493. Therefore, in another embodiment of the invention, the non-volatile memory controller 450*a* is directly coupled by only two buses (e.g., buses 480*a* and 480*b*) to non-volatile memory controllers in the storage apparatus 401, while in another embodiment of the invention, the non-volatile memory controller 450*a* is directly coupled by more than three buses (e.g., buses 480*a* and 480*b* and at least an additional bus) to non-volatile memory controllers in the storage apparatus 401. Therefore, at least two serial sub-chains 482*a* and 482*b* may be coupled to (and share) the non-volatile memory controller 450*a*.

In an embodiment of the invention, the serial sub-chain 482*a* is expandable as now discussed. A similar first type of signal path layout 184 (FIG. 1A) can be coupled between the non-volatile memory controller 450*b* and at least another non-volatile memory controller in the serial sub-chain 482*a* or a similar second type of signal path layout 284 (FIG. 2A) can be coupled between the non-volatile memory controller 450*b* and at least another non-volatile memory controller in the serial sub-chain 482*a*. At least one more of a given type of signal path layout (e.g., similar to layout 184 or layout 284) and at least one more non-volatile memory controller can further be added in the serial sub-chain 482*a* so that the serial chain 482 (and/or serial sub-chain 482*a*) is expanded in a given direction (e.g., X-direction 185). As noted above, the X-direction 185, Y-direction 186, and Z-direction 187 form a three-dimensional coordinate system 188.

However, any serial chain (e.g., serial chain 482) and any serial sub-chain (e.g., serial sub-chain 482*a* and/or serial sub-chain 482*b*) in the data storage apparatus 401 may be disposed in any direction such as, for example, directions that are offset from and/or that are on an angular offset from the X-axis 185, Y-axis 186, and/or Z-axis 187 to, for example, satisfy packaging constraints or other physical constraints.

In an embodiment of the invention, the serial chain 482 is a uni-directional chain if the serial sub-chains 482*a* and 482*b* are in a same direction (e.g., one of X-direction 185, Y-direction 186, or Z-direction 187). Therefore, the prefetch buffers (as discussed below) in the serial chain 482 are uni-directional prefetch buffers in a same direction (e.g., one of X-direction 185, Y-direction 186, or Z-direction 187).

In an embodiment of the invention, the serial chain 482 is a multi-directional (multiple directional) chain if the serial sub-chains 482*a* and 482*b* are in different directions (e.g., the sub-chain 482*a* is in the X-direction 185 and the sub-chain 482*b* is in the Y-direction 186; or the sub-chain 482*a* is in the X-direction 185 and the sub-chain 482*b* is in the Z-direction 187; or the sub-chain 482*a* is in the Y-direction 186 and the sub-chain 482*b* is in the Z-direction 187). Therefore, the prefetch buffers (as discussed below) in the serial chain 482 are uni-directional prefetch buffers in a same direction (e.g., one of X-direction 185, Y-direction 186, or Z-direction 187) or are multi-directional prefetch buffers.

Additionally or alternatively, the serial sub-chain 482*b* is expandable as now discussed. A similar first type of signal path layout 184 (FIG. 1A) can be coupled between the non-volatile memory controller 450*d* and at least another non-volatile memory controller in the serial sub-chain 482*b* or another type of signal path layout (e.g., similar to a second type of signal path layout 284 in FIG. 2A) can be coupled between the non-volatile memory controller 450*d* and at least another non-volatile memory controller in the serial sub-chain 482*b*. At least one more of a given type of signal path layout (e.g., similar to layout 184 or layout 284) and at least one more non-volatile memory controller can further be added in the serial sub-chain 482*b* so that the serial chain 482 (and/or serial sub-chain 482*b*) is expanded in a given direction (e.g., X-direction 185).

Additionally or alternatively, the serial sub-chain 482*b* is expandable as now discussed. A similar first type of signal path layout 184 can be coupled between the non-volatile memory controller 450*c* and at least another non-volatile memory controller in a serial sub-chain branch (similar to branch 251 in FIG. 2B) or another type of signal path layout (e.g., similar to a second type of signal path layout 284 in FIG. 2A) can be coupled between the non-volatile memory controller 4 50*c* and at least another non-volatile memory controller in a serial sub-chain branch (similar to branch 252 in FIG. 2C). This at least another non-volatile memory controller can be coupled to the channel 483 via a node (similar to node 289) so as to expand the serial chain 482 via the serial sub-chain branch (similar to branch 251 in FIG.

2B) in any given direction (e.g., direction 185, direction 186, or direction 187). Therefore, this additional branch could be configured from the non-volatile memory controller 450*c* via a node to further expand the serial chain 482 with at least an additional prefetch buffer that is included in the at least one non-volatile memory controller and/or in the at least one non-volatile memory device in this additional branch, wherein this at least additional prefetch buffer is configured to store prefetch data. In this example, wherein this additional branch (similar to branch 251 in FIG. 2B) is connected to a node, this additional branch will have a layout that is similar to the layout 184 in FIG. 1A.

Alternatively, a serial sub-chain branch (similar to branch 252 in FIG. 2C) could be configured directly from the non-volatile memory controller 450*c* to further expand the serial chain 482 with at least an additional prefetch buffer that is included in the at least one non-volatile memory controller and/or in the at least one non-volatile memory device in this additional branch, wherein this at least additional prefetch buffer is configured to store prefetch data; in the example wherein this additional branch (similar to branch 252 in FIG. 2C) could be configured directly from the non-volatile memory controller 450*c* via a link (similar to link 291 in FIG. 2C), this additional branch would have a layout that is similar to the layout 284 in FIG. 2A. The link could be similar to the link 280*b* in FIG. 2A that forms a serial sub-chain that is similar to the serial sub-chain 282*b*. This at least another non-volatile memory controller can be coupled to the link (similar to link 291) so as to expand the serial sub-chain 482 via the serial sub-chain branch (similar to branch 252 in FIG. 2C) in any given direction (e.g., direction 185, direction 186, or direction 187).

Handshaking and data transmission between two non-volatile memory controllers (e.g., non-volatile memory controllers 450*a* and 450*b*), as well as handshaking and data transmission between a non-volatile memory controller (e.g., non-volatile memory controller 450*a*) and a DMA controller 140 (e.g., DMA controller 140*a* or DMA controller 140*b*) can be performed by different IC protocols. The handshaking and data transmission between two non-volatile memory controllers in FIG. 4 and handshaking and data transmission between a DMA controller 140 (e.g., DMA controller 140*b*) and a non-volatile memory controller in FIG. 4 have been similar discussed above regarding the handshaking and data transmission between elements in FIGS. 2A, 2B, and 2C.

The number of non-volatile memory controllers and non-volatile memory modules in a given serial chain may vary. For example, the serial chain 482 comprises a single non-volatile memory controller 450*a*. As another example, the serial chain 482 comprises two or more (a plurality of) non-volatile memory controllers (e.g., controllers 450*a* and 450*b*). The number of non-volatile memory controllers in the serial chain 482 (and serial sub-chain 482*a*) may vary as symbolically shown by the dot symbols 490. If the serial sub-chain 482*a* includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 471*a*, 471*b*, 471*c*, or 471*d*) in the storage apparatus 401, the at least additional non-volatile memory device in the additional non-volatile memory module can store write data, cache data, return read data, and perform other flash memory device functions as, for example, discussed herein.

As another example, the serial sub-chain 482*b* comprises two or more (a plurality of) non-volatile memory controllers (e.g., controllers 450*a* and 450*c*). The number of non-volatile memory controllers in the serial chain 482 (and serial sub-chain 482*b*) may vary as symbolically shown by the dot symbols 492. The non-volatile memory controllers 450*c* and 450*d* are communicatively and/or electronically coupled by the channel 483. If the serial sub-chain 482*b* includes at least a third non-volatile memory controller, then that third non-volatile memory controller is coupled to an additional non-volatile memory module comprising at least an additional non-volatile memory device. Like the non-volatile memory devices in the other non-volatile memory modules (e.g., non-volatile memory modules 471*a*, 471*b*, 471*c*, and/or 471*d*) in the storage apparatus 401, the at least additional non-volatile memory device in the additional non-volatile memory module can store write data, cache data, return read data, and perform other flash memory device functions as, for example, discussed herein.

The number of serial sub-chains in the serial chain 482 may vary as symbolically shown by the dot symbols 493.

The DMA controller 140*b* and any non-volatile memory controller that is directly or indirectly coupled to the DMA controller 140*b* are all communicatively or/and electrically coupled together in the serial chain 482. For example, the DMA controller 140*b*, the non-volatile memory controller 450*a*, the non-volatile memory controller 450*b*, and the non-volatile memory controller 450*c* are all communicatively or/and electrically coupled together. As another example, the DMA controller 140*b*, the non-volatile memory controller 450*a*, the non-volatile memory controller 450*b*, the non-volatile memory controller 450*c*, and the non-volatile memory controller 450*d* are all communicatively or/and electrically coupled together.

At least one serial chain (and/or at least one serial sub-chain) in the buffer topology 465 (e.g., serial chain 482 and/or serial chain 482*a* and/or serial sub-chain 482*b* and/or another serial chain and/or another serial sub-chain in the buffer topology 465) may include non-volatile memory controllers that vary in number in the X-direction (first direction) 185, Y-direction (second direction) 186, and/or Z-direction (third direction) 187. Therefore, one or more additional non-volatile memory controllers can be added to a given serial chain (or a given serial sub-chain) in the X-direction 185, Y-direction 186, and/or Z-direction 187 in the buffer topology 465.

Additionally, the buffer topology 465 can be expanded in the X-direction 185, Y-direction 186, and/or Z-direction 187 by adding at least an additional DMA controller in a storage apparatus 401 and by adding one or more additional non-volatile memory controllers coupled to the at least additional DMA controller and a non-volatile memory module is coupled to that one or more additional non-volatile memory controllers.

Other variations of the directions of the serial chain 482 and serial sub-chains 482*a* and/or 482*b* in the buffer topology 465 are possible in an embodiment of the invention.

As an example, any given serial sub-chain in the storage apparatus 401 can be uni-directional or multi-directional. For example, the serial sub-chain 482*b* is a uni-directional serial sub-chain if the channels 480*b* and 483 are disposed in a same direction (e.g., X-direction 185, Y-direction 186, or Z-direction 187. Since the serial sub-chain 482*b* is uni-directional, all allocated prefetch buffers in the sub-chain 482*b* are uni-directional allocated prefetch buffers (e.g., at least two of the prefetch buffer 455*c*, prefetch buffer 455*d*, data registers 475*a*, 475*b*, or 475*c*, and/or data registers 477*a*, 477*b*, or 477*c*). As another example, the serial sub-chain 482*b* is a multi-directional sub-chain if the channels 480*b* and 483 are disposed in two different directions (e.g., the channel 480*a* is disposed in the X-direction 185 and the channel 483 is disposed in the Y-direction 186). Since the serial sub-chain 482*b* is multi-directional, at least two allocated prefetch buffers in the sub-chain 482*b* are multi-directional allocated prefetch buffers (e.g., prefetch buffers 455*c* and 455*d* are multi-directional allocated prefetch buffers; e.g., data registers 475*a* and 477*a* are multi-directional allocated prefetch buffers; e.g., data registers 475*b* and 477*b* are multi-directional allocated prefetch buffers; and/or e.g., data registers 475*c* and 477*c* are multi-directional allocated prefetch buffers). Since a serial chain and/or a serial sub-chain in the memory topology 445 can be uni-directional or multi-directional, the serial chain and/or serial sub-chain can be appropriately disposed or configured to satisfy package constraints and/or other physical constraints that may be applicable to the memory topology 445.

A DMA descriptor 494 is loaded by a local processor (e.g., processor 120) into a DMA controller memory of the DMA controller 140 (e.g., DMA controller 140*a* and 140*b*), in one example. In one example, the local processor initially creates a DMA descriptor 494. As another example, the local processor has a template in a locally accessible memory (e.g., RAM) that the local processor can access and control, and the local processor creates a DMA descriptor 494 from that template. In another example, the local processor 120 can instead inform a DMA controller (e.g., DMA controller 140*a* or DMA controller 140*b*) to read a DMA descriptor 494 in a given memory address of a memory (e.g., RAM) and the DMA controller will subsequently read the DMA descriptor 494 in that given memory address.

The DMA descriptor 494 is configurable via software (or firmware) that is executed by the local processor. The DMA descriptor 494 comprises control information that will control a given memory transaction to be performed by the DMA controller 140. As an example, the DMA controller 140*b* intelligently determines and intelligently selects one of the serial chains (e.g., serial chain 482 and/or serial sub-chain 482*a* and/or serial sub-chain 482*b*) for use in a given memory transaction.

As an example, the control information in the descriptor 494 includes at least some of the following: the amount of bytes of the data to be transferred in the memory transaction, the source address of the data to be transferred in the memory transaction, the destination address of the data to be transferred in the memory transaction, the serial chain identifier that identifies the serial chain used for the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140*b* and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a DMA controller 140*b* may include a command/status register which is configurable via software (or firmware) that is executed by a local processor (e.g., IC processor 120). The register includes control information 494 used for the memory transaction and will advantageously relieve a firmware of having to write a descriptor that would have this control information 494.

In an embodiment of the invention, the descriptor 494 is passed from the DMA controller 140 (e.g., DMA controller 140*b*) to (and loaded into) a non-volatile memory controller (e.g., non-volatile memory controller 450*a*) that is directly coupled to the DMA controller 140*b*, and the non-volatile memory controller 450*a* will pass the descriptor 494 to the next non-volatile memory controllers (e.g., non-volatile memory controllers 450*b* and 450*c*) that are coupled to the non-volatile memory controller 450*a* in the buffer topology 465. A non-volatile memory controller in a serial chain and serial sub-chain will pass the descriptor 494 to the next given non-volatile memory controller in the given serial chain and given serial sub-chains and the descriptor 494 is passed serially along the given serial chain and given serial sub-chains.

In another embodiment of the invention, a derivative descriptor 495 is passed from the DMA controller 140*b* to a non-volatile memory controller that is directly coupled to the DMA controller 140*b*, and the non-volatile memory controller will pass the derivative descriptor to the next non-volatile memory controller in a given serial chain and given serial sub-chains and the derivative descriptor 495 is passed serially along the given serial chain and given serial sub-chains, as similarly discussed above.

The derivative descriptor 495 is a derivative of the descriptor 494 (or is extracted by the DMA controller 140*b* from the descriptor 494). After the descriptor 494 is loaded into the DMA controller 140*b*, the DMA controller 140*b* can parse the descriptor 494 in order to create the derivative descriptor 495 (or command 495 or sequence 495 or signal 495). The block 495 can also be a complete descriptor such as the descriptor 494 instead of a derivative descriptor. A descriptor 495 (or derivative descriptor 495 or command 495 or sequence 495 or signal 495) is intelligible to a given non-volatile memory controller (e.g., non-volatile memory controller 450*a*) in the buffer topology 465 so that the given non-volatile memory controller can perform a memory transaction.

A given non-volatile memory controller executes the derivative descriptor 495 or descriptor 494 to permit the given non-volatile memory controller to perform operations such as, for example, the given non-volatile memory controller storing data from a host into one or more non-volatile memory devices that are coupled to the given non-volatile memory controller or the given non-volatile memory controller reading stored data from one or more non-volatile memory devices that are coupled to the given non-volatile memory controller wherein the stored data read from a non-volatile memory device is passed by the storage apparatus 401 to a host 110. Alternatively or additionally, the non-volatile memory controller uses a command 495 and/or sequence 495 and/or signal 495 to perform an operation related to a memory transaction.

A given non-volatile memory controller executes the derivative descriptor 495 or descriptor 494 to permit the given non-volatile memory controller to intelligently select a serial sub-chain for performing a given memory transaction. For example, the non-volatile memory controller 450a intelligently selects the serial sub-chain 482a or the serial sub-chain 482b for performing a given memory transaction in the storage apparatus 401. As another example, the non-volatile memory controller 250a intelligently selects the serial sub-chain 282a or the serial sub-chain 282b for performing a given memory transaction in the storage apparatus 401. Assume in this example that the non-volatile memory controller 450a has selected the serial sub-chain 482b for performing a given memory transaction. For a given memory transaction that is a write operation, the non-volatile memory controller 450c, for example, in the selected serial sub-chain 482b, can execute a descriptor 494 (or derivative descriptor 495) in a memory of the non-volatile memory controller 450c so that the non-volatile memory controller 450c stores write data (e.g., from a host) into a non-volatile memory device (e.g., non-volatile memory device 474a) that is coupled to the non-volatile memory controller 450c. On the other hand, for a given memory transaction that is a read operation, the non-volatile memory controller 450c, for example, in the selected serial sub-chain 482b can execute a descriptor 494 (or a derivative descriptor 495) in a memory of the non-volatile memory controller 450c so that the non-volatile memory controller 450c reads stored data from a non-volatile memory device (e.g., non-volatile memory device 474a) that is coupled to the non-volatile memory controller 450c, and the storage apparatus 401 passes the stored data from the non-volatile memory device 474a to a host 110. Of course, the non-volatile memory controller 450a can execute the descriptor 494 (or a derivative descriptor 495) so that the non-volatile memory controller 450a can intelligently select another serial sub-chain (e.g., serial sub-chain 482a) for performing a given memory transaction. Therefore, the descriptor 494 (or derivative descriptor 495) comprises control information that will control a given memory transaction to be performed by the non-volatile memory controller 450a. As an example, the non-volatile memory controller 450a intelligently determines and intelligently selects one of the serial sub-chains 482a or 482b for use in a given memory transaction, or the non-volatile memory controller 450a can write and store data into a non-volatile memory device (e.g., non-volatile memory device 468a) or can read stored data from a non-volatile memory device (e.g., non-volatile memory device 468a). Of course, more than two serial sub-chains can be directly coupled to (or associated with) the non-volatile memory controller 450a, and the non-volatile memory controller 450a intelligently selects a serial sub-chain among the more than two serial sub-chains for use in a given memory transaction.

As an example, the control information (in a descriptor 494 or a derivative descriptor 495) includes at least some of the following: the amount of bytes of the data to be transferred in the memory transaction, the source address of the data to be transferred in the memory transaction, the destination address of the data to be transferred in the memory transaction, the serial sub-chain identifier that identifies the serial sub-chain used for the data to be transferred in the memory transaction, the memory module identifier that identifies the memory module used for the data to be transferred in the memory transaction, the non-volatile memory device identifier that identifies the non-volatile memory device used for the data to be transferred in the memory transaction, the flash page address of the flash page used for the data to be transferred in the memory transaction, the non-volatile memory bus identifier that identifies the non-volatile memory bus used for the data to be transferred in the memory transaction, the DMA-controller-to-Memory-controller bus identifier that identifies the DMA-controller-to-Memory-controller bus (i.e., a bus coupled between the DMA controller 140b and a non-volatile memory controller) used for the data to be transferred in the memory transaction, the link identifier that identifies a link (if applicable) used for the data to be transferred in the memory transaction, a physical block address (PBA) to logical block address (LBA) mapping for providing a PBA-to-LBA mapping of the data to be transferred in the memory transaction, the row and the column of a LUN (logical unit number) used for the memory transaction, a pointer (if applicable) that points to the data to be transferred in the memory transaction, and other information used for the memory transaction. Additionally or alternatively, a non-volatile memory controller 450a may include a command/status register which is configurable via software (or firmware) that is executed by a local processor (e.g., processor 120). The register includes control information (in the descriptor 494 or the derivative descriptor 495) used for the memory transaction and will advantageously relieve a firmware of having to write a descriptor that would have this control information in the descriptor 494 or derivative descriptor 495.

As discussed above, the block 495 may be a descriptor, derivative descriptor, command or group or commands, sequence, or signal wherein the block 495 is transmitted between two controllers (e.g., between a DMA controller and a non-volatile memory controller or between two non-volatile memory controllers). Additional details of a derivative a block 495 have been similarly described above regarding the block 295 in FIG. 2A.

The non-volatile memory controller 450d is coupled in series to the non-volatile memory controller 450c. Therefore, the non-volatile memory controller buffer 455d is coupled in series to the non-volatile memory controller buffer 455c.

The non-volatile memory controller 450a is coupled in series to the DMA controller 140b. Therefore, the non-volatile memory controller buffer 455a is coupled in series to the DMA controller buffer 160b.

In an example operation of the storage apparatus 401, the memory interface 305 responds to a memory transaction request 142 (e.g., memory read request 142) received via the host interface link 131 from a host 110a and received via the host interface 130. The memory interface 305 can respond to another memory transaction request 148 (e.g., another memory read request 148 that is subsequent to the memory read request 142) received via host interface link 131 from another host 110b or from the same host 110a. One or more host 110 can send memory transaction requests 142 or 148 to the memory interface 305 of the storage apparatus 401 via one or more host interface link 130. The number of hosts 110 and host interface links 133 that can be coupled to the storage apparatus 401 can vary as symbolically shown by the dot symbols 132 and 133, respectively. The memory interface 405 performs, on at least one memory module in the memory topology 445, a memory operation (e.g., a memory write operation or a memory read operation) that corresponds to the memory transaction request 142 that is requested by a host 110. For example, if the memory interface 305 receives a memory read transaction request 142, the memory interface 305 performs a read operation on at least one of the memory modules in the memory topology 445 and returns the result of the read operation, such as read data 196, along a host interface link 131 to a host 110 that sent the memory transaction request 142. Data returned as a result of the read operation is herein called "read data" 196.

The term "host", such as a host 110 shown in this embodiment, can be defined as any device that has the ability to transmit a memory read (or/and write) transaction request to storage apparatus 401. For example, this device may include a host 110 that can generate a memory transaction request 142 (e.g., memory read transaction request or/and memory write transaction request) and that can receive a response resulting from the processing of the memory transaction request 142 by the memory interface 305. The memory interface 305 may process memory transactions from one or more requesting device, such as at least one of the hosts 110a through 110b. For example, the host 110a may generate a memory read transaction request 142 that will cause the storage apparatus 401 to return a read data 196, while another host 110b may receive a response, such as a prefetch data 197 that is a result of another subsequent memory read transaction request 148 that is sent by the host 110b. As another example, the host 110a may generate a memory read transaction request 142 that will cause the storage apparatus 401 to return a read data 196, and the same host 110a may receive a response, such as a prefetch data 197 that is a result of another subsequent memory read transaction request 148 that is sent by the same host 110a. A prefetch data 197 is stored in a prefetch buffer as discussed above.

Since the serial chain 482 is expandable and since the serial sub-chain 482a is expandable and/or since the serial sub-chain 482b is expandable, the memory interface 305 can allocate an expanded number or expandable number or configurable number of prefetch buffers in the storage apparatus 401. By allocating an expanded number or expandable number or configurable number of prefetch buffers, the storage apparatus 401 further reduces latency in memory read operations in the storage apparatus 401. This further reduction in latency is not available in current systems.

Another example is now presented of prefetching transactions in the storage apparatus 401 in order to reduce latency in memory read transactions in the storage apparatus 401. As similarly discussed above, the system bus 125 is a conduit for transferring data between the DMA controller 140, the local processor 120, the local memory 135, and the host interface 130. The local processor 120, the host interface 130, and the DMA controller 140 may access the local memory 135 via the system bus 125 as needed.

The host 110a sends a memory read transaction request 142 to the storage apparatus 401 for data located in the memory topology 445. Operating under program control, the local processor 120 analyzes and responds to the memory read transaction request 142 by generating DMA instructions that will cause the DMA controller 140 to read this data from the memory topology 445 through at least the non-volatile memory controller 450a. If this data is available, a non-volatile memory controller 450 will retrieve this data from a non-volatile memory device with this data. For example, if this data is in the non-volatile memory device 468a, then the non-volatile memory controller 450a will retrieve this data from the non-volatile memory device 468a. The non-volatile memory controller 450a then transfers this data to the DMA controller 140. The DMA controller 140 then transfers this data to the local memory 135, and the local processor 120 then eventually transfers this data from the local memory 135 to the host 110a via the host interface 130. Data obtained during this memory read transaction request is herein named "read data".

As another example, if this data is in the non-volatile memory device 472a, then the non-volatile memory controller 450b will retrieve this data from the non-volatile memory device 472a. The non-volatile memory controller 450b then transfers this data to the non-volatile memory controller 450a. The non-volatile memory controller 450a then transfers this data to the DMA controller 140. The DMA controller 140 then transfers this data to the local memory 135, and the local processor 120 then eventually transfers this data from the local memory 135 to the host 110a via the host interface 130. As noted above, data obtained during this memory read transaction request is herein named "read data".

The local processor 120 also identifies "prefetch data". Prefetch data is any data currently stored in memory topology 445 that meets a prefetch selection criterion. This prefetch selection criterion may include a relationship between the read data and any stored data. For example, this prefetch selection criterion may be met if stored data exists wherein the stored data has a memory address within a selected memory address range from the memory address of the read data. In another example, memory interface 305 determines whether this prefetch selection criterion is met by determining whether any stored data exists in memory topology 445 wherein the stored data has a memory address within the same page as a memory address associated with the read data. The type of relationship between the read data and stored data is not intended to be limiting in any way. Any type of relationship may be used that increases the likelihood that the stored data selected for prefetching will be later requested by a host 110 coupled to a memory interface 305.

The local processor 120 may also perform an additional read operation, called an internal read operation. This internal read operation is a process executed by the local processor 120 to retrieve prefetch data 197 from the memory topology 345. This internal read operation includes the local processor 120 sending an instruction 198 to the DMA controller 140 to retrieve (via at least one non-volatile memory controller 450) a prefetch data 197 from the memory topology 445. For example, if the memory topology 445 addresses stored data by flash page, the instruction 198 contains the address of the specific flash page within a flash memory device (in memory topology 445) that holds the prefetch data 197. The instruction 198 also causes the DMA controller 140 to retrieve (via at least one non-volatile memory controller 450) a prefetch data 197 from the flash page and flash memory device (in memory topology 445) identified by the address mentioned above.

When the DMA controller 140 receives the instruction 198, the instruction 198 causes the DMA controller 140 to use at least one non-volatile memory controller 450 to cause at least one non-volatile memory device (in memory topology 445) to transfer the prefetch data 197. The internal read operation also includes the local processor 120 allocating at least one prefetch buffer to store the prefetch data 197. Allocating at least one prefetch buffer may be performed statically, such as at the time of manufacture, performed dynamically by the local processor 120, or both. In one embodiment of the invention, the processor 120 will allocate a number of prefetch buffers based on an amount of storage needed for a given prefetch data 197. For example, the memory interface 305 (including the processor 120) allocates a data register (e.g., data register 467a) in a non-volatile memory device (e.g., non-volatile memory device 468a) and a prefetch buffer 455a (in the non-volatile memory controller 450a) as storage space suitable for storing (buffering) the prefetch data 197. This action by the memory interface 305 may also render buffers (that have not been allocated as prefetch buffers), such as the data registers 467b and 467c and buffers 455b and 455c to be available to storage apparatus 401 for other memory uses. As discussed above, buffers in the storage apparatus 401 that are allocated as prefetch buffers for storing prefetch data are denoted herein as "prefetch buffers". If a host (host 110a and/or 110b) transmits a second memory read transaction request 148 to the storage apparatus 401 for data (wherein the second memory read transaction request 148 is subsequent to the first memory read transaction request 142), and this data has been previously stored as a prefetch data 197 in a prefetch buffer in the storage apparatus 401, then the local processor 120 responds by retrieving the prefetch data 197 from a prefetch buffer in the storage apparatus 401 and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the prefetch data 197 may instead be sent directly to the host (host 110a and/or 110b) or processed in any other manner envisioned by a user. As also discussed above, the processor 120 can additionally allocate memory space 134 in the system memory 135 as a prefetch buffer for storing prefetch data 197 and/or can additionally allocate the DMA buffer 160b as a prefetch buffer for storing prefetch data 197.

As another example, the memory interface 305 (including the processor 120) allocates at least one prefetch buffer in the serial chain 482, at least one prefetch buffer in the serial sub-chain 482a, and at least one prefetch buffer in the serial sub-chain 482b. Therefore, the memory interface 305 allocates an increased number of prefetch buffers compared to conventional systems. For example, the memory interface 305 allocates at least the following prefetch buffers: (1) in the serial chain 382, the memory interface 305 allocates as prefetch buffers at least one of the buffer 355a, data registers 467a, 467b, and 467c; (2) in the serial chain 482a, the memory interface 305 allocates as prefetch buffers at least one of the buffer 455b, data register 473a, 473b, and 473c; and (3) in the serial chain 482b, the memory interface 305 allocates as prefetch buffers at least one of the buffer 455c, data registers 475a, 475b, and 475c. The memory interface 305 can additionally allocate as prefetch buffers, at least one of the following: (1) at least an additional buffer in an additional non-volatile memory controller coupled to the non-volatile memory controller 450b in the serial sub-chain 482a and/or at least one data register in at least one non-volatile memory device coupled to that additional non-volatile memory controller in the serial sub-chain 482a; and/or (2) the prefetch buffer 455d in the non-volatile memory controller 450d and/or at least one of the data registers 477a, 477b, and 477d; and/or (3) at least an additional buffer in an additional non-volatile memory controller coupled to the non-volatile memory controller 450d in the serial sub-chain 482b and/or at least one data register in at least one non-volatile memory device coupled to that additional non-volatile memory controller in the serial sub-chain 482b; and/or at least one additional buffer and/or at least one data register in a serial sub-chain branch (e.g., branch 251 in FIG. 2B or branch 252 in FIG. 2C) that is coupled to the non-volatile memory controller 450c.

Therefore, the serial chain 482 and serial sub-chains 482a and 482b permit the memory interface 305 (and processor 120) to allocate an increased number of prefetch buffers for storing prefetch data in the serial chain 482 and serial sub-chains 482a and 482b. Since there is an increased number of prefetch buffers in the storage apparatus 401, the prefetch data 197 can be much larger in size as compared to prefetch data that are stored in conventional systems. Additionally, the memory interface 305 (and processor 120) can allocate the buffer 160b (in DMA controller 140b) as a prefetch buffer and/or can allocate memory space 134 in the local memory 135 as a prefetch buffer in addition to allocated prefetch buffers in the serial chain 482 and serial sub-chains 482a and 482b.

Note that the number non-volatile memory devices 468 and data registers 467 in the non-volatile memory module 471a may vary as symbolically shown by the dot symbols 499a.

Note that the number non-volatile memory devices 472 and data registers 473 in the non-volatile memory module 471b may vary as symbolically shown by the dot symbols 499b.

Note that the number non-volatile memory devices 474 and data registers 475 in the non-volatile memory module 471c may vary as symbolically shown by the dot symbols 499c.

Note that the number non-volatile memory devices 476 and data registers 477 in the non-volatile memory module 471d may vary as symbolically shown by the dot symbols 499d.

If a host (host 110a and/or 110b) transmits a second memory read transaction request 148 to the storage apparatus 401 for data (wherein the second memory read transaction request 148 is subsequent to the first memory read transaction request 142), and this data has been previously stored as a prefetch data 197 in prefetch buffers that are allocated in the serial chain 482 and serial sub-chains 482a and/or 482b (such as, for example, the example allocated prefetch buffers in the serial chain 482 and serial sub-chains 482b as discussed above), then the local processor 120 responds by retrieving the prefetch data 197 from the prefetch buffers in the serial chain 482 and serial sub-chains 482a and 482b and by placing the prefetch data 197 into the local memory 135. When the local processor 120 determines that the local memory 135 contains the prefetch data 197, then the local processor 120 forwards the prefetch data 197 from the local memory 135 to the host interface 130, which in turn transfers the prefetch data 197 to the host (e.g., host 110a and/or host 110b). One of ordinary skill in the art having the benefit of this disclosure would readily recognize that rather than using a local memory 135 to store prefetch data 197, the prefetch data 197 may instead be sent directly to the host (host 110a and/or 110b) or processed in any other manner envisioned by a user. As also discussed above, the processor 120 can additionally allocate memory space in the system memory 135 as a prefetch buffer for storing prefetch data 197 and/or can additionally allocate the DMA buffers 160a and/or 160b as a prefetch buffer for storing prefetch data 197.

In this example, the above-discussed prefetch data is stored in at least one prefetch buffer (e.g., prefetch buffer 255a, data register 267a, prefetch buffer 255b, data register 273a, prefetch buffer 255c, and/or data register 275a) in the serial chain 282 and is stored in at least one prefetch buffer (e.g., prefetch buffer 455a, data register 467a, prefetch buffer 455b, data register 473a, prefetch buffer 455c, and/or data register 475a) in the serial chain 482.

In another embodiment of the invention, the data storage apparatus 401 may have two different types of serial chains. For example, the data storage apparatus 401 comprises the serial chain 282 that is coupled to the DMA controller 140a and a serial chain (similar in layout and configuration to the serial chain 382 in FIG. 3) that is coupled to the DMA controller 140b.

Figure 5:
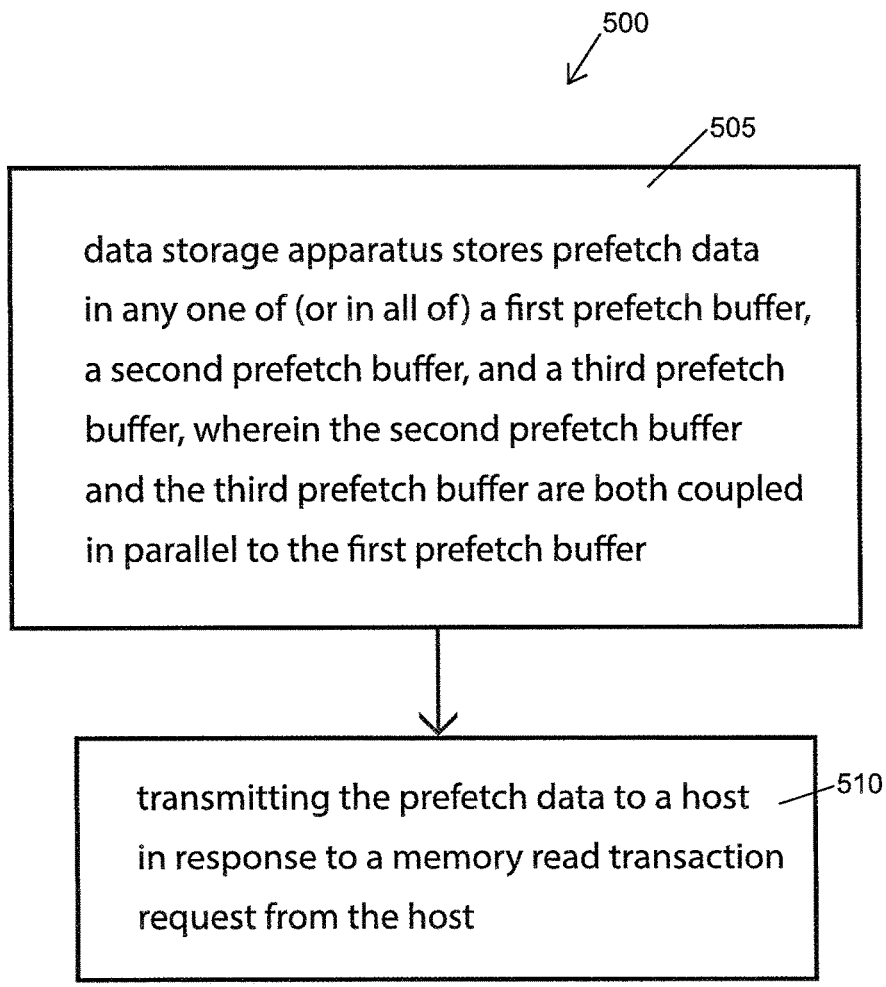
FIG. 5 is a flow diagram of a method, in accordance with an embodiment of the invention.

FIG. 5 is a flow diagram that illustrates a method 500, in accordance with another embodiment of the invention.

At 505, a data storage apparatus stores prefetch data in any one of (or in all of) a first prefetch buffer, a second prefetch buffer, or a third prefetch buffer in a storage device, wherein the second prefetch buffer and the third prefetch buffer are both coupled in parallel to the first prefetch buffer. A data storage apparatus is shown as apparatus 101, 201, 301, or 401 in FIG. 1A, 2A, 3, or 4, respectively. As an example, prefetch data is stored in at least one of the prefetch buffer from a memory topology in response to a prior memory read transaction.

At 510, the data storage apparatus transmits the prefetch data to a host in response to a memory read transaction request from the host.

The serial chains that are discussed above with reference to the drawing figures may be varied in various aspects and/or various features as also discussed above. Therefore, the above discussed serial chains are configurable serial chains.

The serial sub-chains that are discussed above with reference to the drawing figures may be varied in various aspects and/or various features as also discussed above. Therefore, the above discussed serial sub-chains are configurable serial sub-chains.

The prefetch buffers comprise: (1) buffers that are allocated for storing prefetch data and/or (2) data registers that are allocated for storing prefetch data, as discussed above with reference to the drawing figures and may be varied in various aspects and/or various features as also discussed above. Therefore, the above discussed prefetch buffers are configurable prefetch buffers.

In an embodiment of the invention, an apparatus comprises a data storage device with configurable prefetch buffers or a configurable prefetch buffer topology.

In an embodiment of the invention, an apparatus comprises: a data storage device comprising a first prefetch buffer, a second prefetch buffer, and a third prefetch buffer; wherein the second prefetch buffer and the third prefetch buffer are both coupled in parallel to the first prefetch buffer; and wherein any of the prefetch buffers is configured to store prefetch data. The prefetch data is available to a host that sends a memory read transaction request to the data storage device.

In another embodiment of the invention, a method comprises: storing prefetch data in any one of a first prefetch buffer, a second prefetch buffer, or a third prefetch buffer in a storage device; wherein the second prefetch buffer and the third prefetch buffer are both coupled in parallel to the first prefetch buffer. The prefetch data is available to a host that sends a memory read transaction request to a data storage device.

In yet another embodiment of the invention, an article of manufacture, comprises a non-transitory computer-readable medium having stored thereon instructions operable to permit an apparatus to perform a method comprising: storing prefetch data in any one of a first prefetch buffer, a second prefetch buffer, or a third prefetch buffer in a storage device; wherein the second prefetch buffer and the third prefetch buffer are both coupled in parallel to the first prefetch buffer. The prefetch data is available to a host that sends a memory read transaction request to a data storage device.

In yet another embodiment of the invention, a data storage device comprises a serial chain comprising a plurality of sub-chains comprising configurable prefetch buffers. The prefetch data is available to a host that sends a memory read transaction request to the data storage device.

In still another embodiment of the invention, a data storage device comprises a serial chain comprising a plurality of sub-chains comprising configurable prefetch buffers. Any one of the sub-chains may be uni-directional or multi-directional. The prefetch data is available to a host that sends a memory read transaction request to the data storage device.

The word "exemplary" (or "example") is used herein to mean serving as an example, instance, or illustration. Any aspect or embodiment or design described herein as "exemplary" or "example" is not necessarily to be construed as preferred or advantageous over other aspects or embodiments or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity and/or for purposes of focusing on the details of the subject innovation.

As used in herein, the terms "component", "system", "module", "element", and/or the like are intended to refer to a computer-related entity, either hardware, a combination of hardware and software, software, or software in execution. For example, a component or element may be, but is not limited to being, a process running on a processor, a processor, an object, an instance, an executable, a thread of execution, a program, and/or a computer. By way of example, both an application running on a computer and the computer can be a component. One or more components may reside within a process and/or thread of execution and a component may be localized on one computer and/or distributed between two or more computers.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless.

It is also within the scope of the present invention to implement a program or code that can be stored in a non-transient machine-readable medium (or non-transitory machine-readable medium or non-transient computer-readable medium or non-transitory computer-readable medium) having stored thereon instructions that permit a method (or that permit a computer) to perform any of the inventive techniques described above, or a program or code that can be stored in an article of manufacture that includes a non-transient computer readable medium (non-transitory computer readable medium) on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
a data storage device comprising a first prefetch buffer, a second prefetch buffer, and a third prefetch buffer;
wherein the second prefetch buffer and the third prefetch buffer are both coupled in parallel to the first prefetch buffer; and wherein any of the prefetch buffers is configured to store prefetch data.

2. The apparatus of claim 1, wherein the prefetch data is available to a host that sends a memory read transaction request to the data storage device.

3. The apparatus of claim 1, wherein the data storage device further comprises a first non-volatile memory controller comprising the first prefetch buffer, a second non-volatile memory controller comprising the second prefetch buffer, and a third non-volatile memory controller comprising the third prefetch buffer.

4. The apparatus of claim 1, wherein the data storage device comprises: a first non-volatile memory controller, a second non-volatile memory controller, and a third non-volatile memory controller;
a first non-volatile memory device coupled to the first non-volatile memory controller;
a second non-volatile memory device coupled to the second non-volatile memory controller; and
a third non-volatile memory device coupled to the third non-volatile memory controller;
wherein the first prefetch buffer comprises a first data register in the first non-volatile memory device;
wherein the second prefetch buffer comprises a second data register in the second non-volatile memory device;
wherein the third prefetch buffer comprises a third data register in the third non-volatile memory device.

5. The apparatus of claim 1, wherein the second prefetch buffer and the third prefetch buffer are disposed in a same direction.

6. The apparatus of claim 1, wherein the second prefetch buffer is disposed in a first direction and the third prefetch buffer is disposed in a second direction.

7. The apparatus of claim 1, further comprising a fourth prefetch buffer that is coupled to the first prefetch buffer and that is parallel to the second prefetch buffer and the third prefetch buffer.

8. The apparatus of claim 7, wherein the second prefetch buffer is disposed in a first direction, the third prefetch buffer is disposed in a second direction, and the fourth prefetch buffer is disposed in a third direction.

9. The apparatus of claim 8, wherein the first direction is disposed along a first axis, the second direction is disposed along a second axis, and the third direction is disposed along a third axis; and
wherein the first axis, the second axis, and the third axis are orthogonal with respect to each other so that the first axis, the second axis, and the third axis form a three-dimensional coordinate system.

10. The apparatus of claim 8, wherein at least one of the first direction, second direction, or third direction is at an angular offset from a first axis; and
wherein the first axis, a second axis, and a third axis are orthogonal with respect to each other so that the first axis, the second axis, and the third axis form a three-dimensional coordinate system.

11. The apparatus of claim 1, further comprising a fourth prefetch buffer that is coupled in series to the first prefetch buffer or to the third prefetch buffer.

12. The apparatus of claim 11, wherein the second prefetch buffer is disposed in a first direction, the third prefetch buffer is disposed in a second direction, and the fourth prefetch buffer is disposed in a third direction.

13. The apparatus of claim 11, wherein the first direction is disposed along a first axis, the second direction is disposed along a second axis, and the third direction is disposed along a third axis; and
wherein the first axis, the second axis, and the third axis are orthogonal with respect to each other so that the first axis, the second axis, and the third axis form a three-dimensional coordinate system.

14. The apparatus of claim 11, wherein at least one of the first direction, second direction, or third direction is at an angular offset from a first axis; and
wherein the first axis, a second axis, and a third axis are orthogonal with respect to each other so that the first axis, the second axis, and the third axis form a three-dimensional coordinate system.

15. The apparatus of claim 1, further comprising: a fourth prefetch buffer and a fifth prefetch buffer, wherein the fourth prefetch buffer and the fifth prefetch buffer are both coupled in parallel to the third prefetch buffer; and wherein any of the prefetch buffers is configured to store prefetch data.

16. The apparatus of claim 15, wherein the fourth prefetch buffer is disposed in a first direction and the fifth prefetch buffer is disposed in a second direction.

17. The apparatus of claim 16, wherein the first direction is disposed along a first axis and the second direction is disposed along a second axis; and
wherein the first axis and the second axis are orthogonal with respect to each other.

18. The apparatus of claim 17, wherein at least one of the first direction and second direction is at an angular offset from the first axis.

19. A method, comprising:
storing prefetch data in any one of a first prefetch buffer, a second prefetch buffer, or a third prefetch buffer in a data storage device;
wherein the second prefetch buffer and the third prefetch buffer are both coupled in parallel to the first prefetch buffer.

20. An article of manufacture, comprising:
a non-transitory computer-readable medium having stored thereon instructions operable to permit an apparatus to perform a method comprising:
storing prefetch data in any one of a first prefetch buffer, a second prefetch buffer, or a third prefetch buffer in a data storage device;
wherein the second prefetch buffer and the third prefetch buffer are both coupled in parallel to the first prefetch buffer.

* * * * *